(12) United States Patent
Noeldner et al.

(10) Patent No.: US 8,868,809 B2
(45) Date of Patent: Oct. 21, 2014

(54) INTERRUPT QUEUING IN A MEDIA CONTROLLER ARCHITECTURE

(75) Inventors: David R. Noeldner, Fort Collins, CO (US); Michael Bratvold, Fort Collins, CO (US); Paul H. Smith, Boise, ID (US)

(73) Assignee: LSI Corporation, Milpitas, CA (US)

( * ) Notice: Subject to any disclaimer, the term of this patent is extended or adjusted under 35 U.S.C. 154(b) by 1003 days.

(21) Appl. No.: 12/952,206

(22) Filed: Nov. 23, 2010

(65) Prior Publication Data

US 2011/0131357 A1 Jun. 2, 2011

Related U.S. Application Data

(60) Provisional application No. 61/265,109, filed on Nov. 30, 2009.

(51) Int. Cl.
| | |
|---|---|
| *G06F 13/24* | (2006.01) |
| *G06F 13/36* | (2006.01) |
| *G06F 12/00* | (2006.01) |
| *G06F 3/00* | (2006.01) |
| *G06F 13/28* | (2006.01) |

(52) U.S. Cl.
CPC *G06F 3/00* (2013.01); *G06F 12/00* (2013.01); *G06F 13/28* (2013.01)
USPC .......................................... 710/260; 710/310

(58) Field of Classification Search
CPC ........... G06F 13/28; G06F 3/00; G06F 13/36; G06F 13/24
USPC ......... 710/22, 23, 48, 52, 308, 310, 260, 262, 710/264, 269
See application file for complete search history.

(56) References Cited

U.S. PATENT DOCUMENTS

| | | | |
|---|---|---|---|
| 4,402,046 A | 8/1983 | Cox et al. | |
| 5,121,480 A | 6/1992 | Bonke et al. | |
| 5,297,029 A | 3/1994 | Nakai | |
| 5,353,410 A | 10/1994 | Macon et al. | |
| 5,509,134 A * | 4/1996 | Fandrich et al. | 711/103 |
| 5,732,409 A | 3/1998 | Ni | |

(Continued)

OTHER PUBLICATIONS

TCG Core Architecture Specification, Version 2.0, Trusted Computing Group, 2009 USA.

(Continued)

*Primary Examiner* — Khanh Dang
(74) *Attorney, Agent, or Firm* — Daniel J. Santos; Smith Risley Tempel Santos LLC

(57) ABSTRACT

Described embodiments provide a media controller for servicing contexts corresponding to data transfer requests from host devices. The media controller includes a context generator for generating contexts corresponding to the data transfer requests and a buffer for storing one or more context pointers, each pointer corresponding to a context and an action by a system module associated with the context. A context processor is configured to complete a context when the action by a media controller module associated with the context is complete, remove each pointer from the buffer associated with the completed context, and determine whether an interrupt corresponds to the completed context and removed pointer. If no interrupt corresponds to the completed context, the completed context is cleared. If an interrupt corresponds to the completed context, the interrupt is provided to a master processor and a completed context recycler for recycling the completed context pointer to the context generator.

17 Claims, 25 Drawing Sheets

(56) References Cited

U.S. PATENT DOCUMENTS

| | | | |
|---|---|---|---|
| 5,734,821 A | 3/1998 | Chung et al. | |
| 5,974,502 A | 10/1999 | DeKoning et al. | |
| 6,049,838 A | 4/2000 | Miller et al. | |
| 6,081,849 A | 6/2000 | Born et al. | |
| 6,145,072 A | 11/2000 | Shams et al. | |
| 6,158,004 A | 12/2000 | Mason et al. | |
| 6,212,617 B1 | 4/2001 | Hardwick | |
| 6,247,040 B1 | 6/2001 | Born et al. | |
| 6,275,749 B1 * | 8/2001 | Saville et al. | 700/292 |
| 6,324,594 B1 | 11/2001 | Ellis et al. | |
| 6,363,470 B1 | 3/2002 | Laurenti et al. | |
| 6,385,683 B1 | 5/2002 | DeKoning et al. | |
| 6,449,666 B2 | 9/2002 | Noeldner et al. | |
| 6,490,635 B1 | 12/2002 | Holmes | |
| 6,567,094 B1 | 5/2003 | Curry et al. | |
| 6,633,942 B1 | 10/2003 | Balasubramanian | |
| 6,665,746 B1 * | 12/2003 | Liong | 710/22 |
| 6,678,785 B2 | 1/2004 | Lasser et al. | |
| 6,725,329 B1 | 4/2004 | Ng et al. | |
| 6,751,680 B2 | 6/2004 | Langerman et al. | |
| 7,069,559 B2 | 6/2006 | Janssen et al. | |
| 7,286,549 B2 | 10/2007 | Gaur | |
| 7,290,066 B2 | 10/2007 | Voorhees et al. | |
| 7,408,834 B2 | 8/2008 | Conley et al. | |
| 7,461,183 B2 | 12/2008 | Ellis et al. | |
| 7,472,331 B2 | 12/2008 | Kim | |
| 7,512,847 B2 | 3/2009 | Bychkov et al. | |
| 7,590,803 B2 | 9/2009 | Wintergerst | |
| 7,650,449 B2 | 1/2010 | Lu | |
| 7,653,778 B2 | 1/2010 | Merry et al. | |
| 7,925,847 B2 | 4/2011 | Ellis et al. | |
| 2002/0013866 A1 * | 1/2002 | Noeldner et al. | 710/22 |
| 2003/0051078 A1 | 3/2003 | Yoshitake | |
| 2003/0110325 A1 | 6/2003 | Roach et al. | |
| 2003/0167395 A1 | 9/2003 | Chang et al. | |
| 2004/0044873 A1 | 3/2004 | Wong et al. | |
| 2004/0177212 A1 | 9/2004 | Chang et al. | |
| 2005/0114729 A1 | 5/2005 | Nielsen et al. | |
| 2005/0144516 A1 | 6/2005 | Gonzalez et al. | |
| 2005/0203988 A1 | 9/2005 | Nollet et al. | |
| 2006/0031602 A1 * | 2/2006 | Ellis et al. | 710/22 |
| 2006/0050693 A1 | 3/2006 | Bury et al. | |
| 2006/0095611 A1 | 5/2006 | Winchester et al. | |
| 2006/0123259 A1 | 6/2006 | Yokota et al. | |
| 2007/0028040 A1 | 2/2007 | Sinclair | |
| 2007/0109856 A1 | 5/2007 | Pellicone et al. | |
| 2007/0255889 A1 | 11/2007 | Yogev et al. | |
| 2007/0266200 A1 | 11/2007 | Gorobets et al. | |
| 2008/0034153 A1 | 2/2008 | Lee et al. | |
| 2008/0052446 A1 | 2/2008 | Lasser et al. | |
| 2008/0082726 A1 | 4/2008 | Elhamias | |
| 2008/0120456 A1 | 5/2008 | Lee et al. | |
| 2008/0140916 A1 | 6/2008 | Oh et al. | |
| 2008/0155145 A1 | 6/2008 | Stenfort | |
| 2008/0162079 A1 | 7/2008 | Astigarraga et al. | |
| 2008/0224924 A1 | 9/2008 | Lethbridge | |
| 2008/0263307 A1 | 10/2008 | Adachi | |
| 2008/0279205 A1 | 11/2008 | Sgouros et al. | |
| 2009/0138663 A1 | 5/2009 | Lee et al. | |
| 2009/0172308 A1 | 7/2009 | Prins et al. | |
| 2009/0271562 A1 | 10/2009 | Sinclair | |
| 2009/0271796 A1 | 10/2009 | Kojima | |
| 2009/0282301 A1 | 11/2009 | Flynn et al. | |
| 2009/0285228 A1 | 11/2009 | Bagepalli et al. | |
| 2009/0287859 A1 | 11/2009 | Bond et al. | |
| 2009/0300277 A1 | 12/2009 | Jeddeloh | |
| 2009/0313444 A1 | 12/2009 | Nakamura | |
| 2010/0011260 A1 | 1/2010 | Nagadomi et al. | |
| 2010/0023800 A1 | 1/2010 | Harari et al. | |
| 2010/0122148 A1 | 5/2010 | Flynn et al. | |
| 2010/0325317 A1 | 12/2010 | Kimelman et al. | |
| 2011/0041039 A1 | 2/2011 | Harari et al. | |
| 2011/0055458 A1 | 3/2011 | Kuehne | |
| 2011/0099355 A1 | 4/2011 | Tran | |

OTHER PUBLICATIONS

TCG Storage Interface Interactions Specification, Version 1.0, Trusted Computing Group, 2009 USA.

TCG Storage SSC: Enterprise, Version 1.0, Trusted Computing Group 2009 USA.

TCG Storage SSC: Opal, Version 1.0, Trusted Computing Group 2009 USA.

Specification for the Advanced Encryption Standard (AES), Federal Information Processing Standard (FIPS) Publication 197, 2001 USA.

Specification for the Secure Hash Standard (SHS), FIPS Publication 180-3 (2008), National Institute of Standards and Technology (NIST) USA.

Sun et al; "On the Use of Strong BCH Codes for Improving Multi-level NAND Flash Memory Storage Capacity"; ECSE Department, Renssaelaer Polytechnic Institute, Aug. 2006, USA.

Micron Technology, Inc. "NAND Flash 101: An Introduction to NAND Flash and How to Design it into your next product"; TN-29-19; 2006; pp. 1-28; Micron Technology, Inc. Boise Idaho, USA.

Kang et al., "A Superblock-based Flash Translation Layer for NAND Flash Memory"; Computer Science Division: Korea Advanced Institute of Science and Technology (KAIST); EMSOFT '06 Seoul, Korea; pp. 161-170, Published by ACM, NY, NY USA.

Birrell et al., "A Design for High-Performance Flash Disks", ACM SIGOPS Operating Systems Review, vol. 41, Issue 2, pp. 88-93, Apr. 2007.

\* cited by examiner

412

1200

1300

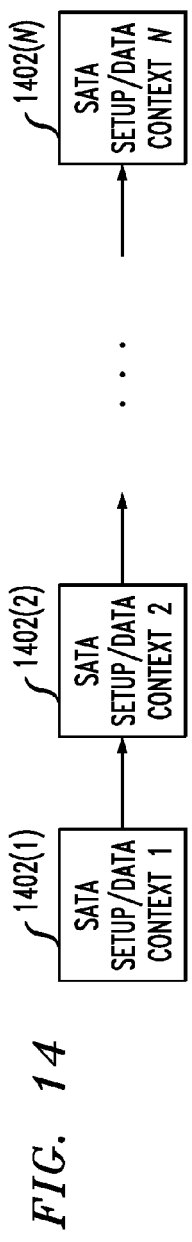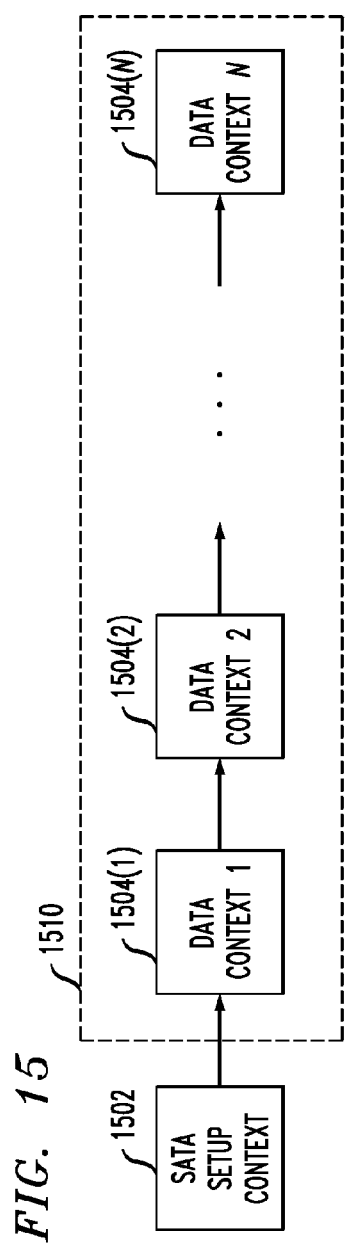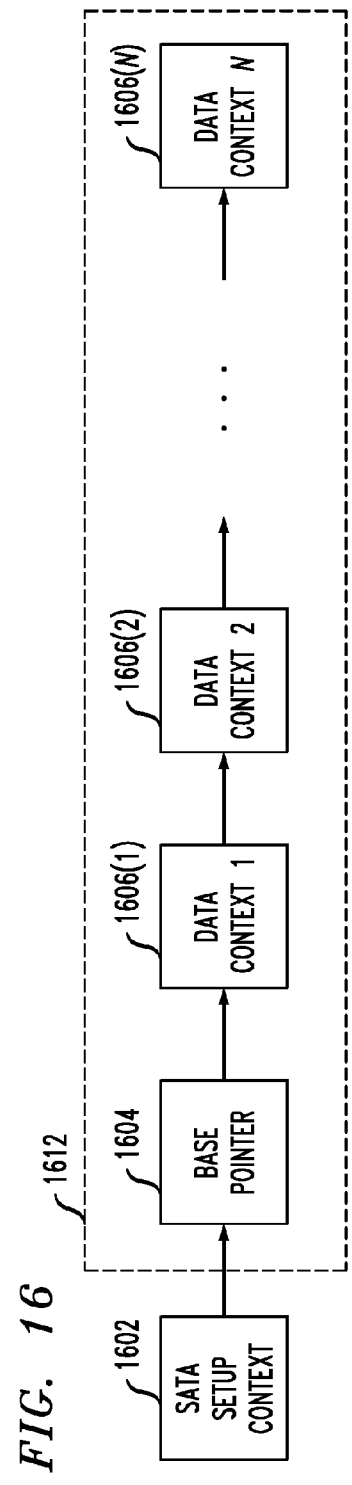
FIG. 14
FIG. 15
FIG. 16

1800

INTERRUPT QUEUING IN A MEDIA CONTROLLER ARCHITECTURE

CROSS-REFERENCE TO RELATED APPLICATIONS

This application claims the benefit of the filing date of U.S. provisional application No. 61/265,109 filed 30 Nov. 2009, the teachings of which are incorporated herein in their entireties by reference.

The subject matter of this application is related to U.S. patent application Ser. No. 12/436,227 filed 6 May 2009, Ser. No. 12/475,710 filed 1 Jun. 2009, Ser. No. 12/475,716 filed 1 Jun. 2009, Ser. No. 12/477,996 filed 4 Jun. 2009, Ser. No. 12/478,013 filed 4 Jun. 2009, Ser. No. 12/508,879 filed 24 Jul. 2009, Ser. No. 12/508,915 filed 24 Jul. 2009, Ser. No. 12/643,471 filed 21 Dec. 2009, Ser. No. 12/649,490 filed 30 Dec. 2009, Ser. No. 12/722,828 filed 12 Mar. 2010, Ser. No. 12/730,627 filed 24 Mar. 2010, Ser. No. 12/731,631 filed 25 Mar. 2010, Ser. No. 12/767,985 filed 27 Apr. 2010, Ser. No. 12/768,058 filed 27 Apr. 2010, Ser. No. 12/769,882 filed 29 Apr. 2010, Ser. No. 12/769,910 filed 29 Apr. 2010, Ser. No. 12/873,450 filed 1 Sep. 2010, Ser. No. 12/873,512 filed 1 Sep. 2010, Ser. No. 12/873,548 filed 1 Sep. 2010, Ser. No. 12/952,201 filed on 23 Nov. 2010, Ser. No. 12/952,205 filed on 23 Nov. 2010, Ser. No. 12/952,207 filed on 23 Nov. 2010, Ser. No. 12/952,200 filed on 23 Nov. 2010, and Ser. No. 12/952,202 filed on 23 Nov. 2010, the teachings of all of which are incorporated herein in their entireties by reference.

BACKGROUND OF THE INVENTION

1. Field of the Invention

The present invention relates to memory storage systems and, more specifically, to a host interface of a media controller.

2. Description of the Related Art

Flash memory is a type of non-volatile memory that is electrically erasable and re-programmable. Flash memory is primarily used in memory cards and USB flash drives for general storage and transfer of data between computers and other digital products. Flash memory is a specific type of electrically erasable programmable read-only memory (EEPROM) that is programmed and erased in large blocks. One commonly employed type of flash memory technology is NAND flash memory. NAND flash memory forms the core of the flash memory available today, especially for removable universal serial bus (USB) storage devices known as USB flash drives, as well as most memory cards. NAND flash memory exhibits fast erase and write times, requires small chip area per cell, and has high endurance. However, the I/O interface of NAND flash memory does not provide full address and data bus capability and, thus, generally does not allow random access to memory locations.

There are three basic operations for NAND devices: read, write and erase. The read and write operations are performed on a page by page basis. Page sizes are generally 2N bytes, where N is an integer, with typical page sizes of, for example, 2,048 bytes (2 kb), 4,096 bytes (4 kb), 8,192 bytes (8 kb) or more per page. Pages are typically arranged in blocks, and an erase operation is performed on a block by block basis. Typical block sizes are, for example, 64 or 128 pages per block. Pages must be written sequentially, usually from a low address to a high address. Lower addresses cannot be rewritten until the block is erased.

Other storage devices, such as conventional hard disk drives (HDDs), support additional disk-access operations, such as skip-write and skip-read. A skip operation is used for reading or writing relatively closely located, but non-contiguous, blocks on an HDD. The device requesting the skip-read or skip-write provides a starting logical block address (LBA), a length count of the number of blocks to read/write, and a skip mask. The skip mask comprises a number of bits where each bit in the mask corresponds to a block offset from the starting block address. A logic '1' bit in the skip mask signifies that the block corresponding to that bit position will be read/written. A logic '0' bit in the skip mask signifies that the block corresponding to that bit position will not be read/written and will be skipped. The length count comprises the total number of blocks to transfer, not the span of the request. Thus, the length count matches the total number of logic '1' bits in the skip mask. HDDs process skip commands at a media layer of the system, for example corresponding to a layer in the OSI ("Open Systems Interconnection") model. A skip operation is useful for reading or writing several non-contiguous memory locations without issuing separate requests and requiring additional revolutions of the HDD. Further, only the requested data is transferred to or from the HDD.

An HDD is addressed linearly by logical block address (LBA). A hard disk write operation provides new data to be written to a given LBA. Old data is over-written by new data at the same physical LBA. NAND flash memories are accessed analogously to block devices, such as HDDs. NAND devices address memory linearly by page number. However, each page might generally be written only once since a NAND device requires that a block of data be erased before new data is written to the block. Thus, for a NAND device to write new data to a given LBA, the new data is written to an erased page that is a different physical page than the page previously used for that LBA. Therefore, NAND devices require device driver software, or a separate controller chip with firmware, to maintain a record of mappings of each LBA to the current page number where its data is stored. This record mapping is typically managed by a flash translation layer (FTL) in software that might generate a logical-to-physical translation table. The flash translation layer corresponds to the media layer of software and/or firmware controlling an HDD.

For consumer applications, HDDs generally have data sectors that are sized in powers of two (e.g. 512 (29) bytes per sector). Flash memories structured with page sizes that are a multiple of the HDD sector size might efficiently work with the HDD system by storing multiple entire sectors in a page (e.g. a 4096 byte page can store eight 512 byte sectors). However, enterprise-based HDD systems generally do not use sectors sized by powers of two, but use larger sectors, generally either 520 or 528 bytes per sector instead of 512 bytes.

For write operations, NAND devices store the new data for the LBA on a new page, unlike hard disk drives (HDDs) that can rewrite individual physical sectors. Thus, a NAND device generally requires that a block be erased before new data can be written to the block. Further, as described above, often a NAND device will write new data for a given LBA to an erased page that is a different physical page from the page previously used for that LBA. Thus, NAND devices also generally require the device driver software or the separate controller chip periodically initiate a process to erase data that is "stale" or out-of-date. However, NAND device blocks can be erased relatively few times before device failure (typically on the order of 100,000 erasures). Therefore, over the operational life of an SSD, blocks of flash memory will fail and become unusable.

Storage device controllers generally interface with one or more host devices via one of various host computer interface protocols such as, for example, Serial Advanced Technology Attachment (SATA), in accordance with the Serial ATA 2.6 Specification (February 2007), hereinafter, "SATA protocol", available from Serial ATA International Organization, and Serial Attached Small Computer System Interface (SAS), in accordance with Serial Attached SCSI 1.1 (SAS-1.1, ANSI INCITS 417-2006), hereinafter, "SAS protocol", available from the InterNational Committee for Information Technology Standards (INCITS).

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a media controller for servicing contexts corresponding to data transfer requests from host devices. The media controller includes a context generator for generating contexts corresponding to the data transfer requests and a buffer for storing one or more context pointers, each pointer corresponding to a context and an action by a system module associated with the context. A context processor is configured to complete a context when the action by a media controller module associated with the context is complete, remove each pointer from the buffer associated with the completed context, and determine whether an interrupt corresponds to the completed context and removed pointer. If no interrupt corresponds to the completed context, the completed context is cleared. If an interrupt corresponds to the completed context, the interrupt is provided to a master processor and a completed context recycler for recycling the completed context pointer to the context generator.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 14 shows a block diagram of exemplary contexts for a SATA data transfer in a media controller operating in accordance with embodiments of the present invention;

FIG. 15 shows a block diagram of contexts that align to chunk boundaries of data stored in a media system operating in accordance with embodiments of the present invention;

FIG. 16 shows a block diagram of one or more data contexts generated independently of a context buffer of a media controller, in accordance with embodiments of the present invention;

DETAILED DESCRIPTION

Figure 1:
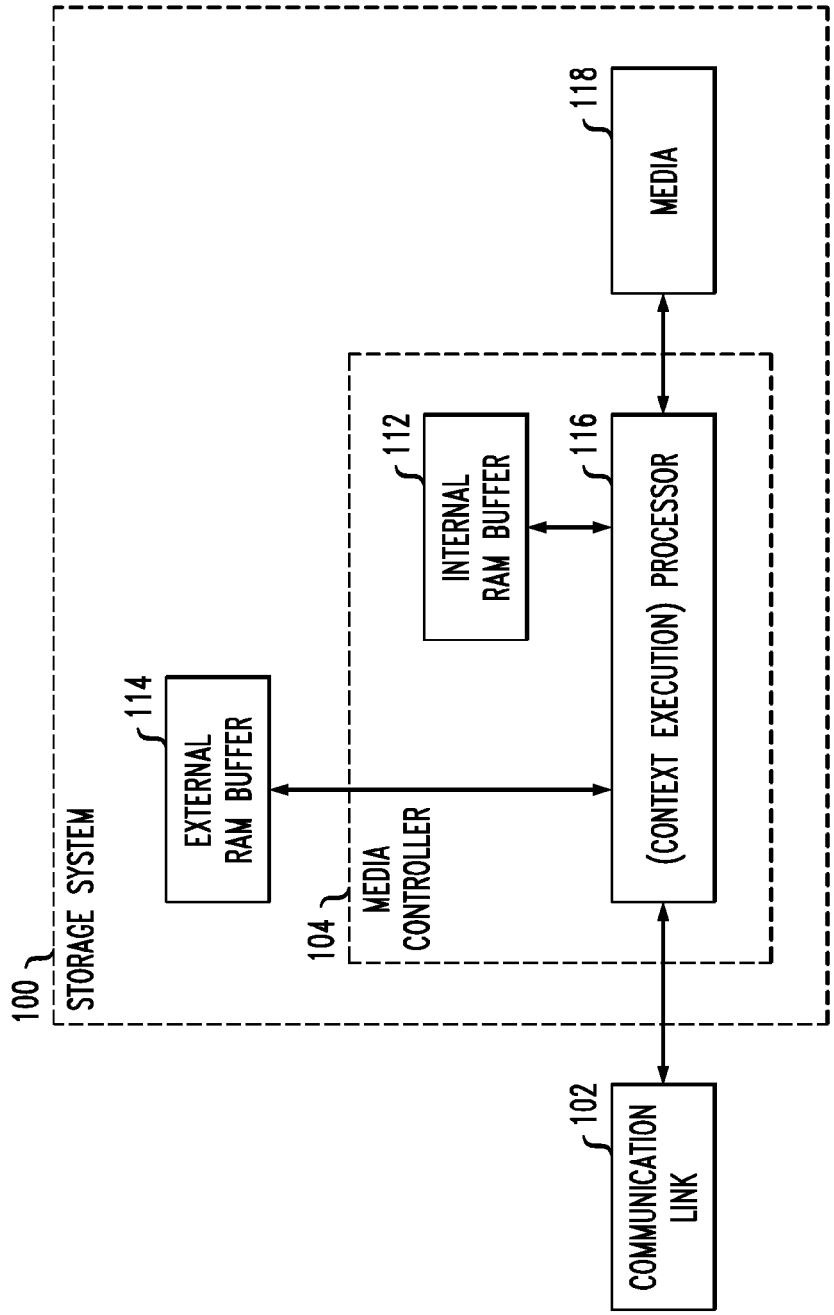
FIG. 1 shows a block diagram of a memory storage system, in accordance with embodiments of the present invention.

As described herein, embodiments of the present invention provide a media controller for servicing contexts corresponding to data transfer requests from host devices. The media controller includes a context generator for generating contexts corresponding to the data transfer requests and a buffer for storing one or more context pointers, each pointer corresponding to a context and an action by a system module associated with the context. A context processor is configured to complete a context when the action by a media controller module associated with the context is complete, remove each pointer from the buffer associated with the completed context, and determine whether an interrupt corresponds to the completed context and removed pointer. If no interrupt corresponds to the completed context, the completed context is cleared. If an interrupt corresponds to the completed context, the interrupt is provided to a master processor and a completed context recycler for recycling the completed context pointer to the context generator.

Table 1 defines a list of acronyms employed throughout this specification as an aid to understanding the described embodiments of the present invention:

tional external memory, shown as external RAM buffer 114. In an exemplary embodiment, internal RAM buffer 112 comprises 128 kB of static RAM (SRAM) and external RAM buffer 114 comprises 512 MB of double data rate version 2 dynamic RAM (DDR2 DRAM). RAM buffer 112 might act as a cache for processor 116, while RAM buffer 114 might act as a read/write buffer between media 118 and communication link 102.

Although shown in FIG. 1 as a single media device, media 118 might be implemented as one or more storage media. For example, media 118 might be implemented as an SSD including one or more physical flash silicon dies. In some embodiments, host requests might be striped across two or more of the dies, analogously to hard drives in a redundant array of independent disks (RAID), to provide parallel execution. In other embodiments, each flash die might be configured as a separate, stand-alone flash memory device without data striping. Similarly, media 118 might be implemented as one or

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | CRC | Cyclic Redundancy Check |
| SAS | Serial Attached SCSI | DIF | Data Integrity Field |
| PCI-E | Peripheral Component Interconnect Express | PWT | Pending Write Table |
| SoC | System-on-Chip | FIS | File Information Structure |
| RAM | Random Access Memory | SOF | Start-of-Frame |
| HDD | Hard Disk Drive | EOF | End-of-Frame |
| SSD | Solid State Disk | FPDMA | First Party DMA |
| LLD | Low Level Driver | AIG | Automatic Instruction Generation |
| LBA | Logical Block Address | NAIG | Non-Automatic Instruction Generation |
| BAM | Buffer Allocation Module | MFG | Manual Frame Generation |
| DMA | Direct Memory Access | PIO | Programmed Input/Output |
| GDMA | Generic DMA | NCQ | Native Command Queuing |
| B-C | Buffer-Client | CCM | Consumed Context Manager |
| RXDP | Receive Data Path | CFPM | Context Free Pointer Manager |
| TXDP | Transmit Data Path | CCQ | Consumed Context Queue |
| EDP | Encryption Data Path | ILT | Initiator Lookup Table |
| CAM | Content Addressable Memory | WWN | World Wide Name |
| RAID | Redundant Array of Independent Disks | ICT | Initiator Connection Tag |

FIG. 1 shows a block diagram of a media controller operating in accordance to embodiments of the present invention. As shown, memory storage system 100 is electrically coupled to communication link 102. Memory storage system 100 includes media controller 104, external RAM buffer 114, and media 118. Media 118 might be implemented as a Solid State Disk (SSD), Hard Disk Drive (HDD) or hybrid magnetic and solid state storage system. Communication link 102 is employed for communication with one or more external devices, such as a computer system or networking device, which interface with memory storage system 100. Communication link 102 might be a custom-designed communication link, or might conform to a standard communication protocol such as, for example, Small Computer System Interface ("SCSI"), Serial Attached SCSI ("SAS"), Serial Advanced Technology Attachment ("SATA"), Universal Serial Bus ("USB"), Fibre Channel ("FC"), Ethernet, IEEE 802.11, IEEE 802.15, IEEE 802.16, Peripheral Component Interconnect Express (PCI-E), or any other similar interface for connecting a peripheral device to a host device.

Media controller 104 controls transfer of data between media 118 and an external device coupled to communication link 102. Media controller 104 might be implemented as a system-on-chip (SoC). Media controller 104 might include internal RAM buffer 112 and might also be coupled to additional external memory, shown as external RAM buffer 114. more physical drives, which might be implemented as at least one of an SSD, HDD, or a hybrid magnetic and solid state storage system.

Although shown in FIG. 1 as a single processor, processor 116 might be implemented by multiple processors. For example, end users of media controller 100 might require higher or lower performance depending on their intended application. The performance requirements might affect the type of processors employed in the SoC, or the number of processors employed in the SoC. For example, a lower performance media controller operating in accordance with the SATA protocol might employ a single ARM Cortex M3 processor while a higher performance media controller operating in accordance with the SAS protocol might employ three ARM Cortex R4 processors (ARM Cortex processors are by ARM Holdings, plc, Cambridge, UK). Processor 116 includes software and/or firmware as needed for operation. For embodiments having multiple processors, inter-processor communication might be employed, such as described in related U.S. patent application Ser. No. 12/436,227, filed May 6, 2009.

Figure 2:
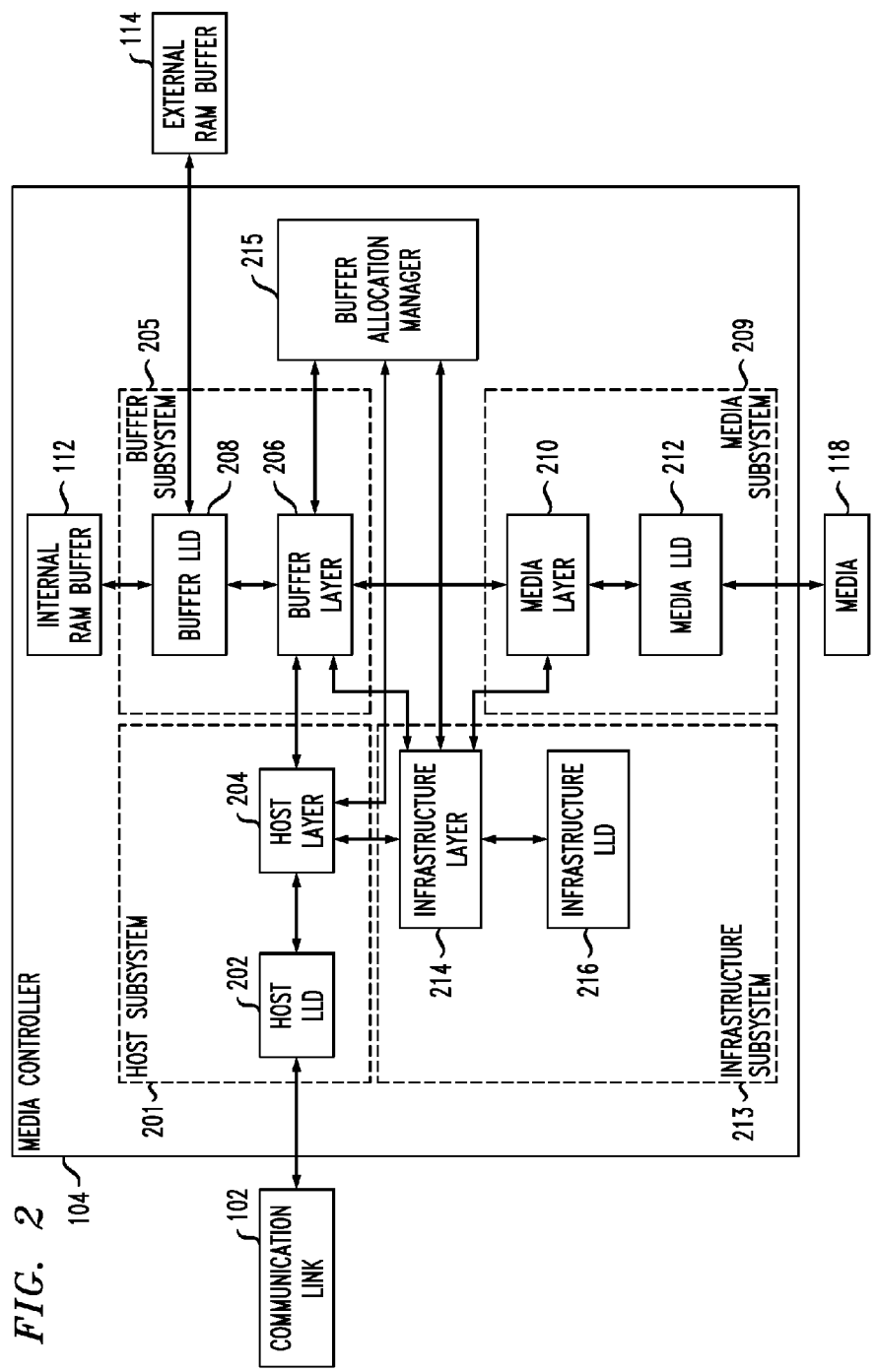
FIG. 2 shows a functional block diagram of sub-modules employed by the memory storage system of FIG. 1, in accordance with embodiments of the present invention.

FIG. 2 shows an exemplary functional block diagram of sub-modules implemented as software, hardware, or some combination thereof, within processor 116 of media controller 104. As shown in FIG. 2, media controller 104 might employ one or more functional modules, separating low-level hardware-specific signal and timing requirements from the higher-level functionality of the controller as a whole. The modules might include Application Programming Interfaces (APIs), which are protocols or formats used by software to communicate, via hardware communication links, between sub-applications within the software. As shown, embodiments of media controller 104 might include five main modules: host subsystem 201, buffer subsystem 205, media subsystem 209, infrastructure subsystem 213 and buffer allocation module (BAM) 215. Additionally, one or more of the main modules within media controller 104 might be partitioned into a high level module (e.g., host layer 204, buffer layer 206, media layer 210, and infrastructure layer 214) and a low level process module (e.g., host LLD 202, buffer LLD 208, media LLD 212, and infrastructure LLD 216).

In operation, for example, media controller 104 might receive requests for media access from external devices, such as requests for read or write operations, from communication link 102. Such requests for access to media 118 generally include at least one logical block address (LBA) where data should be read or written. For example, the requests could be to read from or write to a i) single media address, ii) a group of contiguous media addresses, or iii) a group of non-contiguous media addresses. Received requests are processed by host subsystem 201. In general, host layer 204 might process higher level host operations (e.g., host command handlers) and host LLD 202 might process lower level host operations (e.g., parsing host commands to the host layer). Commands accessing a group of non-contiguous media addresses might be processed such as described in related U.S. patent application Ser. No. 12/508,915, filed Jul. 24, 2009. One or more received commands might be queued or tracked as described in related U.S. patent application Ser. No. 12/649,490, filed Dec. 30, 2009.

Media subsystem 209 translates the LBA into a physical address of the desired data, for example as described in related U.S. patent application Ser. No. 12/643,471, filed Dec. 21, 2009, Ser. No. 12/769,910, filed Apr. 29, 2010 and Ser. No. 12/769,882, filed Apr. 29, 2010. Media subsystem 209 interfaces with buffer subsystem 205. Media layer 210 might process higher level media operations (e.g., logical-to-physical address translation), while media LLD 212 might process lower level media operations (e.g. media hardware-specific read/write/erase). Media layer 210 also might enable error recovery and wear-leveling routines for media 118, such as described in related U.S. patent application Ser. No. 12/475,710, filed Jun. 1, 2009, Ser. No. 12/475,716, filed Jun. 1, 2009 and Ser. No. 12/508,879, filed Jul. 24, 2009. In embodiments of the present invention, media layer 210 might support enterprise system sector sizes (e.g., 520 or 528 bytes per sector instead of 512 bytes per sector), such as described in related U.S. patent application Ser. Nos. 12/477,996 and 12/478,013, both filed Jun. 4, 2009.

Since data transfers between communication link 102 and media 118 might be temporarily stored in buffer memory, buffer subsystem 205 generally directs the data traffic between host subsystem 201 and media subsystem 209. For example, if an external host (not shown) provides, via communication link 102, data to be written to media 118, buffer subsystem 205 might coordinate temporary storage of the data in buffer 114 until media subsystem 209 coordinates writing the data to media 118. Similarly, if the external host requests to read data from media 118, buffer subsystem 205 might temporarily store the data in buffer 114 until host layer 204 coordinates sending the data to the host via communication link 102.

In general, buffer layer 206 might process higher level buffer and cache operations (e.g., cache and buffer allocation), while buffer LLD 208 processes lower level buffer operations (e.g., RAM hardware-specific commands). Buffering of data might occur, for example, as described in related U.S. patent application Ser. No. 12/722,828, filed Mar. 12, 2010, Ser. No. 12/730,627, filed Mar. 24, 2010, and Ser. No. 12/731,631, filed Mar. 25, 2010. Infrastructure subsystem 213 might generally serve as an operating system for media controller 104, with infrastructure layer 214 performing higher level processing operations (e.g., operating system operations) and infrastructure LLD 216 performing lower level operating system operations (e.g., initialization, timers, interrupts).

As shown in FIG. 2, media controller 104 also includes Buffer Allocation Module (BAM) 215. As shown, BAM 215 is coupled to host layer 204, buffer layer 206, and infrastructure layer 214. In embodiments of the present invention, BAM 215 might be employed to provide acceleration and flexibility in managing one or more cache buffers in RAM buffers 112 and 114 and the transfer of information between host layer 204 and buffer layer 206. For example, BAM 215 might maintain cache management data that describes data blocks stored in a cache, the status of the data blocks stored in the cache (e.g., valid, dirty, etc.), the physical address of that data, and which modules of media controller 104 are accessing the data.

As will be described in greater detail below, BAM 215 might typically include i) a first control sequencer for host command and context processing and ii) a second control sequencer for buffer command and context processing. In general, a context is a data structure used within media controller 104 that specifies the information necessary to send or receive data (e.g., to send a data frame or frame information structure (FIS) on communication link 102, to perform direct memory access (DMA), etc.). Since both host subsystem 201 and buffer subsystem 205 might access the same cache data structures, BAM 215 includes an arbiter to arbitrate between the first and second control sequencers to guarantee access to cache entries. BAM 215 might be employed to perform cache lookup for a command to enhance performance or to process a command and generate a thread of contexts for that command. BAM 215 might also be employed to perform buffer allocation for a context or to modify fields in a context. Thus, BAM 215 provides flexibility in manipulating context threads, generating individual contexts, and allocating cache data in the buffer. BAM 215 will be described in greater detail with regard to FIGS. 12-16.

Figure 3:
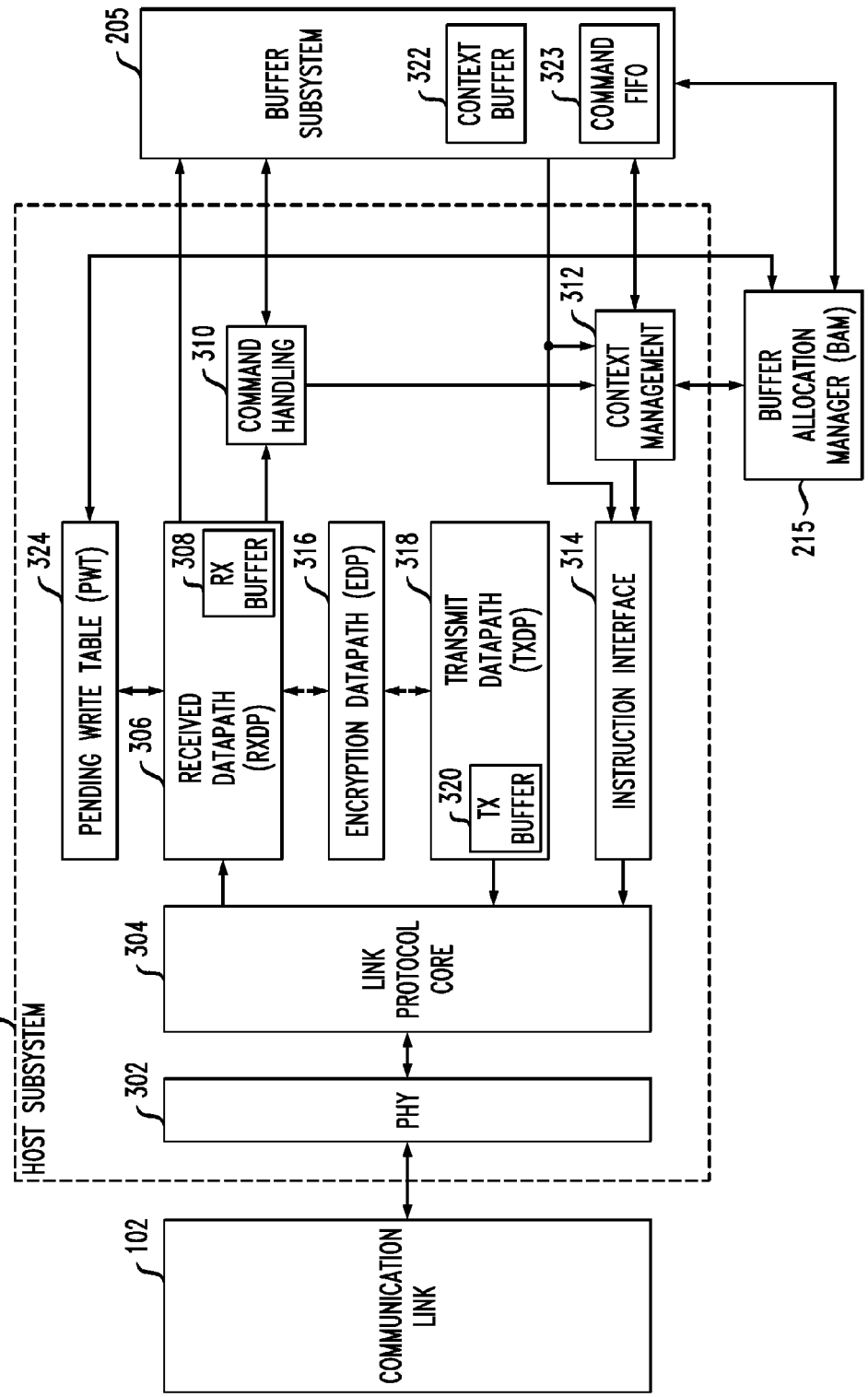
FIG. 3 shows a single-port functional block diagram of the host subsystem of FIG. 2, in accordance with embodiments of the present invention.

FIG. 3 shows greater detail of host subsystem 201. As shown, host subsystem 201 might typically include link physical layer (PHY) 302 and Link Protocol Core 304 for communication with communication link 102. Host subsystem 201 might receive data and commands from host devices coupled to communication link 102, with PHY 302 providing an interface to the physical transmission media employed by communication link 102 and Link Protocol Core 304 controlling the operation of PHY 302 and formatting data into frames in accordance with the protocol employed by communication link 102.

Receive Data Path (RXDP) 306 receives incoming data from communication link 102 via link protocol core 304. RXDP 306 routes incoming data to i) buffer subsystem 205 (e.g., incoming user data might be temporarily stored in a buffer before being written to media 118) or ii) other internal modules of host system 201 (e.g., command handling module 310). RXDP 306 might include buffer 308 for synchronizing data between the timing requirements of link protocol core 304 and the timing requirements of host subsystem 201. For example, data might be sent in frames for a given link protocol, and RXDP 306 might reorganize the framed data into data blocks for further processing within media controller 104. RX buffer 308 might be sized to support required bandwidth for both the link protocol and the internal communications within media controller 104. Buffer subsystem 205 includes context buffer 322. Context buffer 322 might be implemented as one or more first-in, first-out (FIFO) linked lists for queuing contexts.

Encryption Data Path (EDP) 316 might perform i) encryption of data received by media controller 104 for storage on media 118, and ii) decryption of data stored on media 118 for transmission over communication link 102. EDP 316 might be implemented as a pipeline stage in Transmit Data Path (TXDP) 318 such that a first segment of decrypted data is provided from TXDP 318 to Link Protocol Core 304 while a next segment of data is decrypted by EDP 316. EDP 316 might employ any suitable encryption methodology such as the Advanced Encryption Standard (AES), defined in Federal Information Processing Standard (FIPS) Publication 197. EDP 316 might also employ key management such as described in related U.S. patent application Ser. Nos. 12/767,985 and 12/768,058, both filed Apr. 27, 2010.

TXDP 318 transfers outgoing data from media controller 104 to communication link 102 via link protocol core 304. Similarly as RXDP 306, TXDP 318 might include buffer 320 for synchronizing data between the timing requirements of host subsystem 201 and the timing requirements of link protocol core 304. Further, TXDP 318 might include a pre-fetch engine for loading data for a next context into TX buffer 320 while link protocol core 304 is transmitting data for a previous context, to transfer data for multiple contexts without gaps of idle time in link protocol core 304 (and communication link 102). Although shown in FIG. 3 as being a single-port system, such as for SATA devices, having a single link protocol core, a single RXDP and a single TXDP, embodiments of the present invention, such as for SAS devices, might include dual link protocol cores, dual RXDPs and dual TXDPs to support 2-port communication. Such embodiments will be described subsequently in regard to FIGS. 21-23.

As shown in FIG. 3, host subsystem 201 performs three main functions: i) transferring data between link protocol core 304 and buffer subsystem 205, ii) processing received protocol commands (e.g., by command handling module 310), and iii) managing and processing contexts corresponding to data transfers (e.g., by context management module 312). Command handling module 310 might typically verify a received command and normalize the received command (e.g., from a protocol-specific format to a normalized format) and convert the command into one or more contexts for processing by media controller 104. For example, Link Protocol Core 304 might provide SATA or SAS command frames to command handling module 310, and command handling module 310 might then perform checks on the frame. Context management module 312 might typically i) execute a thread of contexts corresponding to a data transfer, ii) manage context pointer lists to provide fast context loading, and iii) generate interrupts based on the contexts. Instruction interface 314 might typically process a transmit context to determine a corresponding protocol instruction and convert the context into the specific protocol instruction for Link Protocol Core 304. Instruction interface 314 will be described in greater detail in regard to FIG. 9.

Pending Write Table (PWT) 324 maintains a list of active write commands to media 118. As shown, RXDP 306 is in communication with PWT 324 to provide PWT 324 with data corresponding to one or more active write commands in host subsystem 201. For example, RXDP 306 might provide one or more write contexts corresponding to each active write command. A write context corresponds to a data stream being transferred to media controller 104 for storage on media 118. The active write contexts might be stored in buffer subsystem 205, for example, context buffer 322. In embodiments of the present invention, PWT 324 is implemented as one of a RAM memory or a register file. RXDP 306, Transmit Data Path (TXDP) 310, Command Handling module 310, Context Management module 312, and Pending Write Table 324 might generally provide a context processing pipeline for host subsystem 201.

Figure 4:
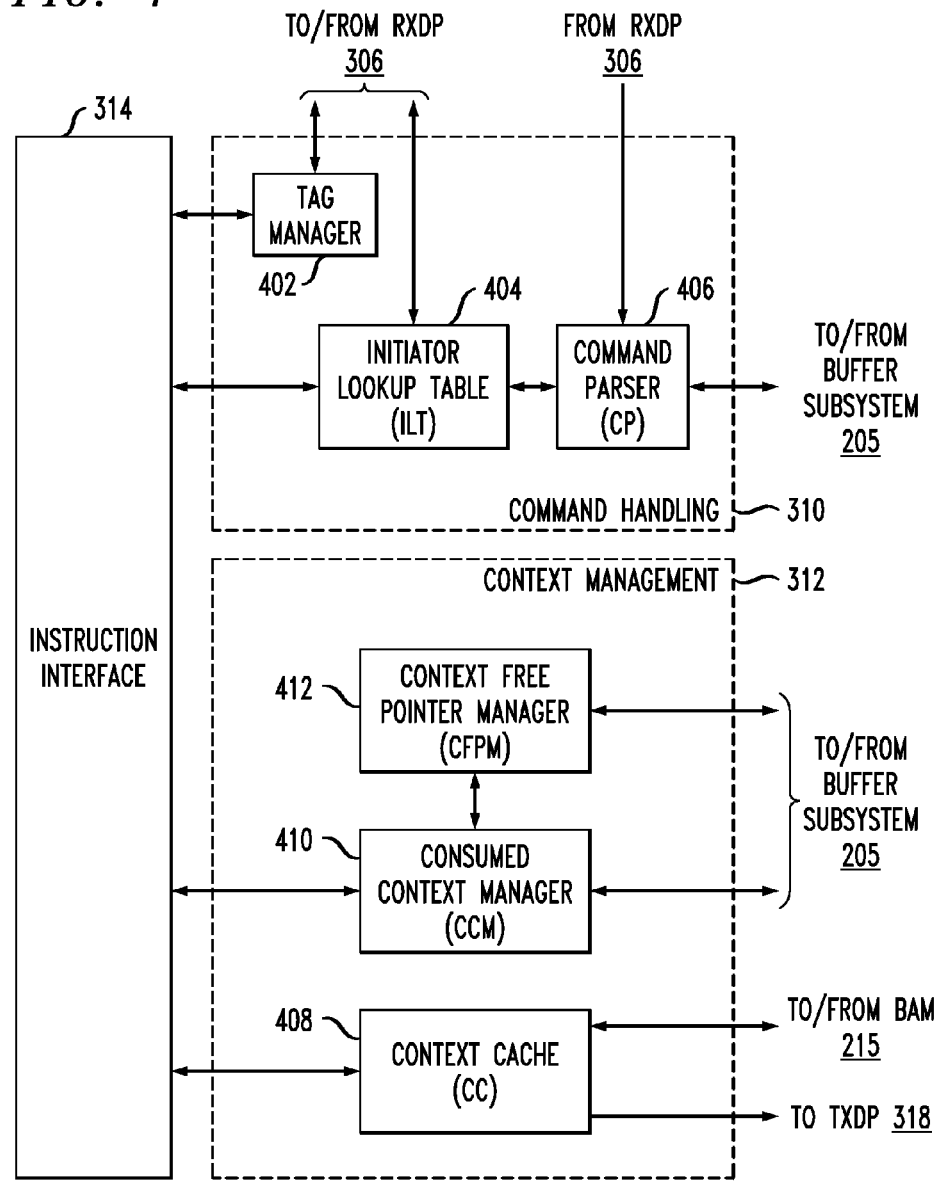
FIG. 4 shows additional detail of the command handling and context management modules of FIG. 3, in accordance with embodiments of the present invention.

FIG. 4 shows greater detail of command handling module 310 and context management module 312. As shown in FIG. 4, command handling module 310 includes Tag Manager 402, Initiator Lookup Table (ILT) 404 and Command Parser (CP) 406.

Command Parser 406 receives host commands from RXDP 306 and provides one or more contexts to perform the command. New contexts might typically be added to the tail end of an active context queue, which might be one of a plurality of linked lists stored in buffer subsystem 205. Each linked list has a corresponding a read and write pointer. In operation, CP 406 might receive a host command (e.g., a SATA or SAS command) from i) RXDP 306 if there are no commands queued in command FIFO 323, or ii) the head of command FIFO 323 if one or more commands are queued. CP 406 tracks the read and write pointers of the active command queue and might be configured to automatically load a next command from RX Buffer 308 when the read and write pointers are not equal. The command is loaded to a command register of CP 406, and might be rewritten in a normalized format. For example, control fields that might vary depending on the host protocol, such as starting LBA and transfer length, might be placed in common command fields. CP 406 might generate an interrupt when a valid and normalized command is ready to be parsed so as to generate one or more contexts in one or more context registers of CP 406. The one or more contexts correspond to one or more data transfers internal to media controller 104 to perform the received host command. Once the corresponding one or more contexts are generated, CP 406 clears the host command from the command register to allow a next host command to be loaded and processed.

Parallel context generation might generally performed by Command Parser 406. As described herein, command parser 406 might generate one or more contexts to satisfy a received command. These contexts might be stored in two or more sets of context registers to store contexts in parallel. In embodiments of the present invention, one set of context registers are reserved for high priority command processing while the other set of context registers are employed for normal command processing. While a command is being processed, an interrupt might be generated for processor 116 to process a subsequent received command that is a higher priority command. For example, a high priority interrupt might be generated when a media-side operation completes and a requested data transfer is available in buffer subsystem 205. Processing is switched to the high priority interrupt and a context is generated for that routine in the high priority context registers, without disturbing the contexts for the normal command, which are stored in one of the other parallel set of registers. Thus, command parser 406 returns to the previous command processing routine without requiring a large firmware stack for contexts, because the state of the current context generation process is separately saved in parallel registers. This parallel context structure allows processor 116 to handle the interrupt and generate contexts for the high priority command without disturbing command processing for the lower priority command.

ILT 404 is typically used for the enterprise applications to store information for one or more SAS initiators in communication with media controller 104. ILT stores a 64-bit World-Wide Name (WWN) of one or more initiators with active connections to media controller 104, the 16-bit Initiator Connection Tag (ICT) corresponding to the active connection, and a count of the number of commands outstanding from each initiator. The WWN is a 64-bit globally unique identifier assigned to a SAS device by its manufacturer that uniquely identifies each SAS device. The ICT is a 16-bit number sent to media controller 104 by the SAS initiator. The ICT might be included by media controller 104 in responses to the SAS initiator, such that the SAS initiator can identify media controller 104. Each initiator WWN and ICT might be converted to an ILT ID that is included in each context for the command to reference back to the corresponding initiator information in ILT 404.

Embodiments of the present invention provide 8 entries in ILT 404 to support 8 concurrent initiators. If another initiator establishes a connection beyond the maximum of 8 cached in ILT 404, the new initiator might, for example, receive a Task Set Full or Busy response status, and a connection would be denied. Alternatively, embodiments of the present invention might replace an entry in ILT 404 with the new initiator, for example, if a cached initiator had no outstanding commands with media controller 104. For example, when RXDP 306 receives a command, RXDP 306 checks ILT 404 for the initiator. The 64-bit WWN is checked on each connection when receiving commands. If the WWN is cached in ILT 404, the ILT ID is provided, along with a command tag, to Tag Manager 402. If the initiator is already in communication with media controller 104, RXDP 306 increments the command count in ILT 404 corresponding to that initiator. When processing of that command is complete, for example when instruction interface 314 sends the response for the command, instruction interface 314 decrements the command count in ILT 404 corresponding to that initiator.

ILT 404 also provides an overall SAS command queue counter to track the overall maximum queue depth of media controller 104 to indicate TASK SET FULL or BUSY when a new command is received. The overall maximum queue depth is maximum number of active commands allowed be media controller 104. As described herein, for embodiments of the present invention, the maximum queue depth of media controller 104 might be 128 active commands. Typically, BUSY status indicates that ILT 404 cannot accept the new command because of a temporary hardware restriction, such as command FIFO 323 being full. When an initiator receives a BUSY indication, the initiator might try to send the same command again later. Typically, TASK SET FULL status indicates that a given initiator has reached the hardware limit of active commands for that particular initiator. When an initiator receives a TASK SET FULL indication, the initiator might reduce its queue depth to avoid going over the limit of active commands for media controller 104.

Figure 5:
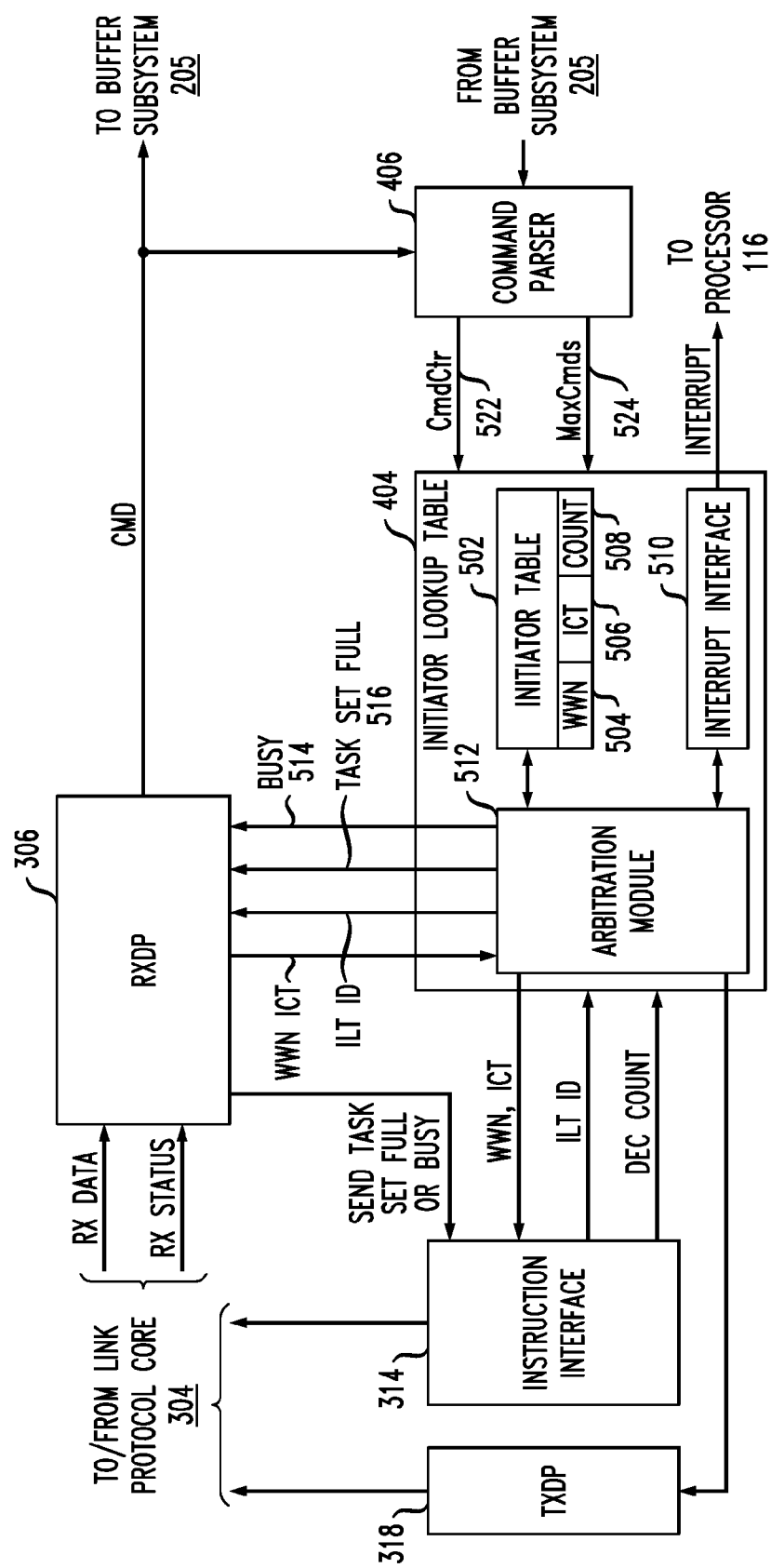
FIG. 5 shows additional detail of the initiator lookup table of FIG. 4, in accordance with embodiments of the present invention.

FIG. 5 shows greater detail of ILT 404. As shown in FIG. 5, ILT 404 includes initiator table 502, interrupt interface 510 and arbitration module 512. When a command is received from a SAS initiator via RXDP 306, ILT 404 stores information about the initiator in initiator table 502. As described herein, the information stored in initiator table 502 corresponds to one or more SAS initiators that have commands active in media controller 104, and includes, for example, the WWN of each SAS initiator (WWN 504), an initiator connection tag (ICT) of each SAS initiator (ICT 506), and a count of the number of active commands for each SAS initiator (count 508). In exemplary embodiments, initiator table 502 maintains information for up to 8 active SAS initiators. The WWN and ICT for each initiator might be converted to an ILT ID, which might be the index of initiator table 502. The ILT IDS is employed in contexts of media controller 104 rather than employing the full initiator information stored in initiator table 502 in the contexts.

Upon receiving a command from a SAS initiator, RXDP 306 checks ILT 404 to determine whether sufficient resources exist to handle the command. If resources do not exist, then RXDP 306 rejects the command by transmitting a response of either a TASK SET FULL or BUSY frame via instruction interface 314. As shown in FIG. 5, when a SAS command is received, RXDP 306 provides the WWN and the ICT to ILT 404. ILT 404 checks the received WWN against the entries stored in initiator table 502. If the received WWN is not already stored in initiator table 502, and there is space available in the table, the received WWN is added to initiator table 502 in the first available location, along with the input ICT and count is set to 1 for the received command (shown as entries 504, 506 and 508). If the received WWN is already stored in initiator table 502, then the existing entry for the initiator is used and the count entry is incremented to reflect the additional command. ILT 404 returns the ILT ID number, shown as 518, to RXDP 306, and the ILT ID is stored in the one or more contexts corresponding to the command.

If all entries in initiator table 502 are occupied by other initiators, and each entry has an active command count greater than 0, then ILT 404, via interrupt interface 510, might generate an interrupt to processor 116. RXDP 306 might queue the received command until after the interrupt is processed. If the initiator table or command FIFO 323 is full, ILT 404 might respond to RXDP 306 with a BUSY message, shown as signal 514, to indicate to the initiator that media controller 104 is busy and cannot yet receive the command. When a given initiator reaches its maximum allowed commands, ILT 404 might respond to RXDP 306 with the TASK SET FULL message, shown as signal 516, to indicate to the initiator that media controller 104 cannot yet receive another command from that initiator. After the BUSY or TASK SET FULL status is determined, RXDP 306 might then discard the received command.

ILT 404 also might be accessed by instruction interface 314 before the instruction interface issues a SAS instruction to link protocol core 304. As shown in FIG. 5, ILT 404 provides instruction interface 314 with WWN 504 and ICT 506. Instruction interface 314 might provide data to ILT 404 as commands are completed, for example, as shown, instruction interface 314 might provide the ILT ID number of the completed command and might request that ILT 404 decrement the count of active commands for the corresponding initiator in initiator table 502.

As described herein, resource availability might typically be determined based upon the total number of commands that have been received and a maximum number of commands allowed in the system, the maximum queue depth. Embodiments of the present invention might alternatively make this determination based upon i) a minimum number of commands per initiator, which prevents any single initiator from being locked out while a different initiator consumes all available resources, ii) a maximum number of commands per initiator, which balances available resources between initiators, and iii) the maximum queue depth of all allowed commands in the system. Embodiments of the present invention also provide that the number of active initiators is programmable, and that the minimum and maximum number of commands per initiator and the maximum queue depth, are also programmable. The number of allowed commands per initiator is based upon the total number of initiators supported, and the total resources available within media controller 104. If a smaller number of initiators are supported, then more resources are made available to each initiator, if appropriate. Resources might be dynamically re-allocated depending upon system characteristics.

For example, during initialization of media controller 104, ILT 404 might be set to track information for up to 8 initiators, and the maximum queue depth might be set to 128 total active commands. When 8 initiators are supported, the minimum number of commands per initiator might typically be set in the range between 1 and 4 commands. The maximum number of commands per initiator might typically be set in the range between 32 and 96 commands. In a specific example, the minimum number of commands per initiator is set to 1, and the maximum number of commands per initiator is set to 64. In this case, the maximum queue depth might be set to 122, which would allow a first initiator to use its maximum of 64 commands, and a second initiator to use a maximum of 58 commands, while allowing each of the remaining 6 initiators 1 command up to the maximum 128 active commands. Thus, each of the 8 initiators would allowed at least the minimum 1 active command after the first two imitators have each attempted to use their maximum number of commands. Further, the total number of commands accepted remains within the allowed maximum of 128 active commands.

As a second example, ILT 404 might be set to track information for two initiators, and an interrupt is generated if a command from a third initiator is received. Again, the maximum queue depth might be 128 commands. Since only two initiators are stored in initiator table 502, the minimum number of commands per initiator might be set to a larger number, such as 24 commands. The maximum number of commands per initiator might then be set as 103 (to allow the minimum 24 commands to the other supported initiator). The total queue depth would be set to 128. The advantage in this example is that more resources are allocated for one or two initiators, but if commands for more than two initiators are received, an interrupt must be generated to allow the command for the third initiator to be received. To receive the command from the third initiator, values for the minimum number and maximum number of commands that are allowed for each initiator are desirably reconfigured during the interrupt processing. Embodiments of the present invention thus provide flexibility to dynamically allocate resources among different initiators during operation of media controller 104.

Figure 6:
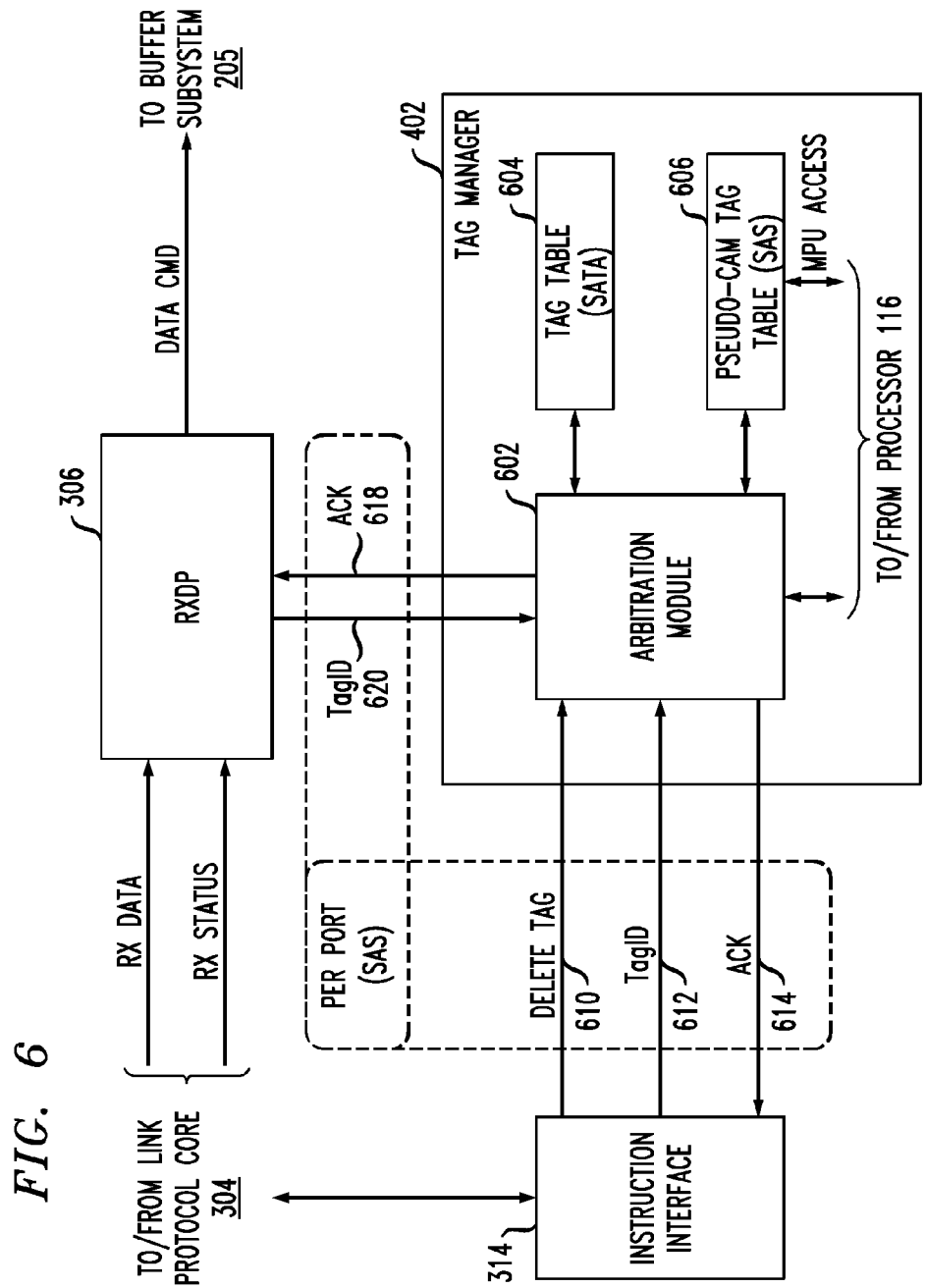
FIG. 6 shows additional detail of the tag manager of FIG. 4, in accordance with embodiments of the present invention.

Tag Manager 402 verifies a command tag used to identify active commands in media controller 104, for example in SATA systems with native command queuing or SAS systems with command queuing. Tag Manager 402 verifies that a new command tag does not overlap with a command tag that is currently active. When RXDP 306 receives a new command, RXDP 306 checks the command tag table of tag manager 402 before the command is moved out of RX Buffer 308 for processing. In embodiments of the present invention, Tag Manager 402 might support one host device with a limit of 32 active commands, for example, for SATA systems. In such embodiments Tag Manager 402 might be implemented as a tag table to support the 32 active commands. In other embodiments, Tag Manager 402 might support multiple host devices and deeper command queues, such as in a SAS system. In such embodiments Tag Manager 402 might be implemented as a Pseudo-CAM (content addressable memory) to support the larger and more complex tag memory. Such embodiments might support a maximum of 128 active SCSI Command Tags (which might be equal to the maximum queue depth of media controller 104). FIG. 6 shows greater detail of Tag Manager 402.

As shown in FIG. 6, tag manager 402 includes pseudo-CAM 606, which generally provides fast access for tag lookup without requiring a large external buffer in SAS systems having queued commands and multiple initiators. For SATA devices, a simpler tag table, 604, might be employed instead of pseudo-CAM 606. When a command is received, RXDP 306 checks a command tag of the corresponding command and provides the command tag to arbitration module 602. Arbitration module 602 generally manages access to tag manager 402 by processor 116, RXDP 306 and instruction interface 314. As indicated by the dashed lines, in a SAS system, arbitration module 602 might also arbitrate access to tag manager 402 between an instruction interface and an RXDP for a second port (not shown). Embodiments of the present invention having 2 ports will be described with regard to FIGS. 21-23

When a command is received, RXDP 306 requests access to tag manager 402 and provides the tag ID of the received command to arbitration module 602, as indicated by Tag ID signal 620. Arbitration module 602 provides the tag ID to the appropriate one of tag table 604 or pseudo-CAM 606 to perform a tag lookup. If the Tag ID does not exist in tag table 604 or pseudo-CAM 606, the tag ID is added to the table, and arbitration module 602 provides acknowledge signal 618 to RXDP 306. RXDP 306 then moves the received command from the RX Buffer 308, for example to buffer subsystem 205. As described herein, checking the command tag before a received command is moved from RX Buffer 308 simplifies error handling on tag error cases because processing of the received command is not yet started. If the received tag ID already exists in tag table 604 or pseudo-CAM 606, a tag overlap condition exists, and an interrupt is generated to processor 116 to perform additional processing to handle the error condition.

Instruction interface 314 might generally delete a command tag after sending the data corresponding to the received command. Instruction interface might send DELETE TAG signal 610 and TAG ID signal 612 to arbitration module 602. When arbitration module responds with ACK Signal 614 after the command tag has been deleted, instruction interface 314 might clear the related command contexts. In embodiments of the present invention, the number of stored command tags is equal to the current number of active commands (the command queue depth). As described herein, in some embodiments, a desired maximum command queue depth might be 128 (i.e., a maximum of 128 active commands supported).

Pseudo-CAM 606 might support one or more different hash algorithms. Different hash algorithms might be chosen to provide support for different numbers of active initiators and command queue depths for each initiator. Desirably, the hash algorithm distributes the initial search address across all addresses of pseudo-CAM 606. Embodiments of the present invention support 4 hash modes. Each hash mode provides an 8-bit output address. The first hash mode does not necessarily account for the initiator ID when searching pseudo-CAM 606, which might be preferred for single-initiator systems. The second hash mode might provide 1 bit of the 8-bit output to account for the initiator ID, which might be preferred for two initiator systems. Similarly, the third hash mode might provide 2 bits of the 8-bit output to account for the initiator ID, which might be preferred for four initiator systems, and the fourth hash mode might provide 3 bits of the 8-bit output to account for the initiator ID, which might be preferred for eight initiator systems. In exemplary embodiments, the first hash mode might employ the hash algorithm Hash=Tag ID[0: 7]; the second hash mode might employ the hash algorithm Hash={initiator ID[0], Tag ID[0:6]}; the third hash mode might employ the hash algorithm Hash={initiator ID[0:1], Tag ID[0:5]}; and the fourth hash mode might employ the hash algorithm Hash={initiator ID[0:2], Tag ID[0:4]}.

Pseudo-CAM 606 might generally include registers or memory locations to store the command tags in a tag table. Processor 116 might add or delete tags, or clear the entire table, using a control register. In embodiments of the present invention, each register or memory location is 32-bits. Within each 32-bit memory location, one or more bits might indicate a VALID status that, when set, includes that location in the pseudo-CAM search. When the VALID status is not set, the location is not included in the pseudo-CAM search. A second group of one or more bits might indicate a TAG COUNT that indicates a number of entries to be checked in the search. A third group of one or more bits might store the ILT ID number used to reference the SAS initiator. A fourth group of one or more bits might store the TAG ID representing the SCSI command tag. This general data structure is employed in performing tag searches when a new command is received by RXDP 306. The tag search operation is described in greater detail in regard to FIGS. 7 and 8.

Figure 7:
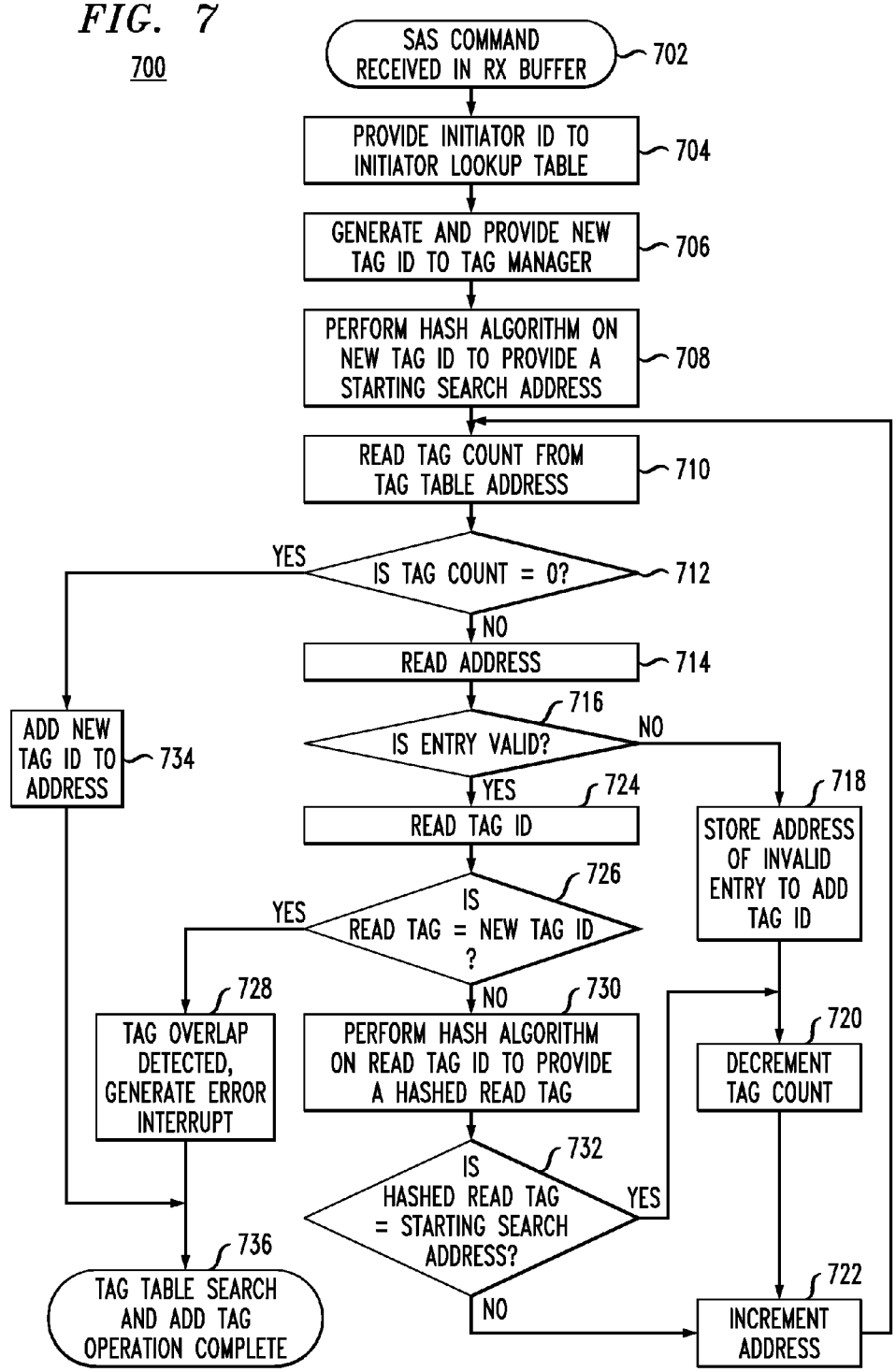
FIG. 7 shows a flow diagram of a command tag search algorithm for adding commands to the tag manager of FIG. 4, in accordance with embodiments of the present invention.

FIG. 7 shows a flow diagram of command tag search algorithm 700 for receiving a command and adding the command tag to tag manager 402. As shown, at step 702, a SAS command is received in RX Buffer 308. The SCSI Command Tag is parsed from the received command and is provided to RXDP 306. At step 704, RXDP 306 provides the Initiator ID (e.g., the initiator's WWN) to ILT 404. At step 706, the 64-bit WWN is encoded to an ILT ID used internally by media controller 104. The ILT ID and the 16-bit SCSI Command Tag are combined to form the tag ID, which is provided to tag manager 402.

At step 708, Tag Manager 402 performs a hash function to convert the tag ID to a starting search address of pseudo-CAM 606. At step 710, tag manager 402 reads TAG COUNT from the starting address location. As described, TAG COUNT provides the number of entries stored in the tag table that is searched to determine if a tag overlap exists. At step 712, if TAG COUNT is equal to zero, no tag overlap is detected and the search is complete. Algorithm 700 proceeds to step 734 and adds the new tag ID to pseudo-CAM 606. The new tag ID is stored in the first invalid entry of pseudo-CAM 606, which was stored at step 718. The TAG COUNT for this address of pseudo-CAM 606 is not changed. Once the tag ID is stored to pseudo-CAM 606, algorithm 700 completes at step 736. This algorithm minimizes the search depth since the entries for a hash are clustered by the starting hash address.

If the TAG COUNT is non-zero, the search continues at step 714. At step 714, the address is read from pseudo-CAM 606. At step 716, the VALID flag of the read address entry is checked. If the entry is not valid, and no other non-valid entry has been detected, at step 718 the address of the invalid entry is stored to add the tag ID, and processing continues to step 720. Thus, at step 718, the first invalid entry of pseudo-CAM 606 is found and its address stored. At step 720, the TAG COUNT is decremented. At step 722, the address of pseudo-CAM 606 is incremented and processing returns to step 710. At step 716, if the entry is valid, processing continues at step 724. At step 724, the tag ID stored at the address is read.

At step 726, Tag Manager 402 compares the read tag ID with the new tag ID. If the read tag ID matches the new tag ID, then at step 728 an overlap error is detected and an error interrupt is generated. The tag search is ended at step 736. If the read tag ID does not match the new tag ID, the process continues to step 730. At step 730, tag manager 402 performs the hash algorithm on the read tag ID and at step 732, the hashed read tag ID is compared with the starting search address (i.e. the hashed new tag ID). At step 732, if the hashed read tag ID matches the starting search address, the TAG COUNT is decremented at step 720. If the hashed read tag ID does not match the starting search address, TAG COUNT is unchanged and the address is incremented at step 722. The process continues until the TAG COUNT reaches zero or a tag overlap is detected.

Figure 8:
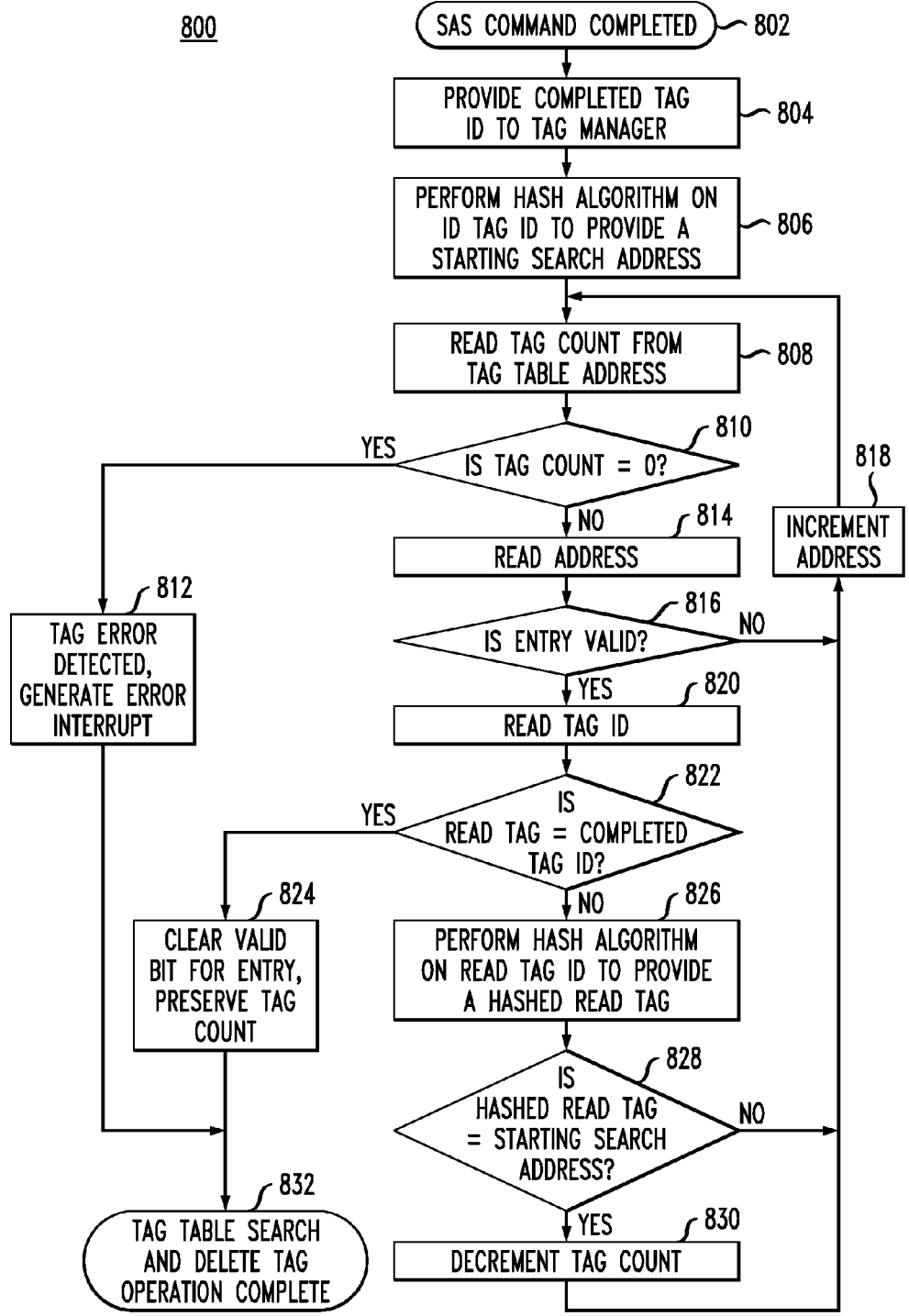
FIG. 8 shows a flow diagram of a command tag search algorithm for deleting a command tag from the tag manager of FIG. 4, in accordance with embodiments of the present invention.

FIG. 8 shows a flow diagram of command tag search algorithm 800 for completing a command and deleting the associated command tag from tag manager 402. At step 802, command tag search algorithm 800 is initiated when a SAS Command is completed by media controller 104 (i.e. when a SAS response frame is transmitted for the command). At step 804, the completed tag ID is provided to tag manager 402 to be removed from pseudo-CAM 606 and later reused by the SAS initiator. At step 806, tag manager 402 performs the hash function to convert the completed tag ID to a starting address of pseudo-CAM 606. At step 808, tag manager 402 reads the TAG COUNT corresponding to the address. The TAG COUNT determines how many addresses need to be searched to determine if a tag overlap exists.

At step 810, if the TAG COUNT is equal to zero, no entry matching the completed tag ID exists in pseudo-CAM 606. This is an error condition, since the tag ID should exist if it was completed, and thus no entry can be deleted. At step 812, the error condition is detected and an interrupt is generated. The tag search and deleted operation is ended at step 832. At step 810, if the TAG COUNT is non-zero, the search continues to step 814. At step 814, the address of pseudo-CAM 606 is read. At step 816 the entry valid bit is checked. If the entry is not valid, at step 818 the address of pseudo-CAM 606 is incremented and processing returns to step 808. If, at step 816, the entry is valid, processing continues to step 820.

At step 820, tag manager 402 reads the tag ID stored at the address in pseudo-CAM 606. At step 822, tag manager 402 compares the read tag ID with the completed tag ID. If the read tag ID matches the completed tag ID, then the proper entry has been located and processing proceeds to step 824. At step 824, tag manager 402 clears the valid bit for the entry, but preserves the TAG COUNT for that address of pseudo-CAM 606. The tag entry has been removed from future tag searches and is available to be reused for future commands. The process is complete at step 832.

If, at step 822, the read tag ID does not match the completed tag ID, the process continues to step 828. At step 828, tag manager 402 performs the hash algorithm on the read tag ID to provide a hashed read tag. At step 828, the hashed read tag is compared with the starting search address. If the hashed read tag matches the starting search address, at step 830 the TAG COUNT is decremented and the process continues to step 818. If, at step 828, the hashed read tag does not match the starting search address, the TAG COUNT unchanged and the process continues to step 818. The process continues until TAG COUNT reaches zero or a tag error is detected.

Figure 9:
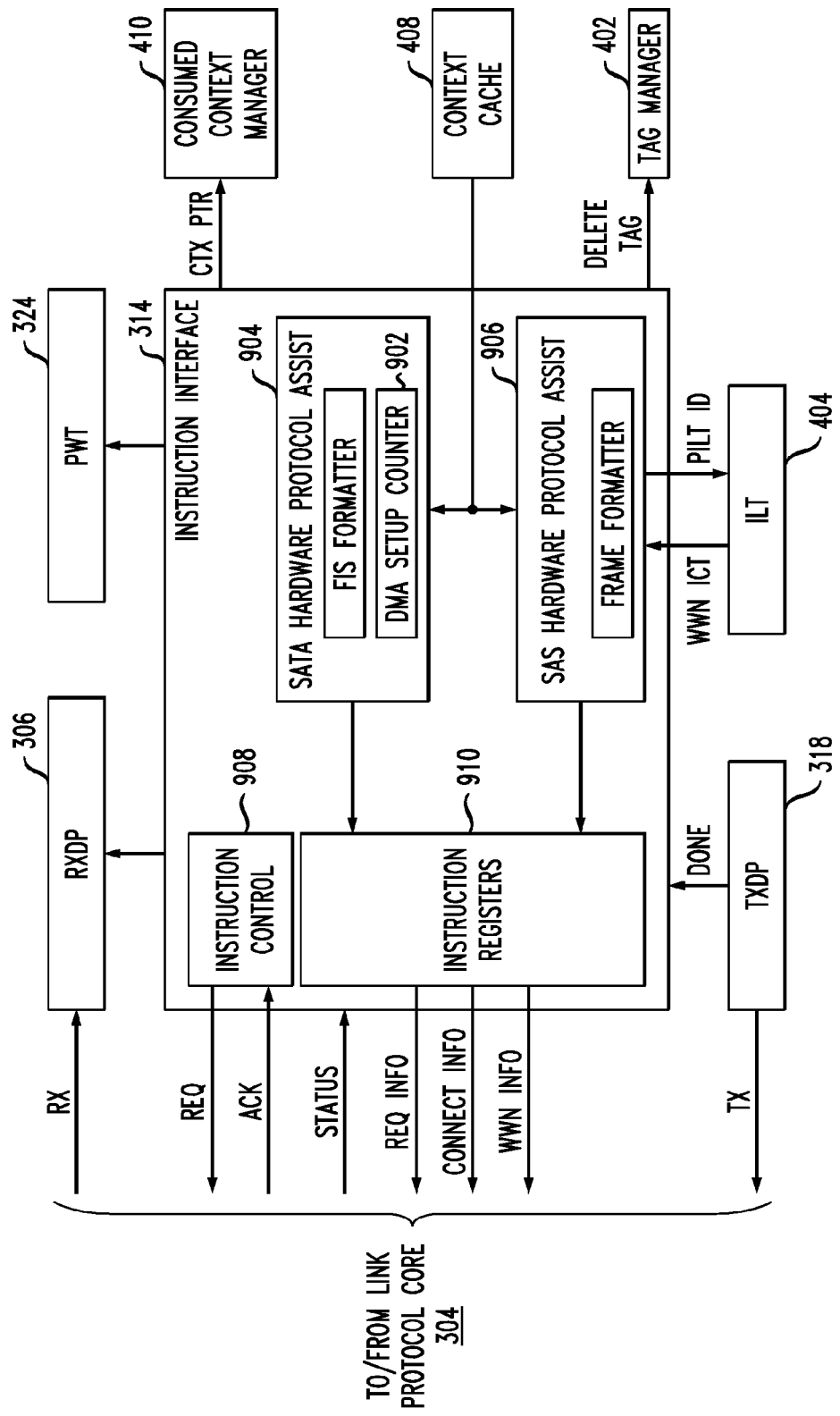
FIG. 9 shows additional detail of the instruction interface of FIG. 3, in accordance with embodiments of the present invention.
Figure 28:
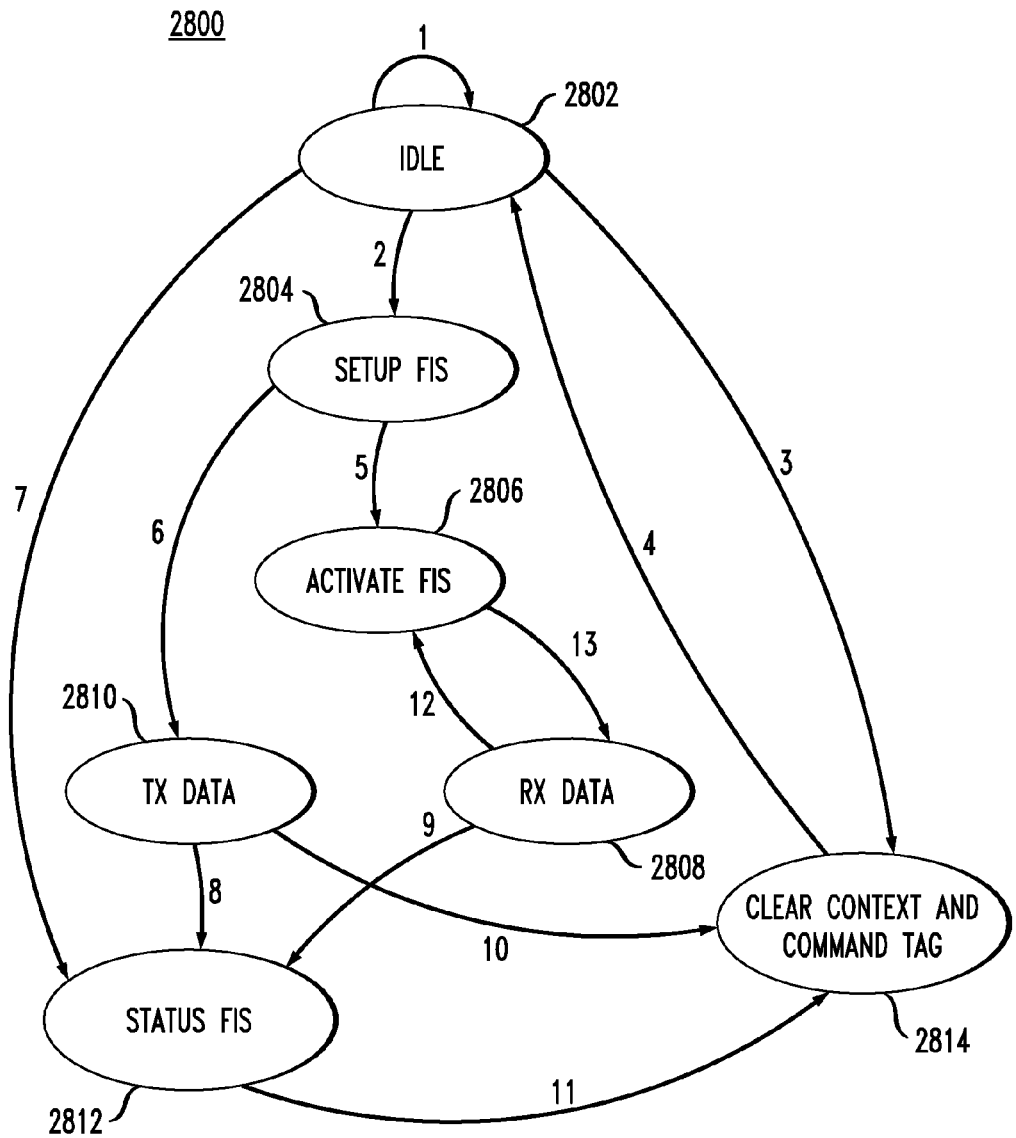
FIG. 28 shows a block diagram of a state machine of the instruction interface of FIG. 3 to process a SATA FPDMA request, in accordance with embodiments of the present invention.

FIG. 9 shows a block diagram of instruction interface 314. For SATA commands, SATA Protocol Assist Module 904 generates a SETUP FIS and counts a total amount of data transferred, decoupling the SATA protocol requirements from data transfer context boundaries. SATA Protocol Assist Module 904 maintains DMA Setup counter 902. DMA Setup counter 902 tracks frame boundaries for the overall data transfer. The context configuration bits indicate how the context should be routed and handled. For SAS commands, SAS Protocol Assist Module 906 generates a TRANSFER READY frame for commands. The overall data count is maintained in Pending Write Table (PWT) 324. RXDP 306 (for reception) and TXDP 318 (for transmission) operate on individual data transfer contexts. The configuration of the context indicates how the context should be routed and indicates how RXDP 306 and TXDP 318 should handle context boundaries. RXDP 306 and TXDP 318 track the context boundary count and load a new context to support scatter-gather operation and continue the transfer without affecting the protocol operation. Instruction control 908 might generally include a state machine to perform the operations of instruction interface 314. Instruction registers 910 might be used to automatically generate responses (e.g., a SETUP or RESPONSE frame) for transmission over communication link 102, such as described in regard to Automatic Instruction Generation mode of media controller 104 (FIG. 28).

Referring back to FIG. 4, context management module 312 includes Context Cache (CC) 408, Consumed Context Manager (CCM) 410 and Context Free Pointer Manager (CFPM) 412.

Context cache 408 loads contexts from context buffer 322 to perform the data transfer corresponding to the context. As described herein, one or more contexts correspond to a data transfer for a host command. Context cache 408 might include one or more context pointers to read contexts from one of context buffer 322 or BAM 215. Context cache 408 might provide retrieved contexts to one or more of instruction interface 314, TXDP 318, and PWT 324 for further processing. For example, context cache 408 stages retrieved contexts at the head of the active context queue in TXDP 318 before previous contexts complete execution. Context cache 408 might stage a next context by modifying one or more contexts before they are executed, or reordering the active context queue. For example, the active context queue might typically include pointers to the next context to be executed, thus linking the contexts together in a linked list. The pointer to the next context in the list is generated when the contexts are generated, thus defining the order of the linked list of contexts. Context Cache 408 thus allows the priority of a thread to be changed dynamically, for example, by modifying or reordering contexts in the active context queue before the data transfer corresponding to the context is started.

In embodiments of the present invention, context cache 408 might include parallel context linked lists to store context pointers from parallel context processing threads. For example, context cache 408 might employ one parallel context thread as a normal-priority context thread and one parallel context thread as a high-priority context thread. The priority of a context thread might be indicated by a control bit. Context cache 408 might typically process the normal-priority context thread until one or more contexts are present in the high-priority thread. When the normal-priority context thread reaches a protocol boundary (e.g., a frame boundary), context cache 408 might pause the normal-priority thread and process the contexts of the high-priority thread. The protocol boundary might be indicated by a context control bit signifying that the context being processed is the last context for a given protocol unit. For SATA, switching execution to the priority thread might typically be allowed at a Setup boundary since the device has committed to transferring that amount of data before switching to another thread. For SAS, switching might be allowed at the data instruction (commit amount) boundaries for better efficiency on data transfers. The high-priority context thread might typically be executed until it is empty, and then context cache 408 returns to complete processing of the normal-priority context thread.

After a data transfer for a context is completed, the command and data cache information should be updated to maintain the integrity of cached information. In general, embodiments of the present invention might provide an interrupt to service a cache update routine. As described herein, multiple data transfer contexts might be employed for a single command. Thus, embodiments of the present invention provide cache update interrupts at data boundaries that are not tied to individual contexts, but rather to entire data transfers. A context interrupt queue might be employed to allow multiple data transfer contexts to be processed by a single interrupt. Further, embodiments of the present invention employ the context interrupt queue to allow the cache update interrupt routine to be performed outside of the data transfer performance path, avoiding delays for data transfers.

Embodiments of the present invention generate an interrupt based on a context configuration bit that is set after one or more contexts are completed without error. If the one or more contexts are completed with at least one error, the data transfer might be aborted. Once a context is completed, the context is consumed. Embodiments of the present invention provide three processes for consuming contexts. The first process generates a cache update interrupt for each data transfer context that completes. The second process generates a cache update interrupt after a command that includes multiple data transfer contexts completes. The third process generates a cache update interrupt after a predetermined number of contexts complete. In cases where multiple data transfer contexts are completed before generating an interrupt, the range of LBAs for all completed data transfer contexts is maintained in buffer memory.

As described, context cache 408 might retrieve a next context of a context thread from context buffer 322 while a current context is being processed. Context cache 408 compares the next context pointer with the end pointer corresponding to the end of the data transfer corresponding to the context thread. If the next context pointer is not equal to the end context pointer, the next context is read from context buffer 322. Embodiments of the present invention might include one or more copies of the next pointer and end pointer, such that the normal-priority context thread can be interrupted to execute the high-priority context thread. High-priority threads might include contexts for operations such as SATA or SAS response frames, SAS TRANSFER READY frames, or other high-priority data transfers.

Figure 10:
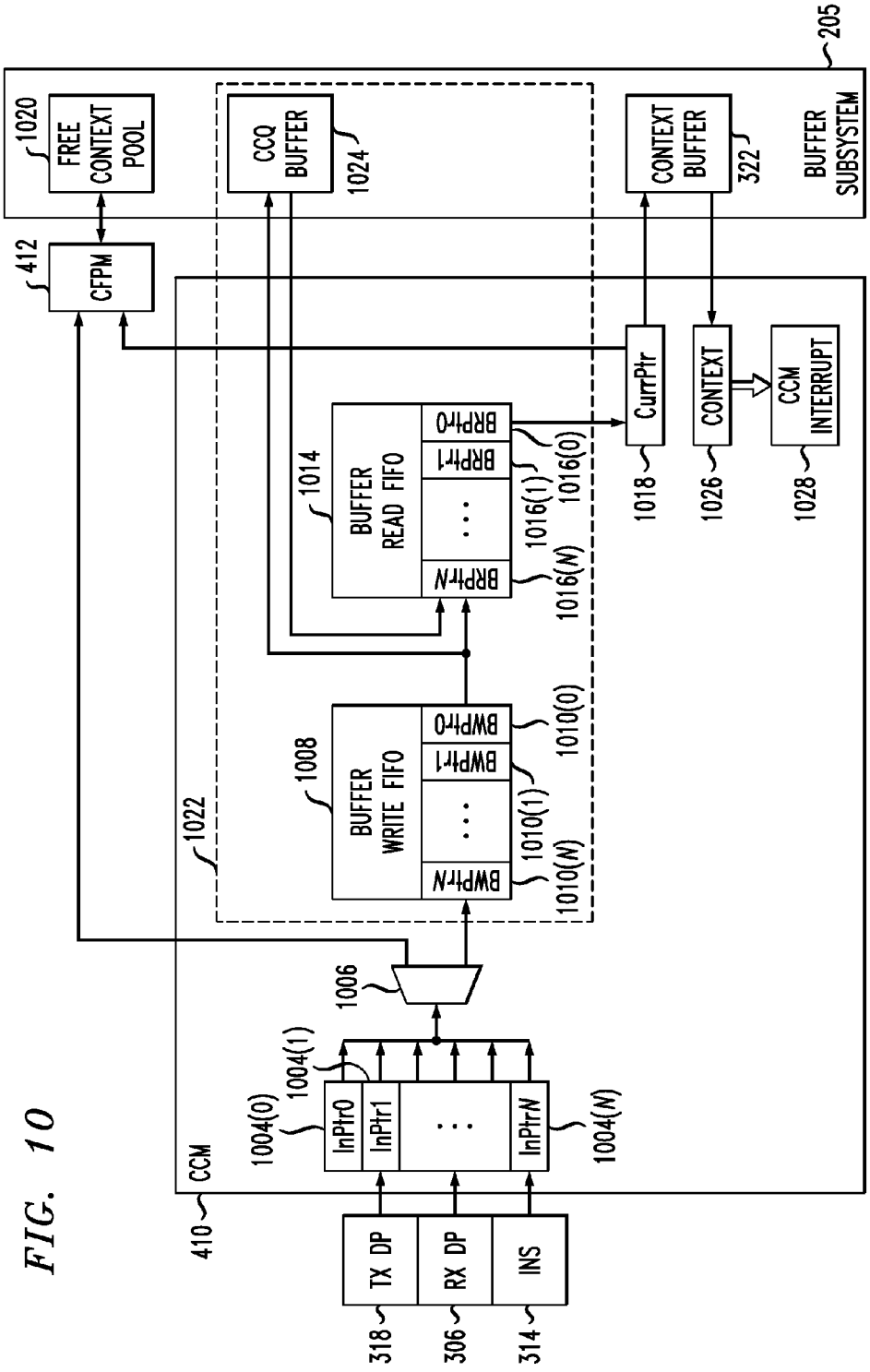
FIG. 10 shows additional detail of the consumed context manager of FIG. 4, in accordance with embodiments of the present invention.
Figure 11:
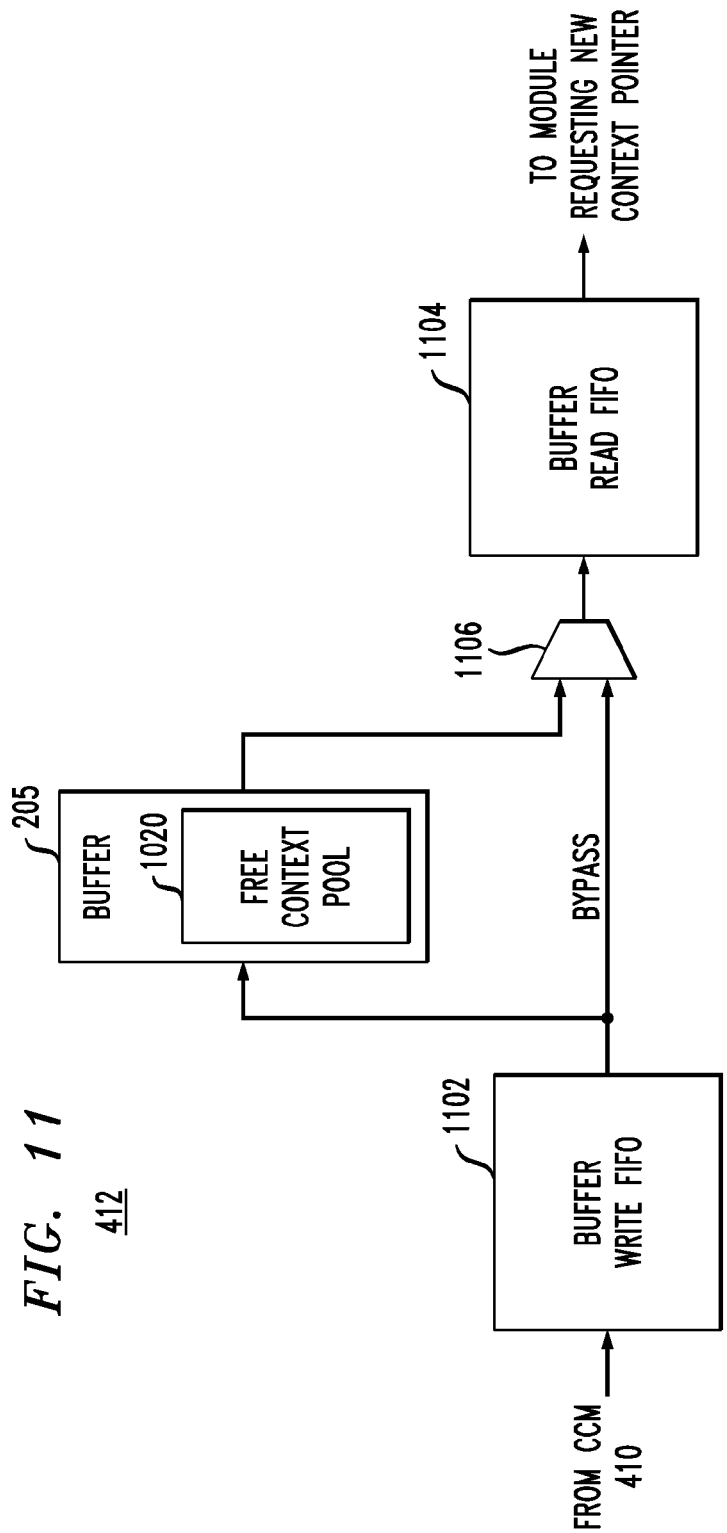
FIG. 11 shows additional detail of the context free pointer manager of FIG. 4, in accordance with embodiments of the present invention.

CCM 410 is employed to process completed contexts, for example, by deleting the context, generating an interrupt indicating the context has completed, or recycling the context pointer. FIG. 10 shows greater detail of CCM 410. CFPM 412 maintains a pool of unused context pointers (e.g., the buffer address where the context is stored). CFPM 412 provides free context pointers when new contexts are created, and adds pointers back to the free pointer pool when the context completes, without having to reorder contexts in the buffer memory. FIG. 11 shows greater detail of CFPM 412.

As shown in FIG. 10, CCM 410 is coupled to instruction interface 314, RXDP 306 and TXDP 318, which provide pointers for completed contexts, shown as pointers 1004(0)-1004(N), to CCM 410. A context pointer is an index of the buffer that corresponds to the buffer address where a context is stored. The hardware registers in CCM 410 include buffer write FIFO 1008 and buffer read FIFO 1014. Buffer write FIFO 1008 stores enough pointers to provide one burst write operation to buffer subsystem 205, shown as pointers 1010(0)-1010(N). In exemplary embodiments, buffer write FIFO 1008 stores 6 pointers in 3 datawords. Buffer read FIFO 1014 stores the same number of pointers as buffer write FIFO 1008 to provide a burst read operation to buffer subsystem 205. The entries in FIFOs 1008 and 1014 might include error correcting code (ECC) protection, for example, every 3 datawords of FIFO data might include 1 dataword of ECC data, such that the overall burst operation size is 4 datawords (3 data+1 ECC).

When a context pointer is provided to CCM 410, it is stored in one of buffer write FIFO 1008 and buffer read FIFO 1014. Together, the contents of buffer write FIFO 1008, buffer read FIFO 1014 and CCQ buffer 1024 form consumed context queue (CCQ) 1022, as indicated by the dashed line. As shown in FIG. 10, to provide variable queue depths, consumed context queue 1022 might be stored in buffer write FIFO 1008, buffer read FIFO 1014, CCQ buffer 1024 in buffer subsystem 205, or a combination thereof. Context pointers are removed from CCQ 1022 in the order of context completion. If buffer read FIFO 1014 is empty, context pointers are moved to buffer read FIFO 1014 from one of CCQ buffer 1024 or buffer write FIFO 1008. CCQ buffer 1024 might be used to store context pointers received by buffer write FIFO 1008 when buffer read FIFO 1014 is full. To process a context pointer, CCM 410 loads the head entry of CCQ 1022 to current pointer register 1018. CCM 410 reads the original copy of the context, shown as context 1026, from context buffer 322, and based on the context data, might generate an interrupt, shown as 1028, to process the context.

One or more of the context pointers in CCQ 1022 might be processed during the same interrupt by employing flexible associations between the context interrupts and CCQ 1022. For example, by tracking LBAs for consumed contexts, CCM 410 might process contexts for contiguous LBAs in a single interrupt. Alternatively, CCM 410 might process a predetermined number of one or more consumed contexts in a single interrupt by tracking a tag for each command. After the interrupt is processed, the corresponding entry of CCQ 1022 is cleared and the next entry in CCQ 1022 might be processed by generating a new interrupt corresponding to the next entry. This process is repeated for subsequent consumed contexts in CCQ 1022.

Completed contexts provided to CCM 410 might be consumed in one of four ways. First, a completed context might be cleared without recycling the context pointer to CFPM 412 and without generating an interrupt to perform any other processing. Second, a context pointer might be cleared without generating an interrupt, but is recycled to CFPM 412. These first two cases are generally controlled by multiplexer 1006, which optionally bypasses CFPM 412. Third, CCM 410 might generate an interrupt and recycle the context pointer to CFPM 412. The context pointers are provided to CCM 410, which loads the pointer into CCQ 1022. When the pointer is removed from CCQ 1022, CCM 412 loads the matching context from context buffer 322 and generates an interrupt. While processing the interrupt, the context is read and operations are performed, such as tracking how often a given LBA is accessed. When the interrupt is cleared, CCM 410 sends the context pointer to CFPM 412 for recycling, and CCM 410 clears the context pointer from CCQ 1022. Fourth, CCM 410 might generate an interrupt but not send the context pointer to CFPM 412 for recycling.

FIG. 10 shows a typical embodiment of CCM 410 for a SATA application. A SAS embodiment of CCM 410 might employ the same structure as shown in FIG. 10, but include additional context sources to support duplicate modules required in a two-port system (e.g., two instruction interfaces, two RXDPs and two TXDPs). Since each of the ports is running in parallel, both ports might be completing contexts in parallel.

FIG. 11 shows a block diagram of a context free pointer manager (CFPM) 412. CFPM 412 maintains a pool of unused context pointers, shown as free context pool 1020, which might be stored in buffer subsystem 205. CFPM 412 provides a context pointer when a new context is created, and recycles context pointers after each context is completed. CFPM 412 accepts pointers for completed contexts from CCM 410 and stores the pointers in buffer write FIFO 1102 and buffer read FIFO 1104, which operate in a similar manner as FIFOs 1008 and 1014, described above with regard to FIG. 10. Context pointers to be added to free context pool 1020 are stored in buffer write FIFO 1102, and free context pointers to be provided to other processing blocks (e.g., command parser 406 or context cache 408) are stored in buffer read FIFO 1104 until they can be provided. As shown by multiplexer 1106, free context pool 1020 might be bypassed if Buffer Read FIFO 1104 is not full. This operates is a cache of pointers and attempts to minimize buffer accesses. Buffer Read FIFO 1104 stores 6 pointers so they are all available to use for context generation. As pointers are recycled, they are stored in Buffer Write FIFO 1102, and are moved to Buffer Read FIFO 1104 if there are open slots in Buffer Read FIFO 1104. This completely bypasses free context pool 1020. The pointers are only written to free context pool 1020 when both Buffer Read FIFO 1104 and Buffer Write FIFO 1102 are full. The pointers are only read from free context pool 1020 when both Buffer Read FIFO 1104 and Buffer Write FIFO 1102 are empty. The context pointers are removed one at a time as requested and pointer order is not maintained. CFPM 412 is substantially similar for both SATA and SAS applications.

Thus, as described herein, embodiments of the present invention provide support for generating and executing dual threads of contexts. For example, embodiments of the present invention support a normal context thread and a parallel, high priority context thread. This structure supports generation of context threads by having a parallel structure for generating contexts, and also supports execution of parallel context threads by having a parallel context fetch structure to support inserting high priority contexts at an appropriate transfer boundary. Embodiments of the present invention provide the ability to generate a high priority context without changing a current context thread.

As described above with regard to FIGS. 2 and 3, embodiments of the present invention provide that a single data transfer at the communication link protocol level (e.g., link protocol core 304) might be split into one or more data transfer contexts for data transfers internal to media controller 104. The data related to the one or more contexts might be scattered in different locations in the data buffer and/or media, and need to be combined to form a single contiguous data transfer at the protocol level. Thus, embodiments of the present invention allow a protocol command to be split into one or more contexts that can later be recombined. Splitting a protocol command into contexts might accommodate multiple buffer management techniques and multiple protocol techniques, such as, for example, SATA programmed input/output (PIO) multiple and SAS multiple pending write commands. As will be described, embodiments of the present invention decouple a data transfer block boundary from a protocol frame boundary. Thus, regardless the size of data frames transferred over communication link 102, internal data contexts might be created to process the data transfer. The size of the data contexts is not dependent on the protocol employed by communication link 102.

Figure 12:
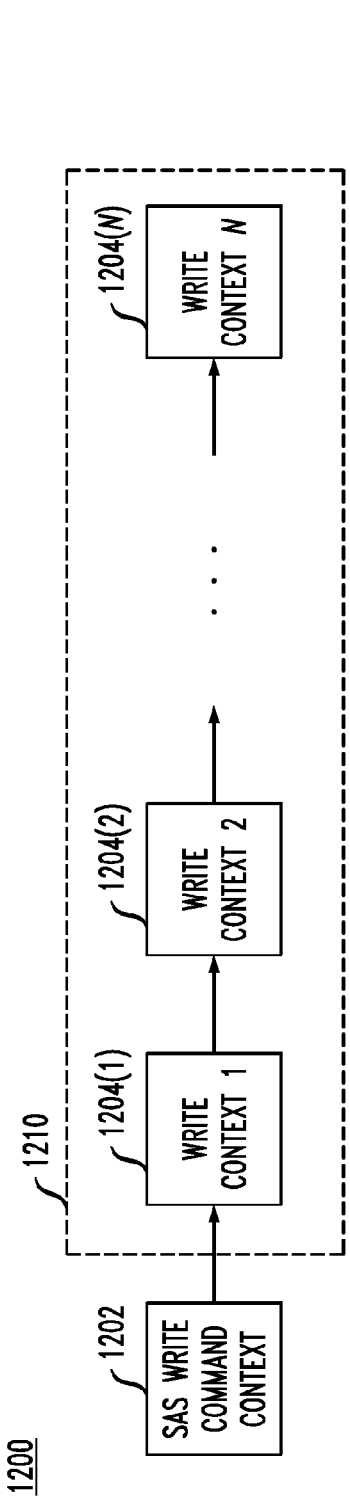
FIG. 12 shows a block diagram of exemplary contexts for a SAS write data transfer in a media controller operating in accordance with embodiments of the present invention.

FIG. 12 shows a block diagram of exemplary protocol command contexts and the associated data contexts for a write command in conformance with the SAS protocol. As shown in FIG. 12, a SAS write command might correspond to command context 1202 and one or more write contexts 1204(1)-1204(N) to provide scatter-gather buffer management support. For example, for a SAS write operation, SAS command context 1202 might correspond to the TRANSFER READY frame in accordance with the SAS protocol. The TRANSFER READY frame generally enables write transfers from a source to media controller 104. In embodiments of the present invention, multiple write transfers might be active at a time. In response to the TRANSFER READY frame, command context 1202 is generated and generally corresponds to the total amount of data that can be received for the write data command. For example, the command context might be sized appropriately for meeting the link requirements such as maximum burst size while also dividing write commands into appropriately sized pieces for internal transfers. Additionally, the write command might be broken into one or more TRANSFER READY amounts. Once the TRANSFER READY is sent, then the SAS target is committed to transferring (receiving) that amount of data for that write command at that time.

As shown in FIG. 12, command context 1202 might correspond to one or more write contexts 1204(1)-1204(N) that are generated to process the data transfer. The size of write contexts 1204(1)-1204(N) might correspond to chunk boundaries of data stored in media system 100, for example, data stored in media 118, buffer 112 or buffer 114. The chunk boundaries are generally independent of the protocol frame boundaries and the overall size of the data transfer. A counter is employed to track the number of chunk boundaries such that a new data transfer context can be processed without affecting the other contexts. As shown in FIG. 12, command context 1202, corresponding to the SAS TRANSFER READY frame, is linked to write contexts 1204(1)-1204(N) that are linked together and provide pointer information for the buffer locations storing the data to be transferred. In exemplary embodiments of the present invention, write contexts 1204(1)-1204(N) might have the same configuration options and match the overall data length provided in command context 1202. One or more of write contexts 1204(1)-1204(N) might be stored in Pending Write Table (PWT) 324. As indicated by the dashed line, contexts 1204(1)-1204(N) might optionally be merged into a single data transfer between communication link 102 and media 118, shown as data transfer 1210. This size of data transfer 1210 might be based on, for example, a maximum burst size to media 118 or a number of contiguous chunks of the one or more write contexts.

In the SAS protocol, multiple write commands might be active simultaneously, so write contexts might be suspended at frame boundaries on the protocol. To support multiple suspended contexts, PWT 324 temporarily stores suspended contexts to decouple the suspended contexts from the protocol frame boundaries. Both frame boundaries and context boundaries are maintained in PWT 324 so that write contexts are not necessarily required to be aligned to protocol frame boundaries.

Figure 13:
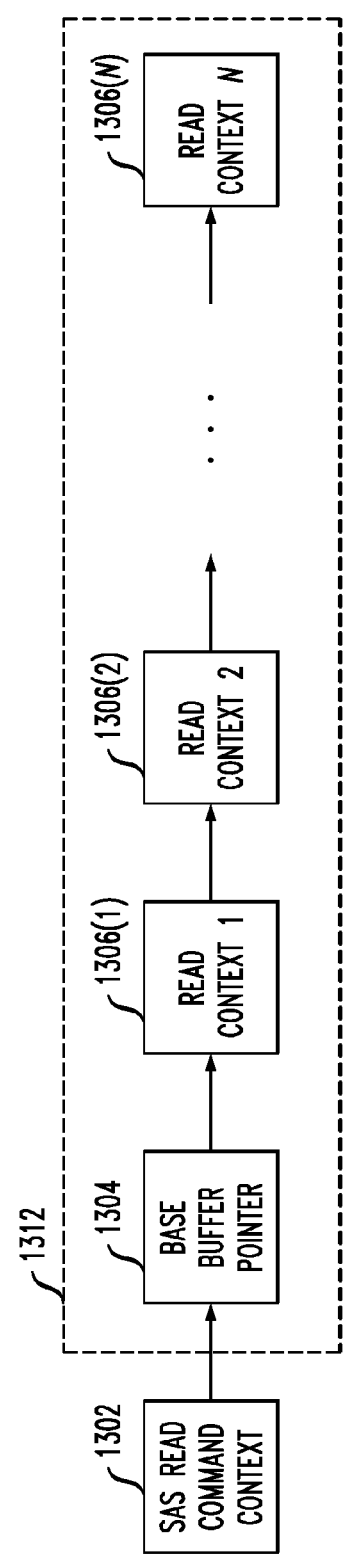
FIG. 13 shows a block diagram of exemplary contexts for a SAS read data transfer in a media controller operating in accordance with embodiments of the present invention.

FIG. 13 shows a block diagram of exemplary protocol command contexts and the associated data contexts for a read data transfer in conformance with the SAS protocol. The SAS read data transfer shown in FIG. 13 operates in a similar manner as the SAS write data transfer described with respect to FIG. 12. As shown in FIG. 13, command context 1302 corresponds to the SAS read command and generally corresponds to the total data transfer size. As shown in FIG. 13, command context 1302 might correspond to one or more read contexts 1306(1)-1306(N) that are generated to process the data transfer. As indicated by the dashed line, 1312, base buffer pointer 1304 and the one or more read contexts 1306(1)-1306(N) are optional, as will be described below. The size of read contexts 1306(1)-1306(N) might correspond to chunk boundaries of data stored in media system 100, for example, data stored in media 118, buffer 112 or buffer 114. A context count for read contexts 1306(1)-1306(N) might be maintained separately from a frame count so the context boundaries are independent of the frame boundaries.

As described above, the one or more read contexts 1306(1)-1306(N) are optional, as embodiments of the present invention might, depending on the size of the read data transfer or settings of media controller 104, employ varying context boundaries. For example, for small read operations, only a single context per protocol command might be employed (e.g., only read command context 1302). In this case, a single context is generated for the data transfer. Instruction interface 314 issues an instruction for the data transfer length of the context and transmit data path (TXDP) 318 transfers the data for that context. Alternatively, multiple data transfer contexts might be merged together to create a larger protocol instruction for better protocol efficiency, for example to send out data packets of a maximum packet size of communication link 102. As shown in FIG. 13, read command context 1302 is used for the protocol instruction length and is linked to one or more read contexts 1306(1)-1306(N) that satisfy the overall instruction length. Read contexts 1306(1)-1306(N) are processed by transmit data path 318 and data is seamlessly transferred to link protocol core 304 until the instruction length from read command context 1302 is met. Protocol frame boundaries are maintained independently of context boundaries, so frames of the maximum size allowed by the link protocol are sent until all of read contexts 1306(1)-1306(N) have been processed. In general, once processing of a read data context starts, the read data context remains in the transmit data path 318 until completion.

In embodiments of the present invention, BAM 215 might generate read data contexts without requiring a linked list of contexts in context buffer 322. As shown in FIG. 13, generated read command context 1302 defines an entire data transfer length of the protocol instruction request, but this context references a list of context structures accessible by BAM 215, instead of contexts stored in buffer 322. Base pointer 1304 is employed to provide a single context in buffer 322 for a transfer, while the following contexts 1306(1)-1306(N) might be generated by BAM 215. Base pointer 1304 might not be used when the one or more read contexts 1306(1)-1306(N) are used or are not generated by BAM 215. BAM 215 might generate read contexts 1306(1)-1306(N) and, employing an internal context lookup algorithm, store data for each of read contexts 1306(1)-1306(N) to Context Cache 408. The contexts are provided from Context Cache 408 to TXDP 318, which provides the data to link protocol core 304 to perform the read data transfer. Thus, BAM 215 reduces the data structures that firmware running on processor 116 generates and passes between routines, and provides for faster processing of data contexts. This provides the ability to generate contexts for a data transfer command in three ways, while still supporting the maximum transfer size: i) in a single context for the command and the data transfer in buffer 322 (e.g., context 1302); ii) a command context (e.g., context 1302) with a single data transfer context in buffer 322 (e.g., base pointer 1304) with multiple data transfer entries in BAM 215 (e.g., contexts 1306(1)-1306(N)); and iii) one or more contexts in buffer 322, split between a command context (e.g., 1302) and one or more data contexts (e.g. 1306(1)-1306(N)).

TXDP 318, based on the context configuration contained in command context 1302, determines processing of a read context and what actions are performed at context boundaries. For example, TXDP 318 tracks the context boundary using a context block count. If the current context being processed by TXDP 318 indicates that there is another context in the data transfer, TXDP 318 loads the next context when the current context completes. Context Cache 408 might provide the next context, based on base pointer 1304, to TXDP 318 to continue the transfer without affecting the protocol operation.

Embodiments of the present invention employing a host subsystem operating in conformance with the SATA protocol might generally support the same features as described above with regard to FIGS. 12 and 13 for host subsystems operating in conformance with the SAS protocol. For example, a subsystem operating in conformance with either protocol might provide contexts such that the overall protocol transfer context is separate from one or more internal data transfer contexts.

In the SATA protocol, data packets are sent using one or more frames that include a start-of-frame (SOF) delimiter, a data payload, a cyclic redundancy code (CRC) delimiter, and an end-of-frame (EOF) delimiter. The data payload contains user data organized according to a predefined file information structure (FIS). The FIS of the payload includes a value representing a type parameter of the FIS. For example, a first-party DMA (FPDMA) FIS generally requires the FIS indicate the total amount of data that media controller 104 can transfer in one operation. Typically, a SETUP FIS frame is sent, which is then followed by data transfer frames. The SETUP FIS must be processed before data frames can be transmitted.

To support this protocol requirement, the execution of FIS setup operations and the execution of data transfer operations are handled using different independent contexts. For example, a data transfer context can be split from the command context (e.g., the SATA setup command) while separately maintaining counts of protocol frames. Similarly as described above with regard to FIGS. 12 and 13, embodiments of the present invention operating in conformance with the SATA protocol might process a setup command and a data transfer using one context, or might split the command and data transfer into one or more contexts to provide scatter-gather buffer management support. Other embodiments of the present invention might process a command and data transfer as a command context having a single data transfer context in the buffer with multiple data transfer entries in BAM 215.

As shown in FIG. 14, embodiments of the present invention generate a number of contexts 1402(1)-1402(N) that correspond to storage of data is in buffer subsystem 205. For substantially every discontinuity of data in the buffer, a new context is required to point to that data. Each of contexts 1402(1)-1402(N) transfers the SETUP FIS and also transfers the data corresponding to each FIS, limiting the amount of data that can be transmitted for each SETUP FIS.

As shown in FIG. 15, embodiments of the present invention generate a setup context 1502 and a number of contexts 1504(1)-1504(N) that correspond to how data is stored in buffer subsystem 205. Each of data contexts 1504(1)-1504(N) correspond to a single SETUP FIS context 1502. As indicated by the dashed line, data contexts 1504(1)-1504(N) might be combined into a single data transfer 1510. In FIG. 15, data contexts 1504(1)-1504(N) generally transmit more data than setup/data contexts 1402(1)-1402(N) of FIG. 14 because each context 1504(1)-1504(N) does not need to include a SETUP FIS. In this case, Instruction Interface 314 sends a SETUP FIS for the entire transfer, and data contexts 1504(1)-1504(N) are merged together (e.g., by TXDP 318 or RXDP 306), providing a single data transfer.

Embodiments such as shown in FIG. 15 might beneficially be employed, for example, to process SATA programmed input/output (PIO) Multiple commands. PIO Multiple commands include data transfers for one or more memory addresses, where the data in the PIO Multiple command is not necessarily aligned with a buffer management boundary. Thus, embodiments of the present invention split PIO Multiple commands into one or more contexts that align to chunk boundaries of data stored in media system 100 (e.g., data stored in media 118, buffer 112 or buffer 114). Chunk boundaries might generally be independent of the protocol frame boundaries and the overall size of the transfer, although chunk, protocol frame, context, and media boundaries all align to the end of the last transfer.

As shown in FIG. 16, embodiments of the present invention generate one or more data contexts independently of context buffer 322. Similarly as shown in FIG. 15, one context is generated for the SETUP FIS (setup context 1602). A second context, base pointer 1604, is generated and stored in context buffer 322 to provide a reference pointer to a separate data transfer list in BAM 215. BAM 215 generates individual data transfer contexts 1606(1)-1606(N) and, during the data transfer, writes each of them to Context Cache 408 in sequence. Individual data transfer contexts 1606(1)-1606(N) are moved from Context Cache 408 to the data paths (e.g., TXDP 318) to perform the data transfers. These data transfer contexts are not stored in context buffer 322 and only exist in Context Cache 408 and the corresponding data path. The data path merges data contexts 1606(1)-1606(N) into a single data transfer. When BAM 215 generates the final data transfer context (e.g., 1606(M), base pointer 1602 is cleared from Context Cache 408 and Context Cache 408 processes the next context its queue. Embodiments of the present invention might employ a single context combining the SETUP FIS context with the base pointer, similarly as shown in FIG. 14, except BAM 215 generates data contexts 1606(1)-1606(N).

Embodiments of the present invention might employ independent receive and transmit direct memory access (DMA) modules in addition to context cache 408, pending write table (PWT) 324, and buffer allocation manager (BAM) 215. Independent RXDMA and TXDMA modules might allow for full duplex operations. Further, independent RXDMA and TXDMA modules, combined with context staging in context cache 408, provide a context execution pipeline that provides the advantages of i) allowing modifications to a context before it is executed by the corresponding DMA, ii) staging a next context in a context cache to improve performance and allow modification of the context before it is executed by the corresponding DMA, and iii) staging contexts to accommodate data encryption.

Figure 17:
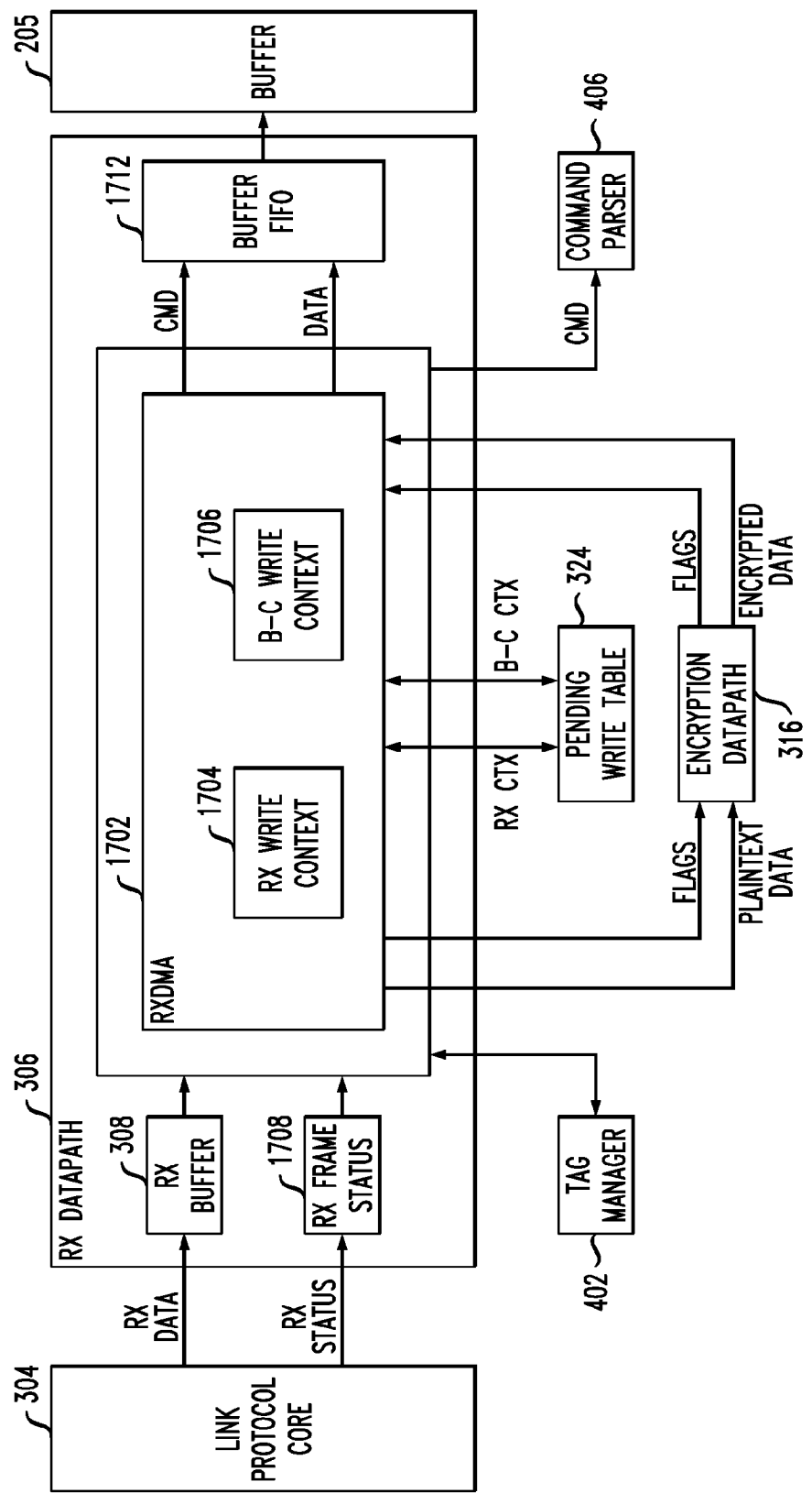
FIG. 17 shows an exemplary receive data path of a SATA host subsystem operating in accordance with embodiments of the present invention.

FIG. 17 shows an embodiment of RXDP 306 employed in a single port SATA application (i.e. a consumer application). As shown, RXDP 306 includes receive direct memory access module (RXDMA) 1702. In general, for a SATA application, since the SATA protocol does not allow multiple active write commands, only one write context is active at a time, and the active context must be completed before beginning another data transfer. However, RXDMA 1702 might employ two write contexts: a first write context, a receive data context (RX write context 1704), to perform receive-side context operations (e.g., between RXDMA 1702 and RX Buffer 308) and a second write context, a buffer context (B-C write context 1706), to perform buffer-side context operations (e.g., interface RXDMA 1702, buffer FIFO 1712 and buffer subsystem 205). This allows the receive-side operations and the buffer-side operations to be performed independently of each other. This operational independence supports operation of encryption datapath 316, since, for example, encryption datapath 316 might introduce delay in processing received data. Embodiments of the present invention might beneficially employ a single entry PWT 324 to stage a context for the receive-side context (1704) operation while the buffer-side context (1706) operation is completed. This provides common handling contexts for SATA and SAS applications to support a modular design. RX Frame Status 1708 is described in greater detail in regard to FIG. 26.

Figure 18:
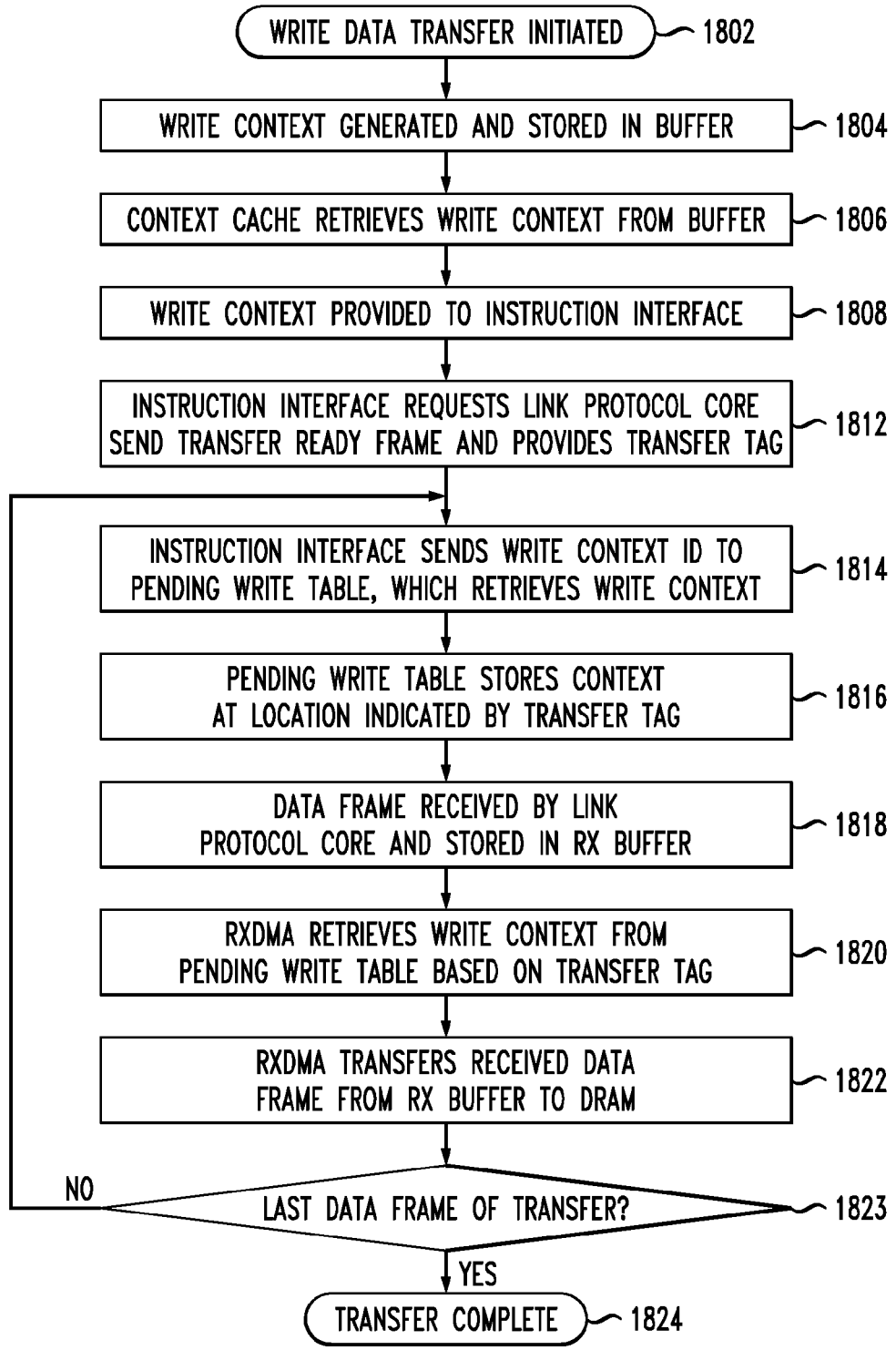
FIG. 18 shows a flow diagram of context processing for a write data transfer in accordance with embodiments of the present invention.

FIG. 18 shows a flow diagram of context process 1800 for a SAS write data transfer, as might be employed by host subsystem 201 of FIG. 2. At step 1802, a write data transfer is initiated by a host initiator coupled to communication link 102. At step 1804, a write context is generated. As described herein, the write context might be stored in a buffer, for example a context buffer 322 of buffer subsystem 205. At step 1806, Context Cache 408 retrieves the write context from context buffer 322 of buffer subsystem 205. At step 1808, the write context is provided to Instruction Interface 314. Instruction Interface 314 provides TRANSFER READY and PWT ID to RXDMA 1702 so it can check the incoming data and the TRANSFER READY amount as the data is later received. Instruction Interface 314 then discards the TRANSFER READY context since RXDMA 1702 and PWT 324 contain that information.

At step 1812, Instruction Interface 314 requests that link protocol core 304 send a TRANSFER READY frame to the host initiator. The TRANSFER READY frame includes a write transfer tag indicating a corresponding context entry in pending write table (PWT) 324. At step 1814, Instruction Interface 314 sends the PWT ID to PWT 324, and, at step 1816, PWT 324 adds the write context to a context list at location corresponding to transfer tag. PWT 324 might retrieve the write context, based on the PWT ID, from context cache 408, or a cache internal to PWT 324. At step 1818, link protocol core 304 receives the data frame sent by the host initiator, and the data frame is stored in RX Buffer 308. At step 1820, RXDP 306, via RXDMA 1702, retrieves the write context from PWT 324 based on the write tag, which is provided in the header of the data frame stored in RX Buffer 308. PWT 324 swaps contexts by i) storing current context from RXDMA 1702 and ii) providing requested contexts from PWT 324. At step 1822, RXDP 306, via RXDMA 1702, transfers the received data frame from RX Buffer 308 to buffer subsystem 205. At step 1823, if the last frame of the data transfer was processed, then the data transfer is complete at step 1824. Otherwise, additional frames are left to process, and the process returns to step 1814 to process additional data frames to satisfy the entire data transfer, for example, by PWT 324 retrieving a next write context from the context cache.

Context process 1800 of FIG. 18 corresponds to a SAS write data transfer, but might be slightly different for SATA transfers. In SATA, instead of TRANSFER READY, there is a DMA Setup (Write), and only a single write is active at any one time. Thus, for SATA, Instruction Interface 314 tracks the total transfer length and RXDP 306 indicates to Instruction Interface 314 whenever it receives a frame.

Embodiments of the present invention might provide that multiple contexts are combined into a single TRANSFER READY frame. When multiple contexts are combined into one TRANSFER READY frame, PWT 324 is configured to process a thread of contexts that are coalesced together as data for each context is received. Instruction Interface 314 is configured to generate the TRANSFER READY frame to include a transfer count of all the contexts in the thread for that portion of the write command. The contexts are linked together and desirably have the same configuration such that only the transfer length and buffer pointer locations change between contexts in the thread. The linked contexts might be generated by Buffer Allocation Manager (BAM) 215. For example, the thread of contexts might correspond to single context having multiple entries in BAM 215, or multiple individual contexts in the buffer that are joined together to advantageously utilize the maximum frame transfer size.

Figure 19:
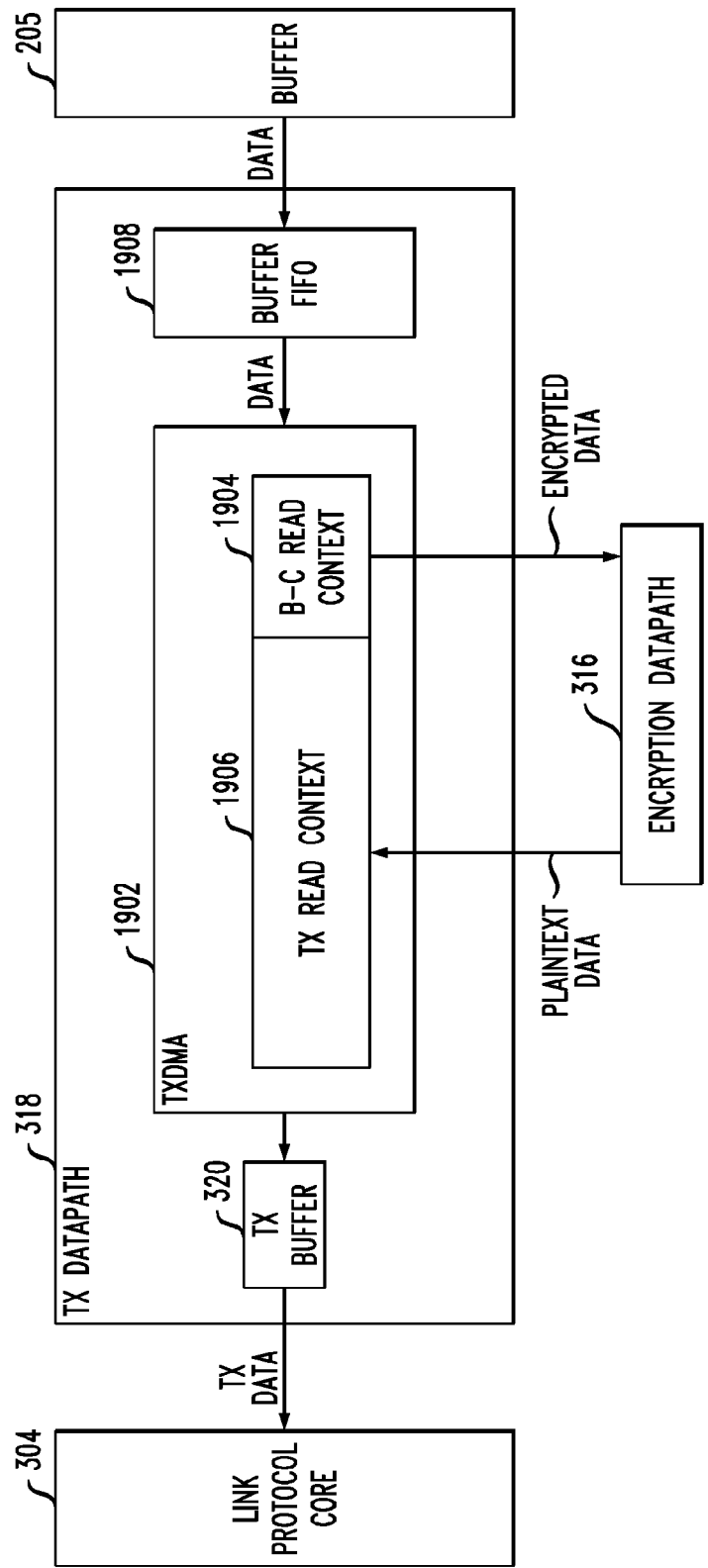
FIG. 19 shows an exemplary transmit data path of a SATA host subsystem operating in accordance with embodiments of the present invention.

FIG. 19 shows an exemplary embodiment of TX datapath (TXDP) 318 that might be employed in a single port SATA application (i.e. a consumer application). TXDP 318 is employed in a system for a consumer application operating in accordance with the SATA protocol. As shown, TXDP 318 includes transmit direct memory access module (TXDMA) 1902. TXDP 318 handles outgoing data from buffer subsystem 205 to link protocol core 302 in response to, for example, a host read request. TXDP 318 includes TX buffer 320 that operates to synchronize data between the internal data path and the link protocol. In order to maintain the flow of data across multiple contexts without idle time on the protocol, TXDP 318 pre-fetches data into TX Buffer 320 via TXDMA 1902, as Link Protocol Core 304 is providing data for a previous context to communication link 102, assuring that data is available in TX Buffer 320 when link protocol core 304 is ready for data corresponding to the next context.

Similarly as described in regard to write contexts 1704 and 1706 of FIG. 17, TXDMA 1902 might employ two read contexts: a first read context, B-C read context 1904, to perform buffer-side context operations (e.g., between TXDMA 1902, buffer FIFO 1908 and buffer subsystem 205) and a second read context, TX read context 1906, to perform transmit-side context operations (e.g., between TXDMA 1902 and TX Buffer 320). These two read contexts allow the transmit-side operations and the buffer-side operations to be performed independently of each other, which supports operation of encryption datapath 316, since, for example, encryption datapath 316 might introduce delay in processing received data.

TXDMA 1906 moves data from buffer subsystem 205 to TX Buffer 320 to be provided to Link Protocol Core 304. Data is provided from buffer subsystem 205 in one or more chunks of data, for example, in a chunk size employed by media 118. TX Buffer 320 reformats the one or more data chunks into continuous data for transmission according to the protocol employed by communication link 102 (e.g., frames, packets, etc.). TX Buffer 320 might supply data to link protocol core 304 to reformat one or more data chunks into a frame of the maximum size allowed by the protocol employed by communication link 102. TX Buffer 320 might also add parity data or other error correction data to the data for transmission. Link Protocol Core 304 retrieves the data for transmission from TX Buffer 320, and provides data frames to communication link 102.

Data transfers might be paused for a protocol disconnect or error, and the context associated with the data transfer remains in TXDP 318 until the data transfer can be completed. The context might block link protocol core 304 until it is processed. Some frames might be manually formatted in TX Buffer 320, while other frames might automatically be generated in TX Buffer 320.

Figure 20:
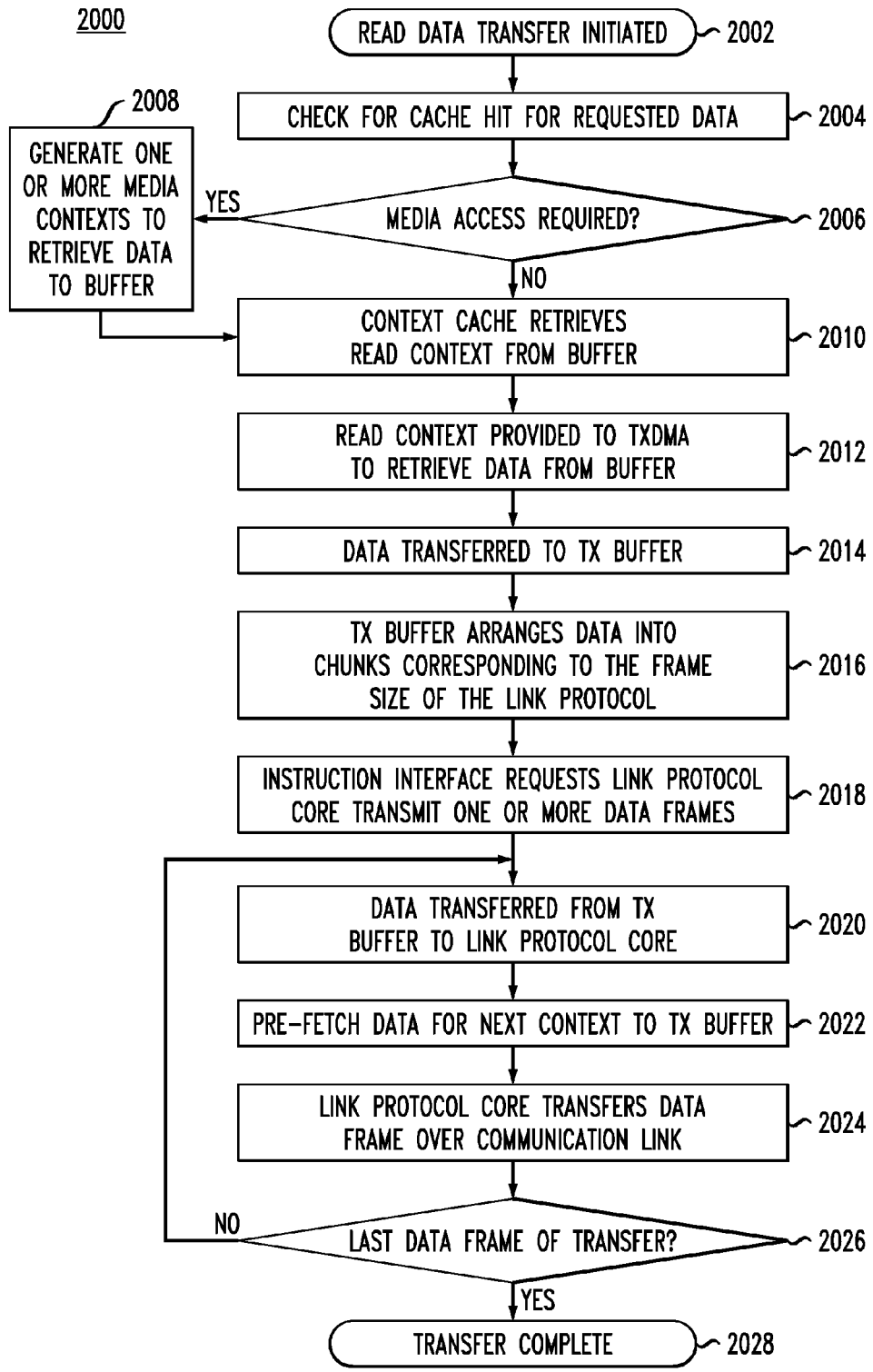
FIG. 20 shows a flow diagram of context processing for a read data transfer in accordance with embodiments of the present invention.

FIG. 20 shows a flow diagram of context process 2000 for a read data transfer, as might be employed by host subsystem 201 of FIG. 2. At step 2002, a read data transfer is initiated by a host initiator coupled to communication link 102. At step 2004, processor 116 checks whether the requested data of the read operation is already stored in buffer subsystem 205 (e.g., a cache hit). If the requested data is stored in buffer subsystem 205, at step 2006, no access of media 118 is required, and, at step 2010, the requested data is read directly from the buffer to context cache 408. Otherwise, at step 2006 if the requested data is not stored in buffer subsystem 205, one or more media contexts are generated at step 2008 to read the requested data from media 118 to buffer subsystem 205. At step 2010, context cache 408 retrieves the requested data from the buffer.

At step 2010, a read context is provided to TXDMA 1902 to retrieve the corresponding data from buffer subsystem 205. At step 2014, the data is transferred to TX Buffer 2014, where the data is grouped into chunks corresponding to the protocol frame size at step 2016. At step 2018, instruction interface 314 requests that link protocol core 304 send one or more data frames to fulfill the read request. At step 2020, data is transferred from TX Buffer 320 to link protocol core 304 for transmission over communication link 102.

At step 2022, if TX Buffer 320 is loaded with the data to satisfy the current context so that context is complete. The completed context is discarded, and data for a next context of the transfer is loaded into TXDMA 1902 as the data corresponding to a previous context of the transfer is provided to link protocol core 304 at step 2020 so data corresponding to the next context is ready to be provided to link protocol core 304 when the previous context is complete, thus reducing idle time of link protocol core 304. As soon as all the data for a context is loaded into TX Buffer 320, the context is cleared from TXDMA 1902 so data for the next context can be fetched from buffer subsystem 205. There are independent host-side TXDMA and media-side buffer-client (B-C) contexts for read data transfers, such as were employed in the RX datapaths for write data transfers as described with regard to FIGS. 17 and 18.

At step 2024, link protocol core 304 sends the data frame over communication link 102. At step 2026, if additional data frames remain to be sent for the read request, processing returns to step 2020 to transfer data from buffer 320 to link protocol core 304. Otherwise, if the last data frame has been sent, the read transfer is complete at step 2028.

Figure 21:
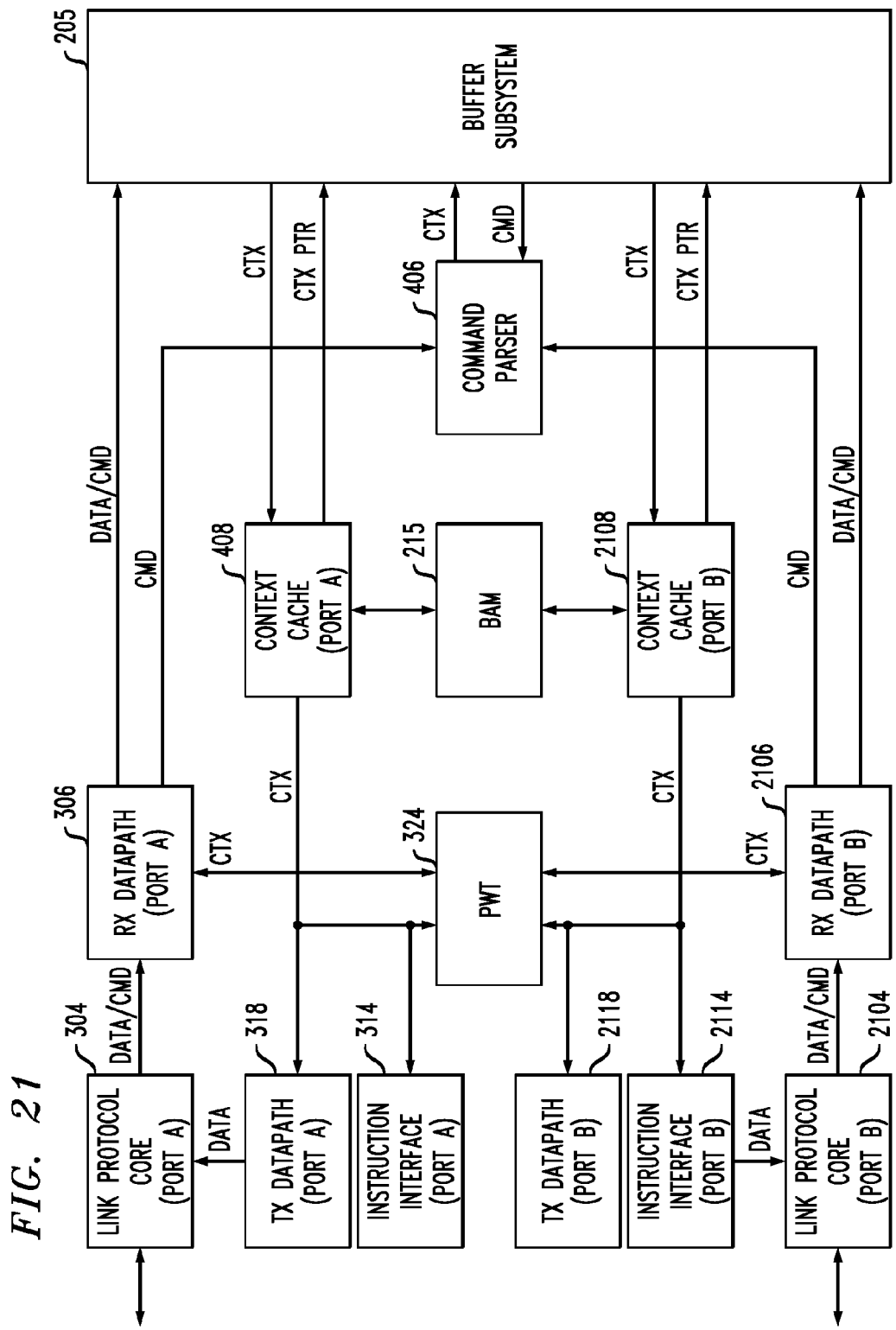
FIG. 21 shows a block diagram of a SAS host subsystem, in accordance with embodiments of the present invention.

FIG. 21 shows a block diagram of a host subsystem for a two-port system, such as for SAS devices, having dual link protocol cores, dual RXDPs and dual TXDPs to support 2-port communication. The embodiment shown in FIG. 21 operates similarly as described with regard herein to single-port devices, although, as shown in FIG. 3, a single port application generally might not include modules to support two ports. Thus, embodiments of the present invention provide that pieces of a SAS host subsystem (e.g., FIG. 21) might be scaled back to provide a SATA host subsystem (e.g., FIG. 3). As shown in FIG. 21, for a two-port SAS device, dual RXDPs 306 and 2106, dual TXDPs 318 and 2118, dual instruction interfaces 314 and 2114, dual context caches 408 and 2108 and dual link protocol cores 304 and 2104 are employed to support dual port operation.

Thus, as shown in FIG. 21, a two port SAS device might include a first context cache module, 408, to interface to TXDP 318 and instruction interface 314 for port A, which has corresponding link protocol core 304. A second context cache module, 2108, interfaces to TXDP 2118 and instruction interface 2114 for port B, which has corresponding link protocol core 2104. Each context cache module 408 and 2108 also interfaces with PWT 324, buffer subsystem 205, and BAM 215, which are shared between port A and port B. Each context cache module 408 and 2108 retrieves the next context to be executed from the thread of contexts as described previously with respect to FIG. 4. Pending Write Table 324, Tag Manager 402, ILT 404 and Command Parser 406 might be scaled to support dual-port operation, but operate generally such as described in regard to FIGS. 3-6. The RXDP and TXDP modules might be substantially unchanged between single port SATA applications and dual port SAS applications.

Figure 22:
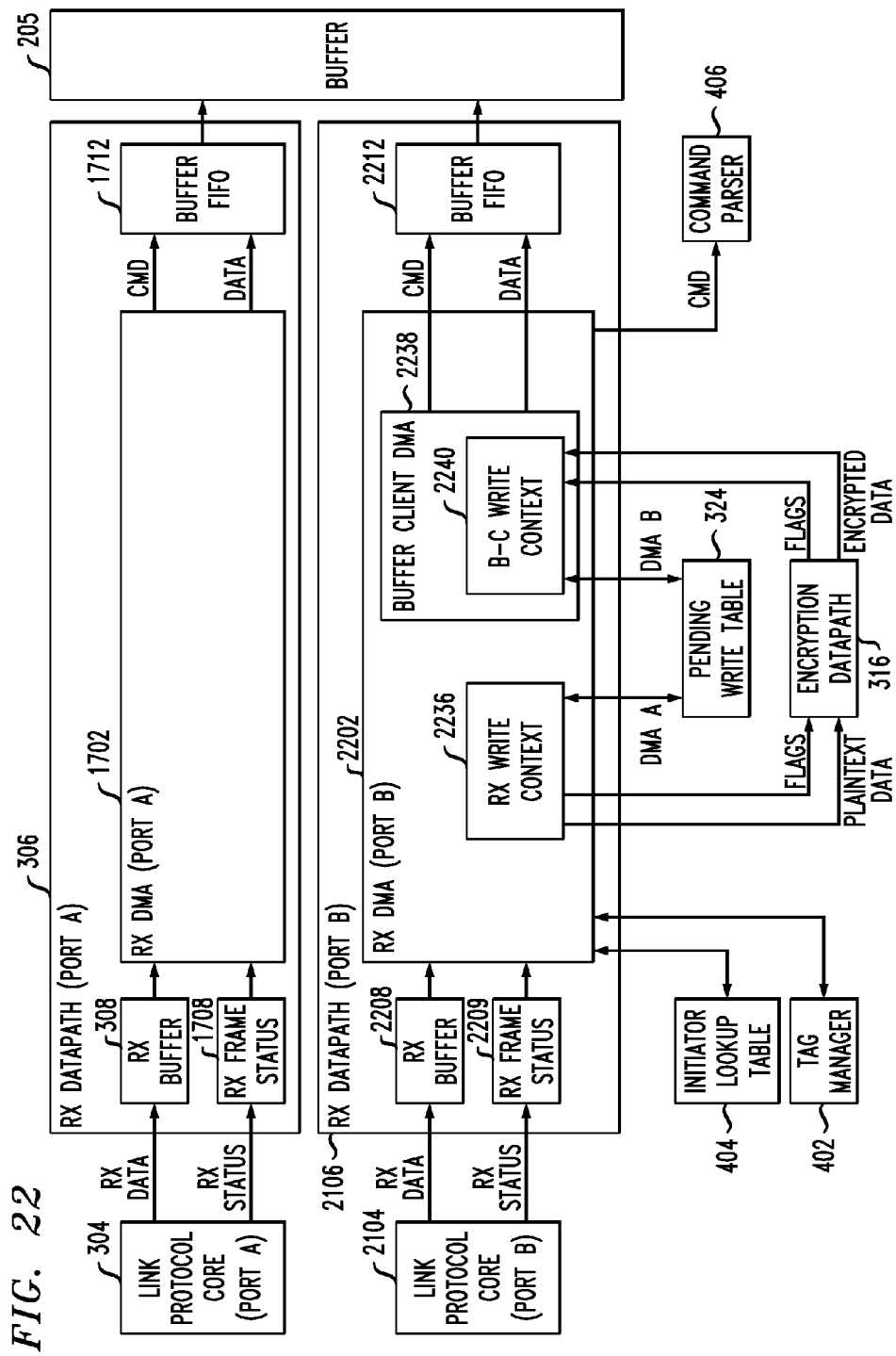
FIG. 22 shows a receive data path of a SAS host subsystem, in accordance with embodiments of the present invention.

FIG. 22 shows an embodiment of RXDP 306 and 2106 employed in a dual-port SAS application such as shown in FIG. 21. As shown in FIG. 22, several features are included to support the SAS protocol, such as initiator lookup table 404 to support multiple initiators, dual link protocol cores, 304 and 2104, to support dual-port full-duplex communication, dual RX datapaths 306 and 2106, and dual RXDMA modules 1702 and 2202 to provide higher bandwidth. In exemplary embodiments of the present invention, one DMA module might be dedicated to a specific port of the communication link. As shown in FIG. 22, RXDMA module 1702 is dedicated to link protocol core 304 for port A, and RXDMA module 2202 is dedicated to link protocol core 2104 for port B. FIG. 22 shows only additional detail of RXDMA module 2202, although typically both RXDMA modules 1702 and 2202 might be substantially similar. To support two full rate simultaneous DMA data transfers, pending write table 324 might have an independent interface with each RXDMA module 1702 and 2202, shown as independent interfaces labeled DMA A and DMA B, respectively. Pending write table 324 also supports processing of multiple outstanding write contexts. In an exemplary embodiment of the present invention, eight active write contexts are preferably supported. Received command frames are checked and routed to internal hardware or a command buffer. For example, if no other commands are queued, the command is sent to command parser 406. If other commands are queued, the command is sent to a buffer and added to the queue. Queued commands might be maintained in a FIFO queue (e.g., command FIFO 323 of buffer subsystem 205) and are processed in the order received. RXDP 306 writes commands to command FIFO 323 when there is more than one command outstanding and commands must be queued. New commands are written to the tail of command FIFO 323. Command parser 406 reads commands from the head of command FIFO 323, preserving the order of the commands. RX Frame Status 1708 and RX Frame Status 2209 will be described in greater detail in regard to FIG. 26.

As described herein, embodiments of the present invention might provide a write context split between the RXDMA module and the buffer interface to handle encryption pipeline operation. A split in contexts might be implemented because the size of incoming data frames to RXDPs 306 and 2106 is not necessarily the same size as the size of outgoing data blocks. As shown, RXDPs 306 and 2106 might interface with Encryption Data Path 316. Encryption Data Path 316 provides data encryption and decryption as a pipeline stage in the data path. Encryption Data Path 316 might encrypt or decrypt one or more blocks of data being transferred between buffer subsystem 205 and at least one of the link protocol cores 304 and 2104. RXDP 306 might add any CRC (cyclic redundancy check) or other ECC (error correction code) protection to data blocks. As shown in FIG. 22, the write context might be split and provided to pending write table 324 as RX Write Context 2236 and a buffer-client (B-C) write context 2240. This context split provides independent operation of RXDMA 2202 to receive data from RX buffer 308 and buffer-client DMA 2238 to provide data to buffer FIFO 1712. This independent operation allows for delay variations caused by the operation of Encryption Datapath 316. For example, Encryption Datapath 316 might have nondeterministic delay since data frame boundaries are not necessarily aligned with encryption block boundaries.

Since the SAS protocol allows for multiple active write commands, PWT 324 provides RXDMA modules 1702 and 2202 access to a list of active write commands. The active write commands might be loaded relatively quickly into the respective RXDMA module to store the write data transfer of received data frames. Since the received frames do not necessarily align with host block boundaries or encryption block boundaries, extra information might be maintained for each outstanding write command, such as, for example, an intermediate CRC, an intermediate data integrity field (DIF), block ECC, or an intermediate block count. PWT 324 might be implemented as RAM or as a register file that stores context information for each write transfer entry along with the associated intermediate information for each entry. The storage size of PWT 324 might be determined such that the data transfer rate is maintained in RXDP 306 while entries are being loaded to one of RXDMA module 1702 or 2202 from PWT 324. In embodiments of the present invention, the data rate of RXDMA modules 1702 and 2202 might be faster than the data rate of the link protocol, such that RXDMA modules 1702 and 2202 can process a currently received data frame and flush RX buffers 308 and 2208 without throttling the link protocol. PWT 324 will be described in greater detail with regard to FIG. 24.

Figure 23:
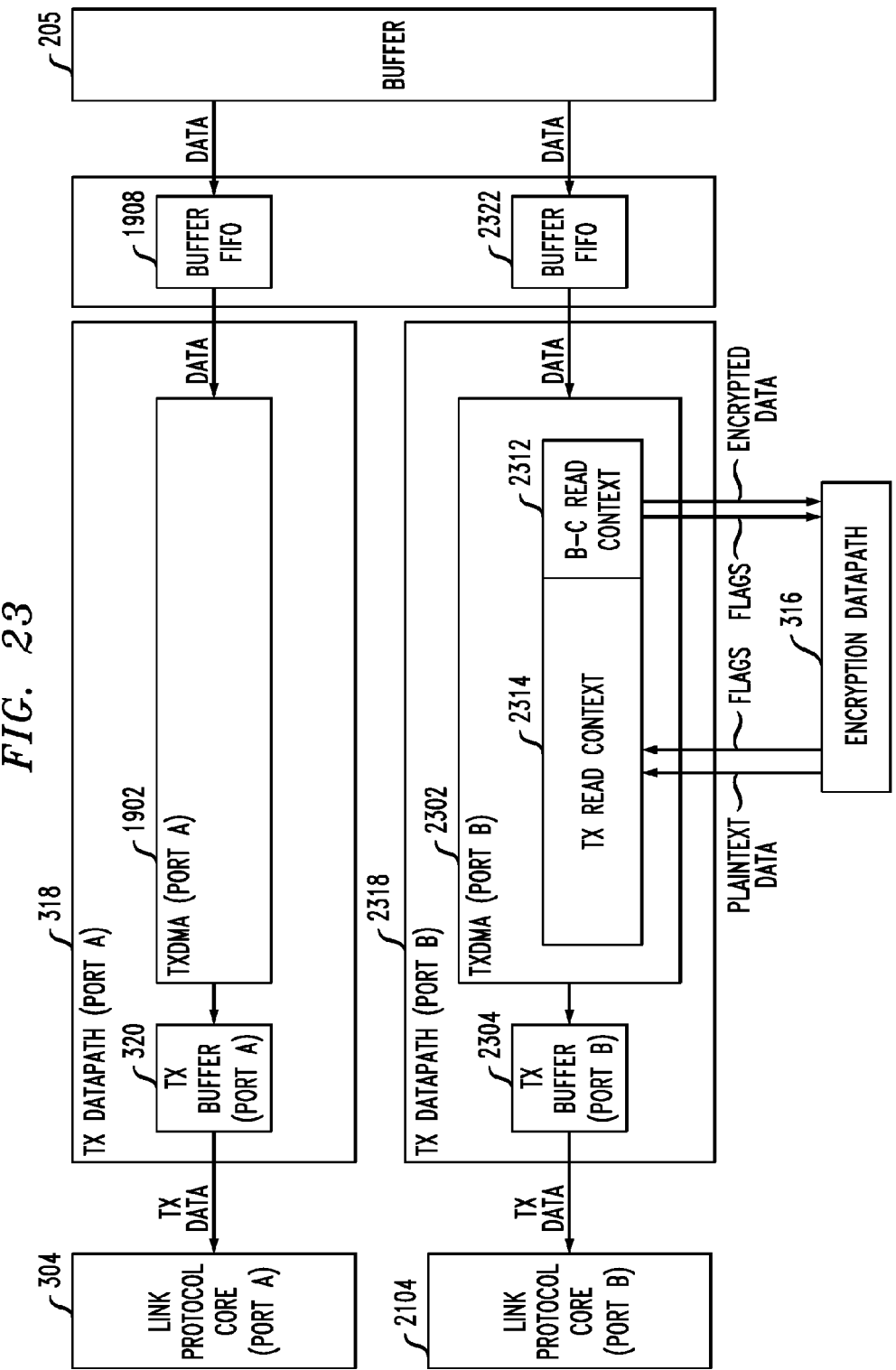
FIG. 23 shows a transmit data path of a SAS host subsystem, in accordance with embodiments of the present invention.

FIG. 23 shows an embodiment of TXDP 318 and 2318 employed in a dual-port SAS application such as shown in FIG. 21. As shown in FIG. 23, several features are included to support the SAS protocol, such as dual link protocol cores, 304 and 2104, to support dual-port full-duplex communication, dual TX datapaths 3318 and 2318, and dual TXDMA modules 1902 and 2302 to provide higher bandwidth. In exemplary embodiments of the present invention, one DMA module might be dedicated to a specific port of the communication link. As shown in FIG. 23, TXDMA module 1902 is dedicated to link protocol core 304 for port A, and TXDMA module 2302 is dedicated to link protocol core 2104 for port B. FIG. 23 shows only additional detail of TXDMA module 2302, although typically both TXDMA modules 1902 and 2302 might be substantially similar. Queued commands might be maintained in a FIFO queue (e.g., context buffer 322 of buffer subsystem 205) and are processed in the order received.

As described herein, embodiments of the present invention might provide a read context split between the TXDMA module and the buffer interface to handle encryption pipeline operation. A split in contexts might be implemented because the size of data chunks stored on media 118 and buffer subsystem 205 might not be the same as the size of outgoing data frames from TXDPs 318 and 2318 to link protocol cores 304 and 2104, respectively. As shown, TXDPs 318 and 2318 might interface with Encryption Data Path 316. Encryption Data Path 316 provides data encryption and decryption as a pipeline stage in the data path. Encryption Data Path 316 might encrypt or decrypt one or more blocks of data being transferred between buffer subsystem 205 and at least one of the link protocol cores 304 and 2104. As describe with regard to the RX datapaths shown in FIG. 22, this independent operation allows for delay variations caused by the operation of Encryption Datapath 316. For example, Encryption Datapath 316 might have nondeterministic delay since data frame boundaries are not necessarily aligned with encryption block boundaries.

Embodiments of the present invention provide for processing multiple write data contexts. Write data contexts might be processed in parallel with other context processing, supporting multiple simultaneous outstanding write commands in parallel with other context operations. By employing a write data context thread that is independent from other context threads, the write data context thread does not impact the execution of the other context threads, allowing high-performance full-duplex operation.

Figure 24:
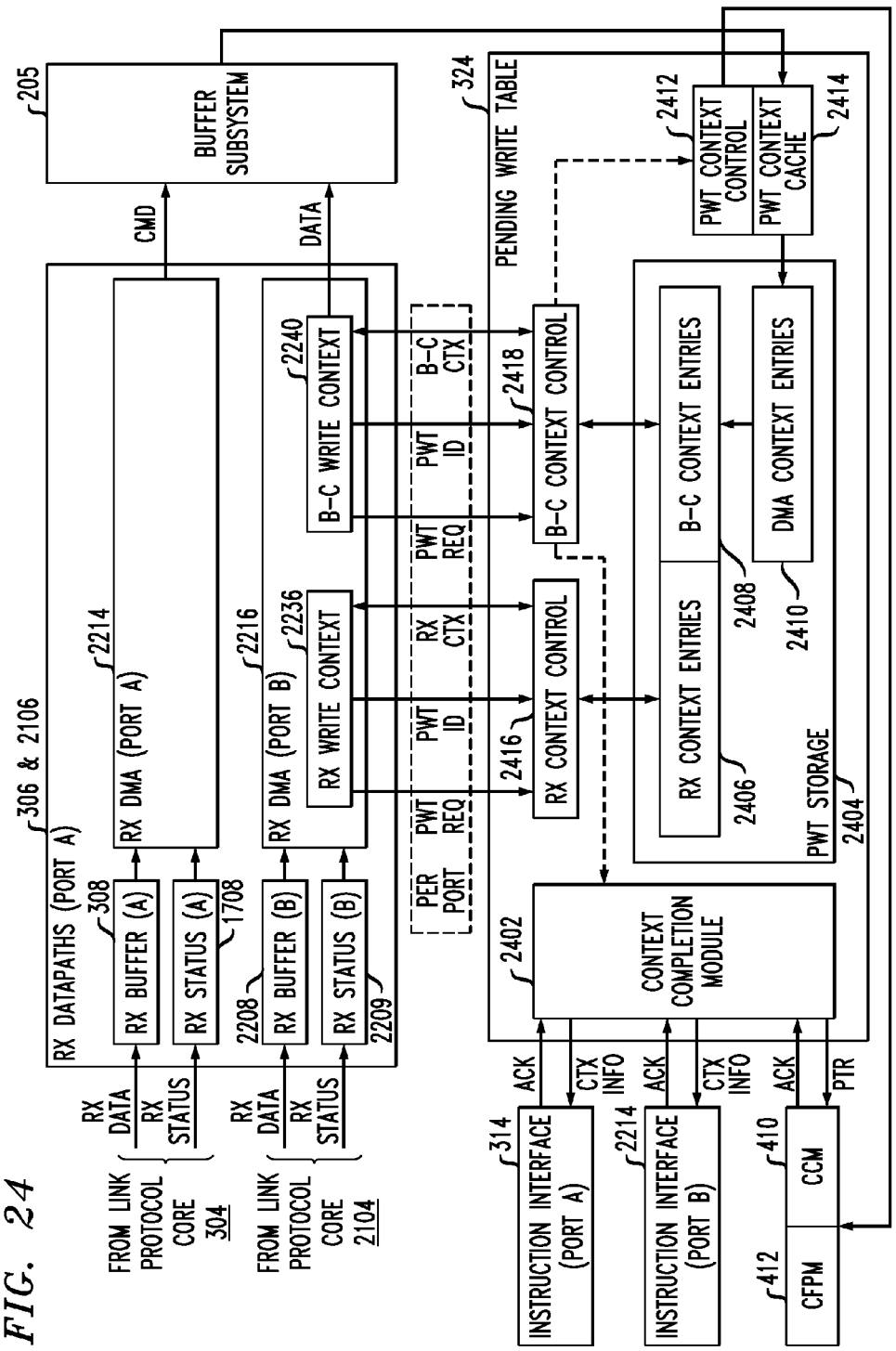
FIG. 24 shows additional detail of the pending write table of FIG. 3, in accordance with embodiments of the present invention.

FIG. 24 shows a block diagram of an exemplary embodiment of Pending Write Table (PWT) 324. As shown, PWT 324 includes PWT context cache 2414, PWT context control 2412, PWT storage 2404, context completion module 2402, receive (RX) context control 2416 and buffer-client (B-C) context control 2418. PWT storage 2404 includes RX context entries 2406, B-C context entries 2408, and DMA context entries 2410. Write context processing is independent of buffer context processing, as shown by PWT Context Cache 2414 and DMA context entries 2410 in PWT storage 2404. DMA context entries 2410 provide a single entry pipeline stage for RX write contexts and B-C write contexts. One DMA context entry is kept available and ready to use before the active RX context or B-C context is completed. When the active context is completed, the staged entry in the corresponding one of RX context entries 2406 and B-C context entries 2408 is loaded as the active context in PWT 324 by one of control modules 2416 and 2418, and the corresponding entry in DMA context entries 2410 is discarded. If there are additional contexts in the write data context thread PWT Context Cache 2414 loads the next context from buffer subsystem 205 so the next PWT Context is available before the active entry completes.

There is a staged context for each PWT Entry (e.g., RX context entries 2406 and B-C context entries 2408), but PWT Context Cache 2414 is shared for all PWT entries. PWT Context Cache 2414 is first-come, first-served context cache in the case of multiple simultaneous requests. Contexts stored in PWT Context Cache 2414 might be modified by processor 116 before the context is loaded to PWT DMA Context entries 2410. Thus, contexts might be modified outside of the performance path of active contexts.

PWT Context Cache 2414 fetches write data contexts from buffer subsystem 205. PWT Context Cache 2414 is independent of the regular context cache 408 for host data requests. PWT Context Cache 2414 allows media controller 104 to quickly switch between different Pending Write Entries to handle the different received frame boundaries since a SAS Initiator can send data frames for a TRANSFER READY request at its convenience. Since there can be an entire thread of contexts associated with each Pending Write Entry, PWT 324 needs to react to incoming data traffic without impacting the context thread currently being processed. A staged context entry allows shared context cache 2414 to stay ahead of the active Pending entry.

As shown in FIG. 24, for a SAS device, one PWT (324) is shared by both the Port A and Port B Receive Datapaths, 306 and 2106, respectively. In FIG. 24, only the details of RXDMA module 2202 are shown, but RXDMA module 1702 might generally be substantially the same. As indicated by the dashed line, control signals are passed between each of RXDMA 1702 and 2202 and RX context control 2416 and B-C context control 2416. In embodiments of the present invention, PWT 324 stores information for up to eight contexts. These contexts are employed to move write data to buffer subsystem 205 after transmitting TRANSFER READY frames. Thus, B-C context entries 2408 supports eight B-C contexts, RX context entries 2406 supports eight RX contexts, and DMA context entries 2410 supports eight DMA contexts to feed the B-C and RX contexts. DMA context entries 2410 might load contexts from up to eight context threads. As shown, context completion module 2402 handles context completion tasks such as requesting that an instruction interface (e.g., 314 or 2114) transmit a response, delete the command tag from tag manager 402 (not shown in FIG. 24), and recycle the context pointer in CCM 410 and CFPM 412.

When a series of contexts is created to transmit a TRANSFER READY frame and receive the corresponding data from the initiator, an entry in PWT 324 is allocated. When a data frame is provided at the output of the receive buffer (e.g., 308 or 2208), the RXDP (e.g., 306 or 2106) loads the corresponding context from RX context entries 2406. The data frame might then be removed from the receive buffer. The data received by the RX buffers is possibly interleaved with one or more separate commands. In same context mode, the entire data transfer is represented by a single context. If a data frame for a different command is received next by the RX buffer, then RXDP 306 writes the RX context for the previous frame to RX context control 2416 and loads the corresponding RX context for the current data frame. Once all data for a context has been moved to buffer subsystem 205 and a status frame has optionally been sent, then the entry of PWT 324 is completed and can be allocated for a new transfer.

In different context mode, one TRANSFER READY context is created for the instruction interface (e.g. 314 or 2114) to send the TRANSFER READY frame. A series of DMA contexts are created to process the TRANSFER READY context. The series of DMA contexts must be available to PWT 324 as the matching data is received at the RX buffer. A separate thread of DMA contexts is created for each TRANSFER READY context. RX and B-C context entries 2406 and 2408 provide the current contexts to RX context module 2236 and B-C context module 2240. PWT storage module 2404 also fetches and stores the next DMA context in the write thread. By having the next context available, PWT 324 and RX datapaths 306 and 2106 can quickly change context threads when data for a different command is received. As each DMA context is consumed, PWT Context cache 2414 fetches the next context from, for example, buffer subsystem 205.

Embodiments of the present invention provide generic DMA operation in media controller 104. This generic DMA capability might allow media controller 104 to copy data from one buffer location to another and to change the format of data as it is moved. Embodiments of the present invention might provide a connection between the independent receive and transmit DMA modules (e.g., RXDMA modules 1702 and 2202 and TXDMA modules 1902, 2302), allowing isolation of internal data transfers from link protocol cores (e.g., 304 and 2104) without a dedicated DMA module for internal data management. Thus, embodiments of the present invention provide internal loopback capability using the RX and TXDMA modules. Embodiments of the present invention might support features employing the internal Generic DMA such as, for example, internal transfers of data in buffer memory, memory test pattern generation and checking, data copy with encryption, and repetitive write operations to media 118.

Figure 25:
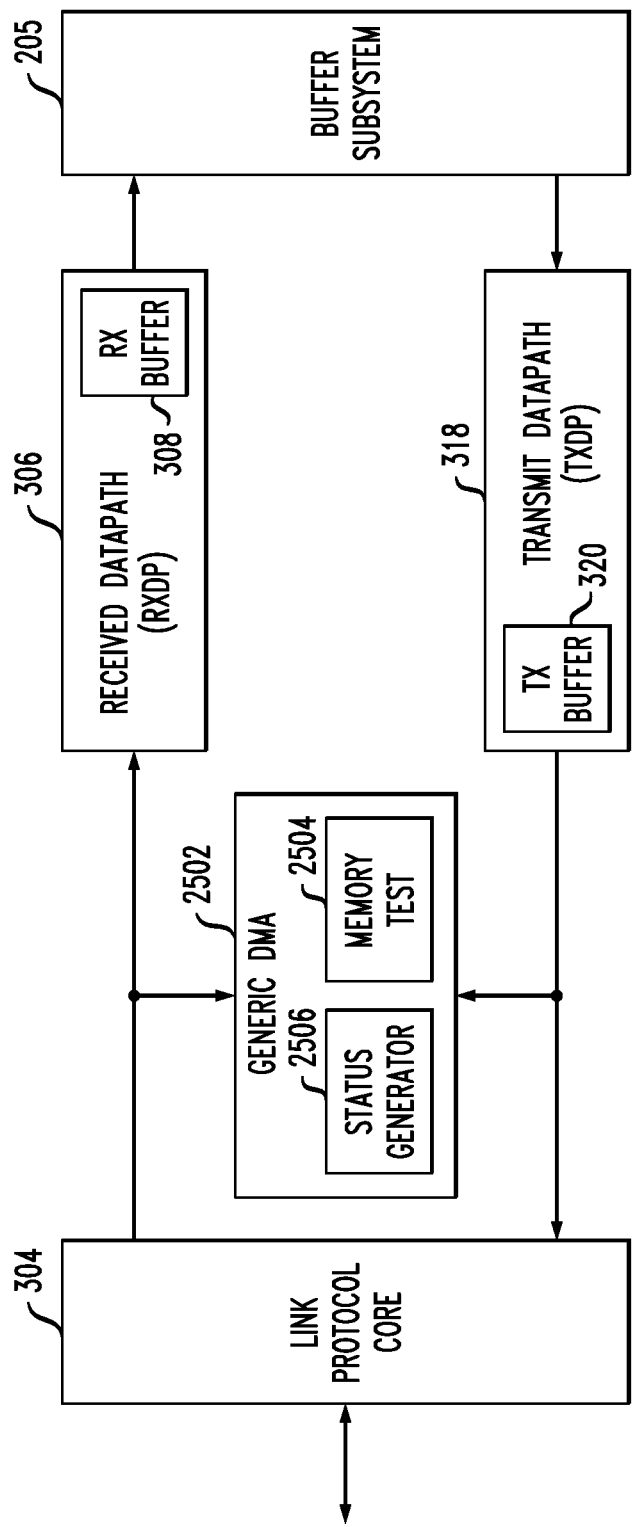
FIG. 25 shows a block diagram of a generic DMA module, in accordance with embodiments of the present invention.

FIG. 25 shows Generic DMA (GDMA) module 2502 integrated with RXDP 306 and TXDP 318. As shown, GDMA module 2502 is placed between TX Buffer 320 and RX Buffer 308 so it is isolated from the circuitry of RXDP 306 and TXDP 318. TX Buffer 320 is employed as a FIFO buffer, and its Data Available index is provided to GDMA 2502. RX Buffer 308 writes data in segments with a status entry corresponding to each data segment. These status entries are generated by status generator 2506 and are used to synchronize data segments between the link protocol and the media protocol. GDMA 2502 formats status entries substantially the same as regular data packets received from Link Protocol Core 304. Thus, RXDP 306 operates without any changes to its structure. To enable GDMA 2502, Link Protocol Core 304 is placed into an idle mode where it does not respond to incoming data transfer requests for the duration of the GDMA operation. When the GDMA operation has been completed, Link Protocol Core 304 is returned to normal operation mode.

Embodiments of the present invention might employ GDMA module 2502 to perform data operations where link protocol core 304 is beneficially isolated from the data path. Such operations might include: 1) move buffer data from one buffer location to another in buffer subsystem 205; 2) move host data from one buffer location to another; 3) read and overwrite host data from one or more buffer locations; 4) read encrypted buffer cipher text data, decrypt the buffer data, and then write plain text data; 5) read buffer plain text data, encrypt the buffer data, and then write cipher text data; and 6) performing memory tests.

GDMA 2502 might support at least four transfer modes: i) loopback mode, ii) write same mode, iii) memory test mode, and iv) memory read test mode. In loopback mode, GDMA 2502 is programmed with a Total Transfer Count indicating the size of the data transfer and configuration information indicating the type of the data transfer. GDMA 2502 then checks to determine if data can be stored in TX Buffer 320 and if data can be moved from TX Buffer 320 to RX Buffer 308. GDMA 2502 then moves the data from TX Buffer 320 to RX Buffer 308 and status generator 2506 creates a status entry after data has been written to RX Buffer 308. GDMA 2502 can be throttled by TX Buffer 320, but will continue the data transfer until the Total Transfer Count reaches zero.

In write same mode, GDMA 2502 is also programmed with the Total Transfer Count and configuration information. TX Buffer 320 is loaded with a single block of data that is to be written to multiple locations in media 118. TX Buffer 320 includes a wrap pointer that is adjusted to wrap at the block data boundary. In write same mode, GDMA 2502 does not check to determine if data can be stored in TX Buffer 320 since only one block is stored as TX Buffer 320 repeats the same data block continuously until the Total Transfer Count reaches zero. TXDP 318 is generally not involved in a write same operation because the data block is already stored in TX Buffer 320. GDMA 2502 routes the data through RX Buffer 308 and RXDP 306.

In memory write test mode, GDMA 2502 is programmed with total transfer count, configuration information, and a data pattern configuration. Memory test module 2504 generates a data pattern as defined by one or more data pattern configuration options set by a user. This data pattern is written to RX Buffer 308 and routed through RXDP 306 until the Total Transfer Count reaches zero. TX Buffer 320 and TXDP 318 are not involved in a memory write test operation. The data pattern is stored to media 118 and optionally checked or validated using memory read test mode.

Memory test data patterns are defined by writing the data pattern configuration options to a register in GDMA 2502. The test pattern is generated according to four data pattern configuration options: i) a Rotate Left option shifts the pattern left by a single bit for each dataword transferred, ii) a Rotate Right option shifts the pattern right by a single bit for each dataword transferred, iii) an Add option adds a predetermined value to the pattern for each dataword transferred, and iv) an Add byte-wise option performs byte-wise addition of a predetermined value and the pattern for each dataword transferred. Thus, embodiments of the present invention support walking zeros test patterns, walking ones test patterns, and incrementing test patterns.

In memory read test mode, GDMA 2502 is programmed with Total Transfer Count, configuration information, and the data pattern configuration. TXDP 318 is programmed to route data through TX Buffer 320 to GDMA 2502. GDMA 2502 then compares the incoming data from TX Buffer 320 with the data pattern configuration. Each dataword is compared and discarded until the Total Transfer Count reaches zero or a difference between received data and the test pattern is detected by memory test module 2504. RX Buffer 308 and RXDP 306 are not used for memory read test operations.

GDMA 2502 operates with the same clock as Link Protocol Core 304 and converts the output of TX Buffer 320 into frame structures that are written to RX Buffer 308. During GDMA operations, RXDP 306 is configured to bypass ILT 404 and Tag Manager 402. Data is sent directly from TX Buffer 320 to RX Buffer 308, and RX Buffer 308 creates a frame format compatible with RXDP 306. RXDP 306 is configured to bypass the header and frame checks, as described below, since the header and status fields of each test frame contain dummy data for the memory test modes.

Embodiments of the present invention pass status information along with each frame as it is synchronized between the link protocol and media controller 104. This frame status information allows media controller 104 to perform checks on data and command frames before the frame is removed from the RX Buffer (e.g., at least one of RX Buffers 308 and 2208, simplifying handling of command and other frame errors. Embodiments of the present invention provide parallel frame checking and frame data buffering. Status information is extracted from the received frame before the frame is removed from the RX Buffer, thus, avoiding problems in handling exceptions that might occur with received frames that are moved further along the receive datapath, which might result in "partially moved" frames.

Figure 26:
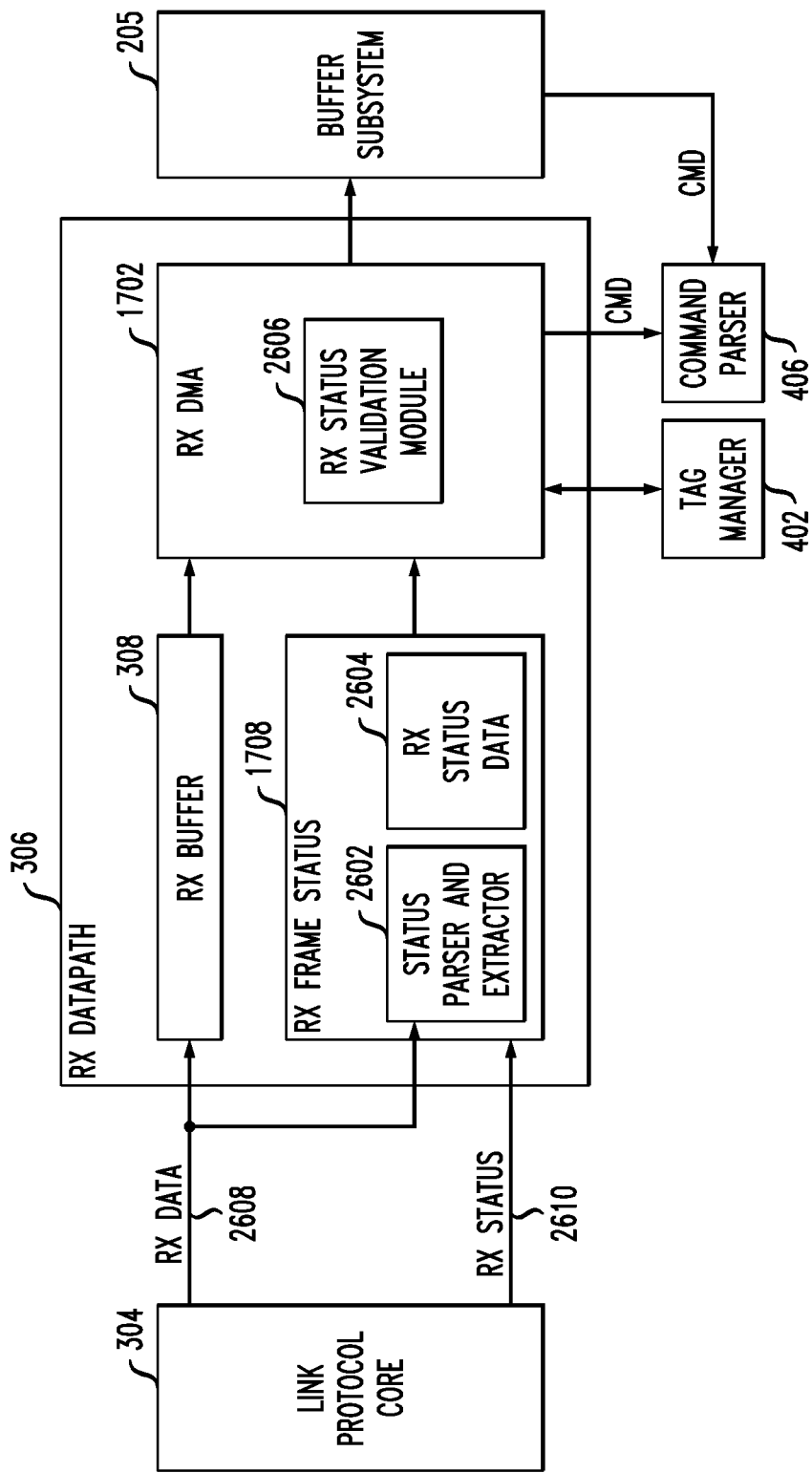
FIG. 26 shows a block diagram of the receive datapath of FIG. 25, in accordance with embodiments of the present invention.

FIG. 26 shows a block diagram of RXDP 306, which is adapted to provide frame and command validation for received frames. As shown, RXDP 306 includes RX Buffer 308 that generally passes frames from Link Protocol Core 304 to RXDMA 1702. The frames might contain data, commands, or other information. Exception conditions are beneficially detected before any of the frame is removed from RX Buffer 308 so the frame is static in RX Buffer 308 when the exception is detected. Generally, RXDP 306 automatically handles data and command frames and generates an interrupt for all other frame types (i.e. exceptions). For all frames, RXDP 306 checks if there were any link errors that occurred during the reception of the frame. For data frames, RXDP 306 checks Initiator and Connection information to determine if the data frame was routed properly and was received at the proper time. For command frames, RXDP 306 checks the initiator info, connection info, and command tag to verify the command before moving the command from RX Buffer 308.

To allow the frame checks to occur before the frame is removed from RX Buffer 308, the data payload portion of the frame is separated from the status information for that frame, shown as RX data 2608 and RX status 2610. As shown, RX frame status module 1708 receives RX status 2610. RX status 2610 indicates that a frame is received and is available to RXDP 306 before the frame is removed from RX Buffer 308. RXDP 306 reads all of the status information for that frame. Since some of the status information required to perform the frame checks (e.g. the Command Tag, Initiator Information) are contained in the frame or in other modules of media controller 104, status parser and extractor 2602 extracts the status data from the frame and modules of media controller 104 as the frame data is written to RX Buffer 308. Extracted status data is stored in RX status data module 2604. For SAS, since multiple initiators and connections are possible, the RX status information includes i) frame status (e.g. data, command, header, payload, or other frame type), ii) frame link error information, iii) initiator information, iv) connection information, and v) the command tag. For SATA, since there is only a single initiator, the initiator and connection information is generally not required.

RX status data module 2604 might generally include one or more registers for storing RX status data. For example, some embodiments might include 32-bit RX Buffer Status registers. When the frame status indicates that the received frame is a header frame, the RX status data might include the initiator connection tag (ICT), a link protocol code, an initiator port number, and a starting address of the received frame in RX Buffer 308. When the frame status indicates that the received frame is a payload frame, the RX status data might include the frame length and flags that are set to indicate frame errors such as, for example, CRC, alignment, parity, overflow, and other errors. Other flags might indicate that additional frames are included in the corresponding data transfer operation.

RX status validation module 2606 might include one or more registers for transferring RX status data to other modules of media controller 104 such as, for example, RXDMA module 1702, tag manager 402, command parser 406, PWT 324, and ILT 404. For example, for a received SAS frame, data might be extracted from the received frame that indicates the frame length of the command, the protocol transfer rate (which is saved with the command and stored in the corresponding context), the Pending Write Table ID associated with the data transfer, the Initiator Connection Tag (ICT), the command tag for a data frame, and the WWN of the initiator. For example, RX status validation module 2606 might pass the WWN and ICT to ILT 404 to verify if the received frame was from a known, active, initiator.

Embodiments of the present invention employing an RX datapath as described herein provide the benefit of verifying a received frame before the frame is removed from the RX Buffer, which allows for common handling of any frame exceptions.

Both the SATA and SAS protocols include certain commands that are defined as high priority commands that should be processed as fast as possible. Since high priority commands might be mixed with other normal commands, an early indication that a high priority command was received, without reordering other commands, embodiments of the present invention provide an early indication that a high priority command was received, which allows multiple high priority commands to be processed as part of the normal command processing sequence. As will be described herein, embodiments of the present invention employ outstanding command FIFO 323 that might be configured to detect and count high priority commands as they are added to the tail end of the FIFO. Upon detecting a high priority command, an interrupt might be generated to process the high priority command.

The SATA protocol includes several QUEUED commands that might be handled as high priority commands. For example, the NCQ QUEUE MANAGEMENT command, a command with the SATA PRIORITY bit set, or a command with an execution time limit, might all be handled as high priority commands. The SAS protocol includes numerous types of SCSI queue management commands that might be handled as high priority commands.

Figure 27:
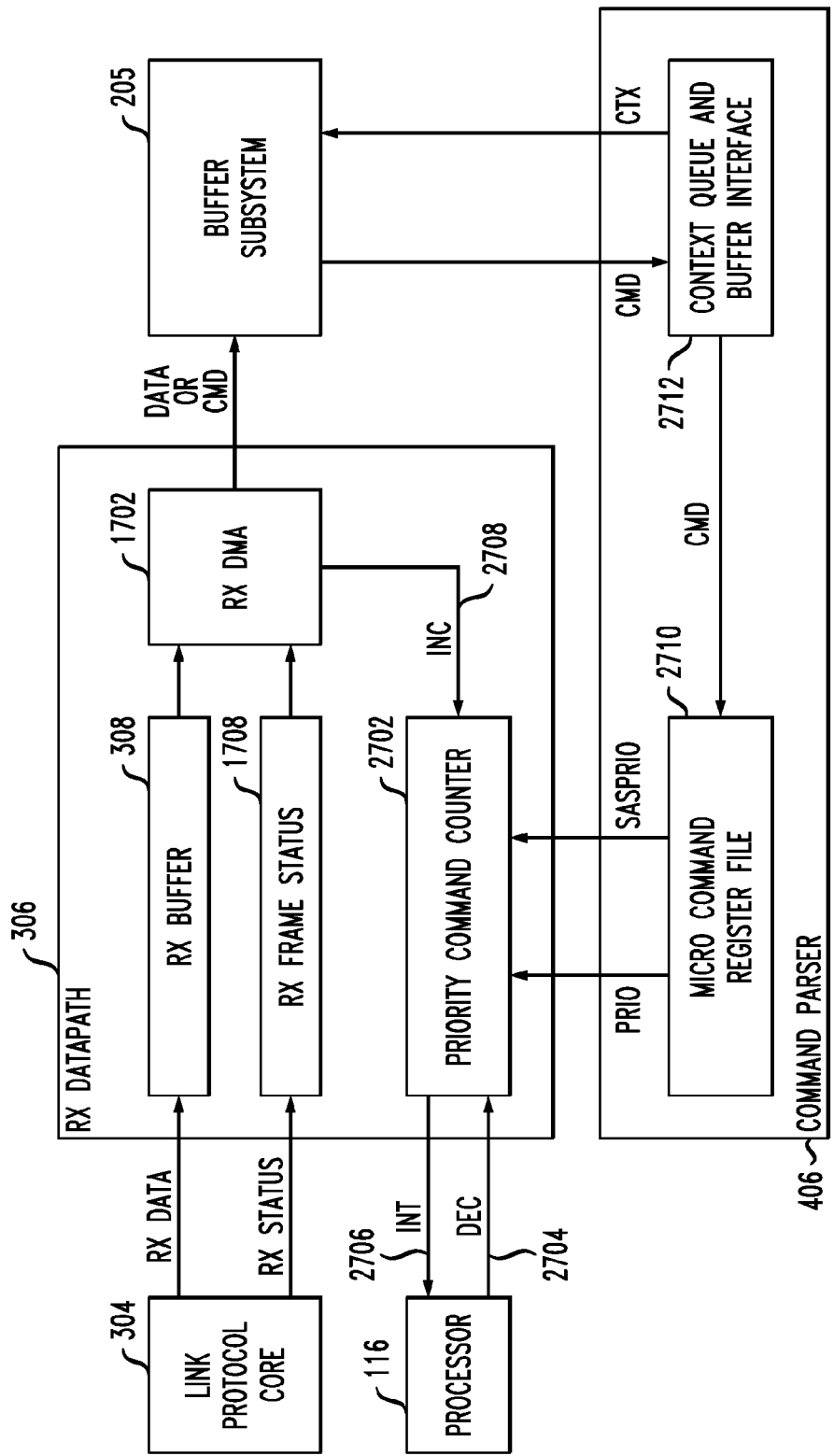
FIG. 27 shows a block diagram of a receive datapath adapted to detect and track high priority commands, in accordance with embodiments of the present invention.

FIG. 27 shows a block diagram of RXDP 306 that is adapted to detect and track high priority commands. As shown in FIG. 27, RXDP 306 includes priority command counter 2702. When a command is received and verified by RXDP 306, RXDP 306 moves the command from RX Buffer 308 to command FIFO 323 maintained in, for example, at least one of buffer subsystem 205 and context queue and buffer interface 2712 within command parser 406. Commands are added to the tail of the FIFO as they are received, and commands are removed from the head of the FIFO as the commands are processed. When a PRIORITY (SATA) or HEAD OF QUEUE (SAS) command is added to the tail of command FIFO 323, priority command counter 2702 is incremented, as indicated by increment control 2708. When priority command counter 2702 is non-zero, an interrupt, 2706, is generated to indicate to processor 116 that a high priority command is in command FIFO 323. Processor 116 then might process the priority command during the interrupt. When the priority command is processed, priority command counter 2708 is decremented, as indicated by decrement control 2704. Thus, multiple priority commands are received without interrupting processing of the previous priority command.

As described herein, SATA first party DMA (FPDMA) commands that have the PRIORITY bit set, and SAS commands that are IMPLICIT HEAD OF QUEUE or have a Task Attribute that is HEAD OF QUEUE, are handled as high priority commands. Priority command counter 2702 increments when RXDP 306 moves a high priority command to the command queue. Priority command counter 2702 might also maintain status bits that indicate whether a command was HEAD OF QUEUE (SAS) or PRIORITY (SATA). For example, for SAS, RXDP 306 might increment a HEAD OF QUEUE counter maintained in priority command counter 2708 when a command is moved from RX Buffer 308 if the command has the SAS Task Attribute field set to HEAD OF QUEUE, ORDERED or ACA, or if the command is an IMPLICIT HEAD OF QUEUE command. If these conditions are met, command parser 406 might set a status bit indicating a SAS priority command. For SATA, RXDP 306 might increment the Head of Queue counter maintained in priority command counter 2708 when an FPDMA command is moved from RX Buffer 308 if the command has the PRIORITY bit set. If the PRIORITY bit is set, command parser 406 might set a status bit indicating a SATA priority command.

In general, embodiments of the present invention process SATA and SAS priority commands similarly. For example, whenever a new command is added to the command queue, processor 116 might check whether priority command counter 2708 is greater than zero. If the counter is greater than zero, normal priority commands might be saved without creating contexts, instead generating contexts for the high priority command.

The SCSI command set supports command re-ordering with Task Attributes indicating ORDERED or HEAD OF QUEUE commands. In response to such commands, the command queue must be reordered to place the Ordered SCSI commands ahead of other commands in the command queue. An interrupt might be generated when an ORDERED or HEAD OF QUEUE command is received and the number of ORDERED or HEAD OF QUEUE commands are tracked. For example, priority command counter 2708 might maintain a HEAD OF QUEUE counter that is incremented every time an ORDERED or HEAD OF QUEUE command type is detected. Since the Task Attribute is embedded in the command, RXDP 306 might still write the command to the command queue and an interrupt is generated to indicate that a HEAD OF QUEUE command type has been received. After handling the HEAD OF QUEUE command, the HEAD OF QUEUE counter is decremented. The HEAD OF QUEUE counter provides support for receiving multiple HEAD OF QUEUE command types before processing the first HEAD OF QUEUE interrupt.

After the HEAD OF QUEUE interrupt is generated and counter is incremented, command parser 406 might be frozen and RXDP 306 might step through the commands stored in the command queue to find the HEAD OF QUEUE command. RXDP 306 might move the HEAD OF QUEUE command to command parser 406 for processing, without changing the order of other commands in the command queue. Thus, embodiments of the present invention employing an outstanding command FIFO provide support for processing high priority commands without changing the order of other commands in the command queue.

As described herein, a context is a data structure that provides the information necessary to transmit or receive SAS frames or SATA FIS on the bus. In embodiments of the present invention, contexts might be grouped into flow categories. Media controller data transfer performance is generally important for data transfers, but other operations might not require high data transfer performance. For example, special types of data transfers, such as negotiation of bus parameters or error correction, might operate at lesser priority levels than data transfers, and be subject to higher latency than data transfers. However, special types of transfers might require a higher degree of control over the frames that are transmitted. Embodiments of the present invention provide three data paths to generate SATA FIS or SAS frames: i) Automated Instruction Generation, ii) Non-Automated Instruction Generation, and iii) Manual Frame Generation.

Approaches to context processing tend to be protocol-specific. For example, a SATA media controller might generate contexts containing all of the fields for an FIS, reducing processing performance by having a context structure specific to the SATA protocol. Similarly, a SAS media controller might employ SAS-specific context processing hardware, which does not easily provide support for non-automated frames.

Automated Instruction Generation (AIG) mode provides a high performance path for data transfers. In AIG mode, the context structure defines data block structures that share a highly common structure between SATA and SAS. Context execution hardware implements the transfer protocol (e.g. SATA PIO mode, SATA DMA mode, SATA NCQ mode, SAS, etc.). Information in one context is employed to transfer a series of one or more frames on communication link 102 in conformance with the appropriate protocol. For AIG mode, firmware running on processor 116 breaks up commands based upon the setup frame requirements for the protocol. Processor 116 programs high level information about the transfer, such as the protocol, the amount of data, response requirements at the end of the command, etc.

For the data performance path (e.g., RXDP 306 and TXDP 318), the majority of context fields are shared between the SATA protocol and the SAS protocol. Thus, context data structures might be substantially equivalent for the SAS protocol and the SATA protocol, allowing for increased design flexibility. For example, typical data stored within a context might include: context configuration data, pointers to a next context for the data transfer and the buffer location of the data to transfer, the total length of the data transfer, an offset representing the location of the data transfer if the transfer is not aligned to boundaries of the buffer, and the logical block address (LBA) of the data transfer. Contexts might also include other status data to be passed between processing modules of media controller 104. In embodiments of the present invention, contexts might typically include 12 32-bit datawords. AIG mode will be described in greater detail in regard to FIG. 28.

Non-Automated Instruction Generation (NAIG) mode provides control over the fields in the frames. In this mode, context fields might correspond directly to frame fields, and, further, single contexts might correspond one-to-one with single frames. Thus, a context exists for each transferred frame. A non-automated instruction thus might cause one FIS or frame to be transmitted. NAIG mode advantageously provides greater control over fields within the frame, for example, in NAIG mode, firmware running on processor 116 might have control over one or more fields within each type of FIS. NAIG mode might be employed for lower performance transfers, such as error handling or transfers where more control of protocol fields is required. This allows greater design flexibility in response to changes in protocol specifications for future mode support. A non-automated instruction is used, for example, to send status at the end of a command that failed.

Non-automated instruction generation gives firmware running on processor 116 control over most fields in each type of FIS. Non-automated instruction generation might be used, for example, to send status at the end of a command that failed. Contexts are queued, with each context generating one FIS.

Manual Frame Generation (MFG) builds one frame in a buffer and issues a context corresponding to this one frame. Firmware running on processor 116 has full control over generation of the frame. Thus, in MFG, firmware builds all datawords of a FIS or frame in the buffer. Firmware then creates a buffer context that indicates to send a manual FIS/frame, and that contains the buffer address for the FIS/frame and the length of the FIS/frame. This frame is then transmitted from the buffer and onto the bus. MFG generally will not be used, but could be employed to provide vendor specific frame(s) that might not be defined in a standard protocol, and further allows for generation of customized test sequences. Thus, as described herein, embodiments of the present invention provide common context fields that can be applied to multiple-frame bus transfers to facilitate fast bus transfers. A high-level context structure allows firmware running on processor 116 to generally be independent of protocol details for data block transfers because the majority of contexts are similar between SATA and SAS protocols. A non-automated context flow provides control of individual frame fields.

Instruction interface 314 processes protocol commands, issuing instructions to link protocol core 304 to transmit FIS (SATA protocol) or frames (SAS protocol) and to handshake with a host device in communication with communication link 102. Contexts provide the information to instruction interface 314 necessary to process protocol commands. Firmware running on processor 116 creates and writes these into linked lists in context buffer 322. Context Cache 408 loads each context in the linked list, and passes the context to instruction interface 314 for execution. Instruction interface 314 is also in communication with RXDP 306 and pending write table 324. The path from RXDP 306 to instruction interface 314 provides support for SATA FPDMA commands (e.g. to transmit a register FIS clearing busy). The path from pending write table 324 is used to transmit a response after write data has been received by media controller 104. As described in regard to FIG. 9, instruction interface 314 for the SAS protocol includes a few additional modules versus instruction interface 314 for the SATA protocol. For example, for SAS protocol support, additional modules such as PWT 324 and initiator lookup table 404 are in communication with instruction interface 314. Instruction interface 314 includes a state machine to process frames as necessary to fulfill the protocol requirements. Block based data transfer commands are handed using automated instruction generation.

For example, media controller 104 might be in communication with a SATA device and receive a command to transmit 8 blocks of data using the SATA FPDMA (NCQ) protocol. As will be described with respect to FIG. 28, the SATA protocol for this transfer is for the device to transmit a DMA SETUP FIS, and then to transmit pairs of DMA Activate and Data FIS until all data has been transmitted, at which point a SetDeviceBits FIS is transmitted as a response. In embodiments of the present invention, one context is generated to transmit both the data and the response. Details of the transmitted FIS, such as entries placed in the DMA Buffer Identifier field of a DMA SETUP FIS, are handled by automated hardware.

FIG. 28 shows state machine 2800 of instruction interface 314 to automatically create any necessary FIS to complete the context processing for an exemplary SATA FPDMA request. As shown in FIG. 28, there are seven possible states that might exist in the processing of a context by instruction interface 314: idle (state 2802), SETUP FIS (state 2804), activate FIS (state 2806), RX data (state 2808), TX data (state 2810), status FIS (state 2812), and clear context and command tag (state 2814). In general, the state machine is at idle (state 2802), and maintains this state, as shown by state transition 1, until a context is provided to instruction interface 314 to process a SATA FPDMA request. Once a context is provided to instruction interface 314 to process a SATA FPDMA request, instruction interface 314 proceeds to SETUP FIS state 2804, as indicated by state transition 2, and a context indicating information to be sent in a FIS is generated in context buffer 322. Based on this context, instruction interface 314 generates the FIS data and transfers the FIS data to link protocol core 304 to generate and transmit the FIS. If the SATA FPDMA request is a write data request, instruction interface 314 proceeds to activate FIS state 2806, as indicated by state transition 5. At activate FIS state 2806, a DMA activate FIS is transferred to link protocol core 304. As indicated by state transitions 12 and 13, instruction interface 314 transitions between RX data state 2808 and activate FIS state 2806 until all the data of the write data request is received by host subsystem 201. Once all the data of the write data request is received, instruction interface 314 proceeds to status FIS state 2812, as indicated by state transition 9. At status FIS state 2812, a status FIS is transferred to link protocol core 304.

Once the status FIS is processed, instruction interface 314 proceeds to clear context and command tag state 2814, as indicated by state transition 11. At clear context and command tag state 2814, instruction interface 314 clears its context, and the command tag is cleared from tag manager 402. After the context and command tag are cleared, instruction interface 314 returns to idle state 2802, as indicated by state transition 4.

If the SATA FPDMA request is a read data request, instruction interface 314 proceeds from SETUP FIS state 2804 to TX data state 2810, as indicated by state transition 6. At TX data state 2810 the context for the entire data transfer is processed. After all the data of the read request is transferred, as indicated by state transition 8. Alternatively, the command tag might be cleared, as indicated by state transition 10. Once the status FIS is processed, instruction interface 314 proceeds to clear context and command tag state 2814, as indicated by state transition 11. At clear context and command tag state 2814, instruction interface 314 clears its context and clears the command tag from tag manager 402. After the command tag is cleared, instruction interface 314 returns to idle state 2802, as indicated by state transition 4. Also, as indicated by state transition 3, instruction interface 314 might proceed from idle state 2802 to clear context and command tag state 2814, for example, to clear a context for an aborted transfer. As indicated by state transition 7, a status FIS might be sent any time a data transfer or other command completes without error. Thus, instruction interface 314 transmits the necessary Setup or Activate FIS, transmits one or more data FIS, transmits a FIS to indicate good status at the end of a command, deletes the command tag at the end of the command, and optionally recycles the context pointer after each context has completed.

Embodiments of the present invention provide six automated FIS sequences for the SATA protocol: Auto-Status, DMA data transfer, PIO data transfer, PIO Multiple Mode, FPDMA Queued Commands, and FPDMA Queued data transfers. Instruction interface 314 automatically formats and sends an auto-status FIS after a read data transfer completes without error. The auto-status FIS is a register FIS for PIO and DMA read commands, and is a Set Device Bits FIS for FPDMA Queued read or write commands (e.g., state 2812). The automated DMA data transfer sequence automatically controls a DMA data transfer, including sending the DMA activate FIS (e.g., state 2806), data transfer FIS (e.g., states 2808 and 2810), and status FIS (e.g., state 2812). The context stored in context buffer 322 indicates the data transfer amount and control bits for desired protocol sequence, and instruction interface 314 automatically steps through the DMA sequence (e.g., DMA Activate for write, transfer data FIS, repeat until data transfer is complete, then send status for read, as shown in FIG. 28).

The automated PIO Data Transfer sequence automatically controls PIO data transfers, including sending the PIO SETUP FIS, the data transfer FIS, and the status FIS for a read command. The context stored in context buffer 322 indicates the data transfer amount and control bits for desired protocol sequence. Similarly as described for the automated DMA data transfer shown in FIG. 28, instruction interface 314 automatically steps through the PIO sequence (PIO SETUP FIS, data transfer FIS, repeat until transfer is complete, status FIS). The automated PIO Multiple Mode automatically combines contexts to transfer multiple blocks in a single FIS. As described with regard to FIGS. 14-16, separate contexts might be employed for the PIO SETUP FIS and subsequent data transfer contexts.

After receipt of FPDMA Queued Command, the automated FPDMA Queued Command sequence automatically verifies the command FIS and the FIS tag and sends the Register FIS to clear the BUSY bit for that received command. The automated FPDMA Queued Data Transfer sequence automatically controls FPDMA Queued data transfers including sending the DMA SETUP FIS, the DMA activate FIS, the data transfer FIS, and the status FIS. The context stored in context buffer 322 indicates the data transfer amount and control bits for desired protocol sequence. Similarly as described for the automated DMA data transfer shown in FIG. 28, instruction interface 314 automatically steps through the FPDMA sequence (DMA SETUP FIS, DMA Activate FIS, transfer data FIS, repeat until data transfer is complete, status FIS). Individual contexts might be split into one or more smaller contexts to control individual steps in the sequence if necessary. As described with regard to FIGS. 14-16, separate contexts might be employed for the DMA Setup Context and one or more smaller data transfer contexts.

Embodiments of the present invention provide automatic generation of SAS protocol frames, similarly as described for SATA protocol FIS. Instruction interface 314 might automate read and write sequences such that the context stored in context buffer 322 only needs to indicate the overall length of the data transfer, and include appropriate protocol control bits. For example, instruction interface 314 might automatically issue a SAS connection frame if a connection is currently not established which provides connection information to link protocol core 304 to verify and establish a connection with a SAS host device via communication link 102. Instruction interface 314 might also automatically format and send a status frame after a data transfer completes without error. Further, read and write transfer frames might also be automatically generated. For example, for a read data transfer, instruction interface 314 might automatically issue an instruction for multiple data frames and send the status frame once the transfer is complete. Similarly, for a write data transfer, instruction interface 314 might automatically send the TRANSFER READY frame, receive write data frames, and send a status frame at the end of the transfer (if write caching is enabled). As described herein, multiple outstanding write streams are supported by employing Pending Write Table 324.

SATA compliant media controllers support Native Command Queuing (NCQ). NCQ generally allows the media controller to control the order in which received read and write commands are performed. This might reduce the amount of drive head movement to process the received commands, resulting in increased performance for workloads that have multiple simultaneous read/write requests outstanding. NCQ allows for up to 32 commands to be queued and active at the same time. The SATA protocol uses First Party DMA (FPDMA) commands for NCQ.

NCQ requires a specific handshaking protocol after an FPDMA command is transmitted by a host. The handshake requires that the device transmit a Device-to-Host FIS to clear the SATA BUSY bit, which releases the bus after the FPDMA command is received. Handshaking to release the bus might create a bottle neck in systems handling multiple queued commands. For example, for NCQ, the host transmits a Host-to-Device Register FIS containing an FPDMA write or read command. The SATA busy bit (BSY) is set to indicate that the drive is busy. After the media controller receives the command with no errors, the device releases the bus (e.g., communication link 102) by transmitting a Device-to-Host Register FIS with BSY set to 0. Once the bus is released, the host can transmit a new FPDMA command, or the media controller can return data for previously queued commands.

Embodiments of the present invention provide that handshaking is handled in hardware, which reduces the delay in transmitting the FIS versus handling the handshaking in firmware, and also reduces the workload of processor 116. Specifically, RXDP 306 parses the incoming Register FIS to recognize FPDMA commands used for NCQ, routes the incoming Register FIS to a command queue, interrupts firmware when the command is queued, automatically performs context execution, and then instruction interface 314 transmits the Register FIS, which completes the handshake and releases the bus. By releasing the bus sooner, the bus is free for transmission of additional data, improving overall system performance, and by reducing demand on processor 116, the processor is available to process the current command, rather than processing SATA protocol requirements. Finally, by removing protocol details from firmware, the resulting firmware is similar for both SATA and SAS.

RXDP 306 parses the incoming FIS. If the FIS is a Register FIS containing an FPDMA command, a plurality of checks is performed on the FIS. For example, link protocol core 304 verifies that the FIS has no Link Layer violations, and writes the FIS into a receive buffer (e.g., RX buffer 308). RXDP 306 performs additional checks on the FIS, verifying the command, verifying the tag, and adding the tag to a tag manager (e.g., tag manager 402). As described herein, a command tag is a unique ID assigned to commands (e.g., SATA NCQ tags range from 0-31, SAS tags have a 16 bit value). Tag manager 402 stores a list of active command tags and checks for tag overlap when new commands are received. RXDP 306 requests that instruction interface 314 transmit the Register FIS to clear busy bit and release the bus. RXDP 306 and instruction interface 314 have an interlock to allow instruction interface 314 to transmit the Register FIS immediately after an FPDMA command is received and the tag is added to the tag manager.

The interlock is set when link protocol core 304 writes the first dataword of an FIS into RX buffer 308 and the interlock is cleared when the last dataword is removed from RX buffer 308. When the interlock is set, instruction interface 314 generally does not load a new context from context cache 408. If instruction interface 314 already has a context loaded, then instruction interface 314 sends the data transfer corresponding to the context to link protocol core 304 for transfer to communication link 102. Once the data transfer is sent to link protocol core 304, instruction interface 314 transmits the Register FIS. Embodiments of the present invention thus provide support for SATA Native Command Queuing (NCQ).

As described herein, embodiments of the present invention provide a media controller for servicing contexts corresponding to data transfer requests from host devices. The media controller includes a context generator for generating contexts corresponding to the data transfer requests and a buffer for storing one or more context pointers, each pointer corresponding to a context and an action by a system module associated with the context. A context processor is configured to complete a context when the action by a media controller module associated with the context is complete, remove each pointer from the buffer associated with the completed context, and determine whether an interrupt corresponds to the completed context and removed pointer. If no interrupt corresponds to the completed context, the completed context is cleared. If an interrupt corresponds to the completed context, the interrupt is provided to a master processor and a completed context recycler for recycling the completed context pointer to the context generator.

Reference herein to "one embodiment", "an exemplary embodiment", or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of servicing contexts generated by a context generator, the method comprising:

storing one or more context pointers in a buffer, each pointer corresponding to a context and an action by a system module associated with context;

completing a context when completing the action by the system module associated with the context;

removing each pointer from the buffer associated with the completed context;

determining whether an interrupt corresponds to the completed context and removed pointer; and if no interrupt corresponds to the completed context, clearing the completed context; and if an interrupt corresponds to the completed context, providing the interrupt to a master processor;

reading, by the master processor, the completed context associated with the interrupt;

processing, by the master processor, data of the completed context; and clearing the context and the interrupt.

2. The method as recited in claim 1, comprising recycling the completed context pointer to the context generator when no interrupt corresponds to the completed context.

3. The method as recited in claim 1, further comprising recycling the completed context pointer to the context generator.

4. The method as recited in claim 1, further comprising updating system performance statistics when processing the completed context.

5. The method as recited in claim 1, wherein, for a plurality of completed contexts, the removing each pointer includes removing each pointer in an order of completion for the plurality of completed contexts.

6. The method as recited in claim 1, wherein the method is implemented by a consumed context manager of a media controller.

7. A non-transitory machine-readable storage medium, having encoded thereon program code, wherein, when the program code is executed by a machine, the machine implements a method of servicing contexts generated by a context generator, the method comprising:

storing one or more context pointers in a buffer, each pointer corresponding to a context and an action by a system module associated with context;

completing a context when completing the action by the system module associated with the context;

removing each pointer from the buffer associated with the completed context;

determining whether an interrupt corresponds to the completed context and removed pointer; and if no interrupt corresponds to the completed context, clearing the completed context; and if an interrupt corresponds to the completed context, providing the interrupt to a master processor;

reading, by the master processor, the completed context associated with the interrupt;

processing, by the master processor, data of the completed context; and clearing the context and the interrupt.

8. The machine-readable storage medium as recited in claim 7, comprising recycling, the completed context pointer to the context generator when no interrupt corresponds to the completed context.

9. The machine-readable storage medium as recited in claim 7, further comprising recycling the completed context pointer to the context generator.

10. The machine-readable storage medium as recited in claim 7, further comprising updating system performance statistics when processing the completed context.

11. The machine-readable storage medium as recited in claim 7, wherein, for a plurality of completed contexts, the removing each pointer includes removing each pointer in an order of completion for the plurality of completed contexts.

12. The machine-readable storage medium as recited in claim 7, wherein the method is implemented by a consumed context manager of a media controller.

13. A media controller for servicing contexts corresponding to data transfer requests from host devices, the media controller comprising:

a context generator for generating contexts corresponding to the data transfer requests;

a buffer for storing one or more context pointers, each pointer corresponding to a context and an action by a system module associated with context;

a context processor configured to:
  (i) complete a context when the action by a media controller module associated with the context is complete;
  (ii) remove each pointer from the buffer associated with the completed context;
  (iii) determine whether an interrupt corresponds to the completed context and removed pointer; and
  (iv) if no interrupt corresponds to the completed context, clear the completed context; and
    if an interrupt corresponds to the completed context, provide the interrupt to a master processor; and a completed context recycler for recycling the completed context pointer to the context generator when no interrupt corresponds to the completed context;

wherein, if an interrupt corresponds to the completed context, the master processor is configured to (i) read the completed context associated with the interrupt; (ii) process data of the completed context; and (iii) clear the context and the interrupt.

14. The media controller as recited in claim 13, wherein the master processor is further configured to (i) recycle the completed context pointer to the context generator; and (ii) update system performance statistics when processing the completed context.

15. The media controller as recited in claim 13, wherein the media controller is coupled to a storage media comprising a Redundant Array of Independent Disks (RAID) array.

16. The media controller as recited in claim 13, wherein the RAID array comprises at least one of a solid state disk (SSD), a hard disk drive (HDD), or a hybrid magnetic and solid state storage system.

17. The media controller as recited in claim 13, wherein the media controller is implemented in an integrated circuit.

* * * * *